United States Patent
Watanabe et al.

[11] Patent Number: 6,139,432
[45] Date of Patent: Oct. 31, 2000

[54] IMAGE CAPTURE APPARATUS AND METHOD

[75] Inventors: Mikio Watanabe; Atsushi Teshima; Keisuke Tanaka; Yoshiko Shiimori; Yoshiki Kawaoka; Norihisa Haneda, all of Asaka, Japan

[73] Assignee: Fuji Photo Film Co., Ltd., Minami-Ashigara, Japan

[21] Appl. No.: 09/295,339

[22] Filed: Apr. 21, 1999

[30] Foreign Application Priority Data

Apr. 24, 1998 [JP] Japan ................................. 10-129765
Jul. 31, 1998 [JP] Japan ................................. 10-229498

[51] Int. Cl.[7] .............................. A63F 13/00; A63F 9/24; G06F 17/00; G06F 19/00

[52] U.S. Cl. ................................. 463/31; 463/30; 463/32; 463/34; 463/46; 273/148 B; 273/148 R; 273/440; 273/451; 702/130; 702/131; 702/138

[58] Field of Search ................................. 463/31, 32, 33, 463/34, 30, 36, 46, 47, 47.5, 53, 56, 57; 273/406, 148 R, 148 B, 440, 451, 460; 396/661; 345/419, 420, 421, 358, 108, 109, 501, 955; 702/130, 131, 138

[56] References Cited

U.S. PATENT DOCUMENTS

| | | | |
|---|---|---|---|
| 4,486,774 | 12/1984 | Maloomian | 358/93 X |
| 4,602,286 | 7/1986 | Kellar et al. | 358/183 X |
| 4,688,105 | 8/1987 | Bloch et al. | 358/335 X |
| 4,710,873 | 12/1987 | Breslow et al. | 364/410 X |
| 4,745,424 | 5/1988 | Cardaire | 354/354 X |
| 4,776,796 | 10/1988 | Nossal | 434/94 |
| 4,827,344 | 5/1989 | Astle et al. | 358/183 X |
| 4,859,050 | 8/1989 | Borah et al. | 351/210 X |
| 4,994,832 | 2/1991 | Spector | 354/110 |
| 5,009,626 | 4/1991 | Katz | 446/391 X |
| 5,111,224 | 5/1992 | Spector | 354/125 |
| 5,272,025 | 12/1993 | Wheeler | 430/14 X |
| 5,278,662 | 1/1994 | Womach et al. | 358/335 X |
| 5,383,027 | 1/1995 | Harvey et al. | 358/296 X |
| 5,387,955 | 2/1995 | Cocca | 354/76 X |
| 5,938,530 | 8/1999 | Watanabe | 463/31 X |
| 5,947,823 | 9/1999 | Nimura | 463/32 X |
| 5,947,824 | 9/1999 | Minami et al. | 463/37 X |
| 5,977,968 | 11/1999 | Le Blanc | 345/339 X |
| 5,982,350 | 11/1999 | Hekmatpour et al. | 345/113 X |
| 5,984,780 | 11/1999 | Takemoto et al. | 463/20 X |
| 6,007,338 | 12/1999 | Di Nunzio et al. | 434/55 X |
| 6,017,272 | 1/2000 | Rieder | 463/31 |
| 6,061,532 | 5/2000 | Bell | 396/661 X |

*Primary Examiner*—Jessica J. Harrison
*Assistant Examiner*—Binh-An Nguyen
*Attorney, Agent, or Firm*—McGinn & Gibb, P.C.

[57] ABSTRACT

A game player is allowed to punch a punching ball and the shape of a captured image is transformed in conformity with the punching force applied to the ball. An image is captured by a camera or memory card reader. The player punches the punching ball, causing the shape of the captured image to be transformed. The larger the acceleration of the punching ball when it is punched, the greater the transformation in the shape of the captured image. The transformed image is displayed on a display unit and may be printed if desired. The player can experience a game more realistic than one in which the shape of a computer-graphics image is transformed.

19 Claims, 57 Drawing Sheets

*Fig. 10*

ADDRESS / IMAGE-PROCESSING DESCRIPTION FILE

| Address | Contents |
|---|---|
| 0x0000 | header |
| 0x0020 | default output |
| 0x0050 | layer list<br>    Layer Info[1]<br>    Layer Info[2]<br>    Layer Info[3]<br>    Layer Info[4]<br>    Layer Info[5] |
| 0x0300 | layer data 1 |
| 0x0320 | layer-specific data 1 |
| 0x0350 | layer data 2 |
| 0x0370 | layer-specific data 2 |

*Fig. 11* header

```
PUNCHING GAME(HEADER INFORMATION)
1.0.0(VERSION NO.)
```

*Fig. 12* default output

```
148 × 100 (OUTPUT SIZE, WIDTH × HEIGHT)
Postcard(OUTPUT TYPE: A3, A4, A5, A6, Postcard)
1(LANDSCAPE) (OUTOPUT DIRECTION: PORTRAIT, LANDSCAPE)
WHITE(BACKGROUND COLOR)
```

*Fig. 13* layer list

```
5(NUMBER OF LAYERS)
   Layer Info[1]   0x0300(LAYER POINTER)
                   0021(SHAPE-TRANSFORMATION 1 LAYER)(LAYER NAME)
                   1(DISPLAY ORDER)
                   1(DISPLAY POSSIBLE)(DISPLAY/NON-DISPLAY FLAG)
                   1(SUBSTITUTION POSSIBLE)
                     (SUBSTITUTION POSSIBLE/IMPOSSIBLE FLAG)
                   1(SUBSTITUTION NO.)
   Layer Info[2]   0X0350(LAYER POINTER)
                   0022(SHAPE-TRANSFORMATION 2 LAYER)
                   2(DISPLAY ORDER)
                   0(DISPLAY POSSIBLE)
                   1(SUBSTITUTION POSSIBLE)
                   1(SUBSTITUTION POSSIBLE)
   Layer Info[3]   0X0400(LAYER POINTER)
                   0023(SHAPE-TRANSFORMATION 3 LAYER)
                   3(DISPLAY ORDER)
                   0(DISPLAY POSSIBLE)
                   0(SUBSTITUTION POSSIBLE)
                   1(SUBSTITUTION POSSIBLE)
   Layer Info[4]   0X0450(LAYER POINTER)
                          :
                          :
```

*Fig. 14* layer data 1

> 0x0320(LAYER-DEPENDENT INFORMATION POINTER)
> 0x0820(TRANSPARENCY MASK POINTER)
> 0x0840(POSITION INFORMATION POINTER)

layer-specific data1

> 1(LAYER CATEGORY)
> JPEG(FORMAT OF CAPTURED IMAGE)
> Input.jpg(POINTER OF CAPTURED IMAGE)
> 0.00(MAXIMUM VALUE OF LAYER PARAMETER)
> 0.00(MINIMUM VALUE OF LAYER PARAMETER)

layer data2

> 0x0320(LAYER-DEPENDENT INFORMATION POINTER)
> 0x0820(TRANSPARENCY MASK POINTER)
> 0x0840(POSITION-INFORMATION POINTER)

layer-specific data2

> 1(Transformation)(LAYER CATEGORY)
> JPEG(FORMAT OF CAPTURED IMAGE)
> Input.jpg(POINTER OF CAPTURED IMAGE)
> 0.00(MAXIMUM VALUE OF LAYER PARAMETER)
> 0.00(MINIMUM VALUE OF LAYER PARAMETER)

CAPTURED IMAGE

SHAPE TRANSFORMATION 11   SHAPE TRANSFORMATION RESULT 11

SHAPE TRANSFORMATION 12   SHAPE TRANSFORMATION RESULT 12

SHAPE TRANSFORMATION 13   SHAPE TRANSFORMATION RESULT 13

SHAPE TRANSFORMATION 14   SHAPE TRANSFORMATION RESULT 14

SHAPE TRANSFORMATION 15   SHAPE TRANSFORMATION RESULT 15

SHAPE TRANSFORMATION 15 — SHAPE TRANSFORMATION RESULT 15

SHAPE TRANSFORMATION 25 — SHAPE TRANSFORMATION RESULT 25

SHAPE TRANSFORMATION 35 — SHAPE TRANSFORMATION RESULT 35

SHAPE TRANSFORMATION 45 — SHAPE TRANSFORMATION RESULT 45

SHAPE TRANSFORMATION 55 — SHAPE TRANSFORMATION RESULT 55

Fig. 54 layer list

```
2 (NUMBER OF LAYER)

Layer Info [1]    0x0100 (LAYER POINTER)
                      0010 (G-COMPONENT REDUCTION LAYER)
                      1 (DISPLAY ORDER)
                      1 (DISPLAY POSSIBLE)
                      1 (SUBSTITUTION POSSIBLE)
                      1 (SUBSTITUTION NO.)

Layor Info [2]    0x0150 (LAYER POINTER)
                      0011 (R-COMPONENT REDUCTION LAYER)
                      2 (DISPLAY ORDER)
                      1 (DISPLAY POSSIBLE)
                      1 (SUBSTITUTION POSSIBLE)
                      1 (SUBSTITUTION NO.)
```

Fig. 55 layer data 1

> 0x0120 (LAYER-DEPENDENT INFORMATION POINTER)
> 0x0220 (TRANSPARENCY MASK POINTER)
> 0x0240 (POSITION INFORMATION POINTER)

layer-specific data 1

> 2 (Color Transformation) (LAYER CATEGORY)
> JPEG (FORMAT OF CAPTURED IMAGE)
> Input.jpg (POINTER OF CAPTURED IMAGE)
> 0.50 (MAXIMUM VALUE OF LAYER PARAMATER)
> 0.00 (MINIMUM VALUE OF LAYER PARAMATER)

layer data 2

> 0x0170 (LAYER-DEPENDENT INFORMATION POINTER)
> 0x0280 (TRANSPARENCY MASK POINTER)
> 0x0300 (POSITION INFORMATION POINTER)

layer-specific data 2

> 2 (Color Transformation) (LAYER CATEGORY)
> JPEG (FORMAT OF CAPTURED IMAGE)
> Input.jpg (POINTER OF CAPTURED IMAGE)
> 0.50 (MAXIMUM VALUE OF LAYER PARAMATER)
> 0.00 (MINIMUM VALUE OF LAYER PARAMATER)

IMAGE CAPTURE APPARATUS AND METHOD

BACKGROUND OF THE INVENTION

1. Field of the Invention

This invention relates to an image capture apparatus and method for capturing an image and subjecting the captured image to at least one of image shape transformation processing and color transformation processing.

2. Background of the Invention

An image capture apparatus typified by a digital still camera captures an image by photographing a subject. Image data representing the captured image is transmitted from the digital still camera to a personal computer. The image is displayed on the display screen of a display unit connected to the personal computer and is subjected to image processing such as shape transformation processing and color transformation processing.

Conventionally, a user subjects the captured image to image processing such as shape transformation processing and color transformation processing by a manual operation.

SUMMARY OF THE INVENTION

An object of the present invention is to sense at least one of a command from a player or a physical quantity relating to a characteristic of the player, and subject a captured image to at least one of shape transformation and color transformation based upon at least one of the sensed command and physical quantity.

According to a first aspect of the present invention, the foregoing object is attained by providing an image capture apparatus comprising: image capture means (an image capture device) for capturing an image; sensing means (a sensing device) for sensing at least one of a command from a player and a physical quantity relating to a characteristic of the player; image shape/color transformation means (an image shape/color transformation device) for subjecting image data, which represents the image captured by the image capture means, to at least one of shape transformation processing and color transformation processing on the basis of at least one of the command and physical quantity, which has been sensed by the sensing means, in such a manner that the image will be subjected to at least one of shape transformation and color transformation; and output means (an output device) for outputting the image data that has been processed by the image shape/color transformation means.

The first aspect of the present invention provides also a method suited for the apparatus described above. Specifically, there is provided an image capture method comprising the steps of: capturing an image; sensing at least one of a command from a player and a physical quantity relating to a characteristic of the player; subjecting image data, which represents the image captured, to at least one of shape transformation processing and color transformation processing on the basis of at least one of the command and physical quantity sensed, in such a manner that the image will be subjected to at least one of shape transformation and color transformation; and outputting the image data that has been processed.

In accordance with the first aspect of the present invention, generally the image of a player is captured and at least one of a command from the player (inclusive of a shape transformation command, degree of shape transformation, color transformation command and degree of color transformation) and physical quantity relating to a characteristic of the player (e.g., the player's punching force, gripping strength, back-muscle strength, lung capacity, object-pushing strength, object-pulling strength, height, weight, body temperature, amount of perspiration, heart rate, blood pressure, concentration of alcohol on his/her breath).

The captured image is subjected to at least one of shape transformation processing and color transformation processing based upon at least one of the sensed command and physical quantity. This makes it possible to subject an image to shape transformation and color transformation different from the image shape transformation and color transformation of the prior art.

Image capture may be performed by taking a picture of the player. Alternatively, an image brought by the player (the image may be printed matter such as a photograph or an image represented by image data that has been stored on a medium such as a memory card) may be captured. Though the image to be captured generally is the image of the player, it goes without saying that an image other than that of the player may be captured.

Further, in an instance where the gripping strength of the player has been sensed (a dynamometer is utilized as a matter of course), the shape of the captured image would be transformed so as to crush the image (e.g., the image of the player's face) in dependence upon the sensed value. This makes it possible to sense gripping strength in much the same way that a game is played.

In an instance where the strength of the player's back muscles has been sensed (a gauge for measuring the strength of back muscles is utilized as a matter of course), the shape of the captured image would be transformed so as to twist the image (e.g., the entire image of the individual) in dependence upon the back-muscle strength sensed. This makes it possible to sense back-muscle strength in much the same way that a game is played.

In an instance where the player's lung capacity has been sensed (a gauge for measuring lung capacity is utilized as a matter of course), the shape of the image would be transformed so as to fatten the captured image in dependence upon the lung capacity sensed. This makes it possible to sense lung capacity in much the same way that a game is played.

In an instance where the player's pushing or pulling strength has been sensed, the shape of the image would be transformed in dependence upon the strength sensed. This makes it possible to sense strength in much the same way that a game is played.

In an instance where the player's height has been sensed (a gauge for measuring height is utilized as a matter of course), the shape of the image would be transformed so as to lengthen the captured image if the sensed height is greater than a fixed value and shorten the captured image if the sensed height is less than the fixed value. In this case also height can be sensed in much the same way that a game is played.

In an instance where the player's weight has been sensed (a scale is utilized as a matter of course), the shape of the image would be transformed so as to fatten the captured image if the sensed weight is greater than a fixed value and slim down the captured image if the sensed weight is less than the fixed value. In this case also weight can be sensed in much the same way that a game is played.

In an instance where amount of perspiration, heart rate or blood pressure of the player has been sensed, the shape of the image would be transformed so as to make the captured image break out in a cold sweat in dependence upon the amount of perspiration, heart rate or blood pressure. This makes it possible to measure degree of stress in much the same way that a game is played.

An arrangement may be adopted in which at least one of the image transformed in shape and the image transformed in color is displayed on a display unit.

An arrangement may be adopted in which the degree of shape transformation of a shape-transformed image or the degree of color transformation of a color-transformed image is displayed on the display unit while being gradually enlarged. This makes it possible to ascertain the shape transformation or color transformation process.

An arrangement may be adopted in which the captured image is displayed. This makes it possible to check the kind of image that was captured.

Furthermore, the image captured the last time and the image transformed in shape the last time may be stored, and the last captured image or the last image transformed in shape may be transformed in shape based upon the physical quantity sensed by the physical-quantity sensor described above.

When a color image has been captured, the image captured the last time and the image transformed the last time may be stored, and the last captured image or the last image transformed in color may be transformed in color based upon the physical quantity sensed by the physical-quantity sensor described above.

The image shape/color transformation means has decision means for deciding, based upon at least one of a command value and physical quantity sensed by the sensing means, a description statement representing one type of processing from among image-processing description statements in which there are set forth a plurality of description statements representing at least one of image-data shape transformation processing and color transformation processing, wherein it is possible to subject the image captured by the image capture means to at least one of shape transformation and color transformation based upon the description statement that has been decided.

An image capture apparatus according to a second aspect of the present invention comprises: image capture means (an image capture device) for capturing an image; punching-force sensing means (a punching-force sensing device) for sensing a value relating to punching force; image shape transformation means (an image shape transformation device) for subjecting image data, which represents the image captured by the image capture means, to shape transformation processing on the basis of the punching force, which has been sensed by the punching-force sensing means, in such a manner that the captured image will be transformed in shape; and output means (an output device) for outputting the image data that has been subjected to shape transformation processing by the image shape transformation means.

The second aspect of the present invention provides also a method suited for the apparatus described above. Specifically, there is provided an image capture method comprising the steps of: capturing an image; sensing a value relating to punching force; subjecting image data, which represents the image captured, to shape transformation processing on the basis of the punching force sensed, in such a manner that the captured image will be transformed in shape; and outputting the image data that has been subjected to shape transformation processing.

In accordance with the second aspect of the present invention, an image is captured, the punching force of a player is sensed and the captured image is transformed in terms of shape in dependence upon the punching force sensed. The transformed image is displayed on the display screen of a display unit, by way of example. An arrangement may be adopted in which the transformed image is printed.

An image that has been captured (the player's own image captured by photographing the player per se; an image captured by shooting printed matter such as a photograph brought by the player; or an image obtained by reading in an image represented by image data that has been stored on a storage medium), and not merely a simple computer-graphics image, can be transformed in shape in dependence upon punching force. Thus the player is capable of experiencing a game that is more realistic in comparison with a case where a mere computer-graphics image is transformed in shape.

Preferably the direction and magnitude of the punching force are sensed, the shape of the image is transformed in the direction in which the punching force is applied, and it is arranged so that the larger the magnitude of the punching force, the greater the transformation in the shape of the captured image.

Since the image whose shape has been transformed is transformed in dependence upon the direction of the punch, it is possible to obtain a transformed image that appears much closer to reality.

A preferred arrangement includes capturing images of two different frames, sensing punching force in connection with one image of the images of the two different frames, subjecting image data representing the captured images to shape transformation processing in such a manner that the one image will be transformed in shape based upon the sensed punching force, sensing punching force in connection with the other image of the images of the two different frames, and subjecting image data representing the captured images to shape transformation processing in such a manner that the other image will be transformed in shape based upon the sensed punching force.

Two players can be allowed to punch and images of two different frames can be transformed in shape based upon the respective punching forces that have been sensed. The two players can be allowed to compete. An arrangement may be adopted in which the two players throw their punches simultaneously or by taking turns.

In a case where a first image provided by a first player and a second image provided by a second player are captured, a preferred arrangement would include sensing a value relating to punching force of the first player, shape-transforming image data representing the second image based upon the sensed punching force in such a manner that the second image is transformed in shape, displaying the transformed second image to the first player, sensing a value relating to punching force of the second player, transforming image data representing the first image based upon the sensed punching force in such a manner that the first image is transformed in shape, and displaying the transformed first image to the second player.

The two players can throw punches simultaneously and deform each other's captured images.

An image capture apparatus according to a third aspect of the present invention comprises: color-image capture means (a color-image capture device) for capturing a color image; body-temperature measurement means (a body-temperature measurement device) for measuring a value relating to body temperature of a player; image color-transformation means (an image color-transformation device) for subjecting color image data, which represents the color image captured by the color-image capture means, to color transformation processing on the basis of the body temperature of the player, which has been measured by the body-temperature measurement means, in such a manner that the captured color image will be transformed in color; and output means (an output device) for outputting the color image data that has been subjected to color transformation processing by the image-color transformation means.

The third aspect of the present invention provides also a method suited for the apparatus described above. Specifically, there is provided an image capture method comprising the steps of: capturing a color image; measuring a value relating to body temperature of a player; subjecting color image data, which represents the color image captured, to color transformation processing on the basis of the measured value relating to body temperature of the player, in such a manner that the captured color image will be transformed in color; and outputting the color image data that has been subjected to color transformation processing.

In accordance with the third aspect of the present invention, an image is captured and a value relating to the body temperature of the player is sensed. (The player's body temperature per se may be sensed or moisture in the palm of the player's hand.) The color of the captured image changes based upon the value sensed value relating to the player's body temperature. For example, assume a case where the image of the face of an individual is captured. If the body temperature of the player rises above average body temperature, the image would redden; if the body temperature of the player falls below average body temperature, the image would become bluer.

In this case also the color of the image can be changed based upon an image more realistic than a computer-graphics image.

An image capture apparatus according to a fourth aspect of the present invention comprises: color-image capture means (a color-image capture device) for capturing a color image; alcohol sensing means (an alcohol sensing device) for sensing a value relating to alcohol content in breath; image color-transformation means (an image color-transformation device) for subjecting color image data, which represents the color image captured by the color-image capture means, to color transformation processing on the basis of the value relating to alcohol content, which has been sensed by the alcohol sensing means, in such a manner that the captured color image will be transformed in color; and output means (an output device) for outputting the color image data that has been subjected to color transformation processing by the image-color transformation means.

The fourth aspect of the present invention provides also a method suited for the apparatus described above. Specifically, there is provided an image capture method comprising the steps of: capturing a color image; sensing a value relating to alcohol content in breath; subjecting color image data, which represents the color image captured, to color transformation processing on the basis of the sensed value relating to alcohol content, in such a manner that the captured color image will be transformed in color; and outputting the color image data that has been subjected to color transformation processing.

In accordance with the fourth aspect of the present invention, an image is captured and alcohol content in one's breath is sensed. The color of the captured image is transformed based upon the alcohol content sensed. In this case also the color of the image can be transformed based upon an image more realistic than a computer-graphics image.

An image capture apparatus according to a fifth aspect of the present invention comprises: color-image capture means (a color-image capture device) for capturing a color image; command-value input means (a command-value input device) for inputting a command value, which represents degree of color transformation, from a player; image color-transformation means (an image color-transformation device) for subjecting image data, which represents the color image captured by the color-image capture means, to color transformation processing on the basis of the command value that has been input from the command-value input means; and output means (an output device) for outputting the color image data that has been subjected to color transformation processing by the image-color transformation means.

The fourth aspect of the present invention provides also a method suited for the apparatus described above. Specifically, there is provided an image capture method comprising the steps of: capturing a color image; inputting a command value, which represents degree of color transformation, of a player; subjecting image data, which represents the color image captured, to color transformation processing on the basis of the input command value; and outputting the color image data that has been subjected to color transformation processing.

In accordance with the fifth aspect of the present invention, a command value representing degree of color transformation is input from a player and a captured image is subjected to color transformation processing based upon the command value that the player has input. The color of the captured image can be changed to a desired color.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 illustrates an image-processing description file;

FIG. 11 illustrate the header of the image-processing description file;

FIG. 12 illustrates the content of a default output of the image-processing description file;

FIG. 13 illustrates the content of a layer list;

FIG. 14 illustrates the content of layer data and layer-specific data;

FIG. 54 illustrates an example of a layer list;

FIG. 55 illustrates the content of layer data and layer-specific data;

DESCRIPTION OF THE PREFERRED EMBODIMENTS (1) Punching game machine

Figure 1:
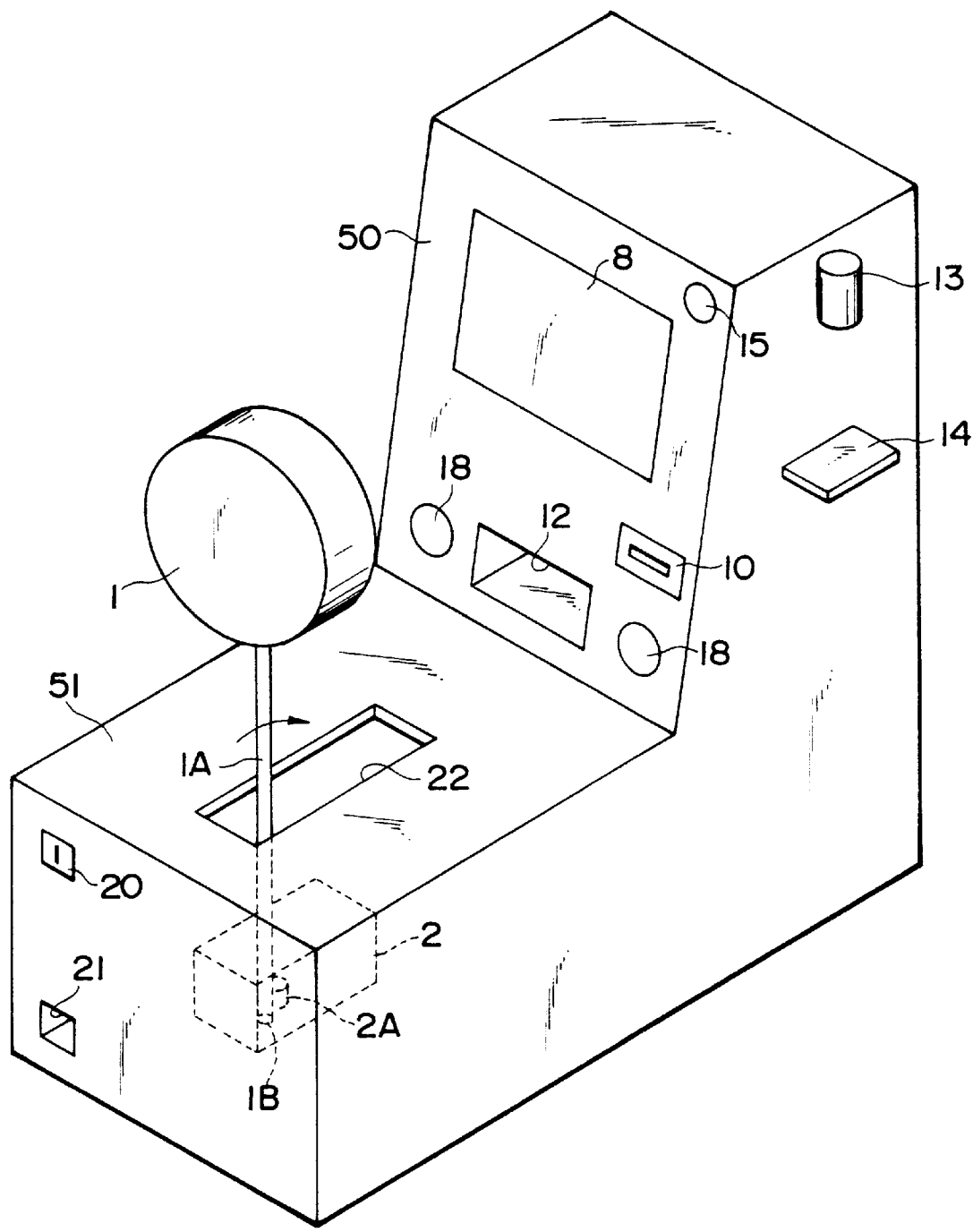
FIG. 1 is a perspective view showing the appearance of a punching game machine.

FIG. 1 illustrates the appearance of a punching game machine.

The punching game machine has a vertical portion 50, which is erected in a substantially vertical attitude, and a horizontal portion 51.

The horizontal portion 51 has a horizontal surface formed to include an elongated opening 22 substantially at the central portion thereof. A punching ball 1 is supported by a support rod 1A passing through the opening 22. The punching ball 1 is knocked backward about a fulcrum that is a lower end 1B of the support rod 1A. (It goes without saying that the support rod 1A is biased forward by a spring mechanism, which is not shown.) An acceleration sensor apparatus 2 is attached to the lower end of the support rod 1A. The acceleration sensor apparatus 2 has a built-in acceleration sensor 2A.

The acceleration sensor 2A is in contact with the lower end of the support rod 1A. If the punching ball 1 is knocked backward by being punched, the lower end of the support rod 1A pressures the acceleration sensor 2A. On the basis of the pressure applied by the support rod 1A, the acceleration sensor 2A outputs a signal representing the acceleration at which the punching ball 1 is knocked back. (The acceleration sensor 2A is a piezoelectric acceleration sensor that is restored to its original state when the pressure applied by the support rod 1A is removed.) It goes without saying the acceleration sensor apparatus 2 is not limited to a piezoelectric acceleration sensor and that various accelerator sensors can be utilized as the acceleration sensor apparatus 2, examples of which are a semiconductor acceleration sensor and a piezogyro.

A live-image camera 15 which shoots the area in front of it is provided on the front side of the vertical portion 50 at the upper right. When a player stands in front of the live-image camera 15 and photography by the live-image camera 15 is selected, the image of the player is captured by the camera. A memory-card insertion slot 10 is formed in the vertical portion 50 at a location below the camera 15. A table 14 on which printed matter (a photograph, etc.) is placed is attached to the right side face of the punching game machine substantially at the central portion thereof. Provided above the table 14 is a printed-matter camera 13 for shooting printed matter that has been placed upon the table 14. This is performed instead of using the live-image camera 15 to take a picture of the player.

The upper part of the front side of vertical portion 50 is provided with a display screen 8. An image representing the player shot by the live-image camera 15, an image representing printed matter shot by the printed-matter camera 13 or an image represented by image data that has been recorded on a memory card inserted into the memory-card insertion slot 10 is displayed on the display screen 8. Naturally, an arrangement may be adopted in which all of these images, namely the image representing the player shot by the live-image camera 15, the image representing printed matter shot by the printed-matter camera 13 and the image represented by image data that has been recorded on a memory card inserted into the memory-card insertion slot 10 are displayed on the display screen 8 or in which the images of any two frames from among the images of these three frames are displayed on the display screen 8.

An extraction port 12 for extracting printed matter is formed in the lower part of the front side of vertical portion 50. Speakers 18 for audio output are formed in the vertical portion 50 on both sides of the extraction port 12.

A coin insertion slot 20 for inserting a user fee is formed in the front side of the punching game machine and the lower part thereof. A coin return slot 21 is formed below the coin insertion slot 20.

When an image captured by the camera 13 or 15 or an image represented by image data that has been stored on a memory card is displayed on the display screen 8 and the punching ball 1 is punched by the player, the shape of the image being displayed on the display screen is transformed in conformity with the degree to which the ball is punched. This will become more apparent from the description below regarding the details of punching game processing.

It is so arranged that the live-image camera 15 is provided on the front side of the vertical portion 50 and shoots straight ahead. However, the camera may be provided on the side or the back of the punching game machine. Providing the camera on the side or the back of the punching game machine makes it possible to shoot a third party other than the player (a player other than the player that punches the ball in a case where there are a plurality of players). The printed-matter camera 13 may be mounted in a freely rotatable manner so that it may shoot not only what is placed on the table 14. That is, the camera 13 can be arranged to shoot not only the printed matter below it but also printed matter in front or in back of it.

Though the punching ball 1 is provided substantially at the central portion of the horizontal portion 51, it may be provided at the end of the horizontal portion 51 so that it will not become an obstruction even if the shooting area of the live-image camera 15 is enlarged.

Figure 2:
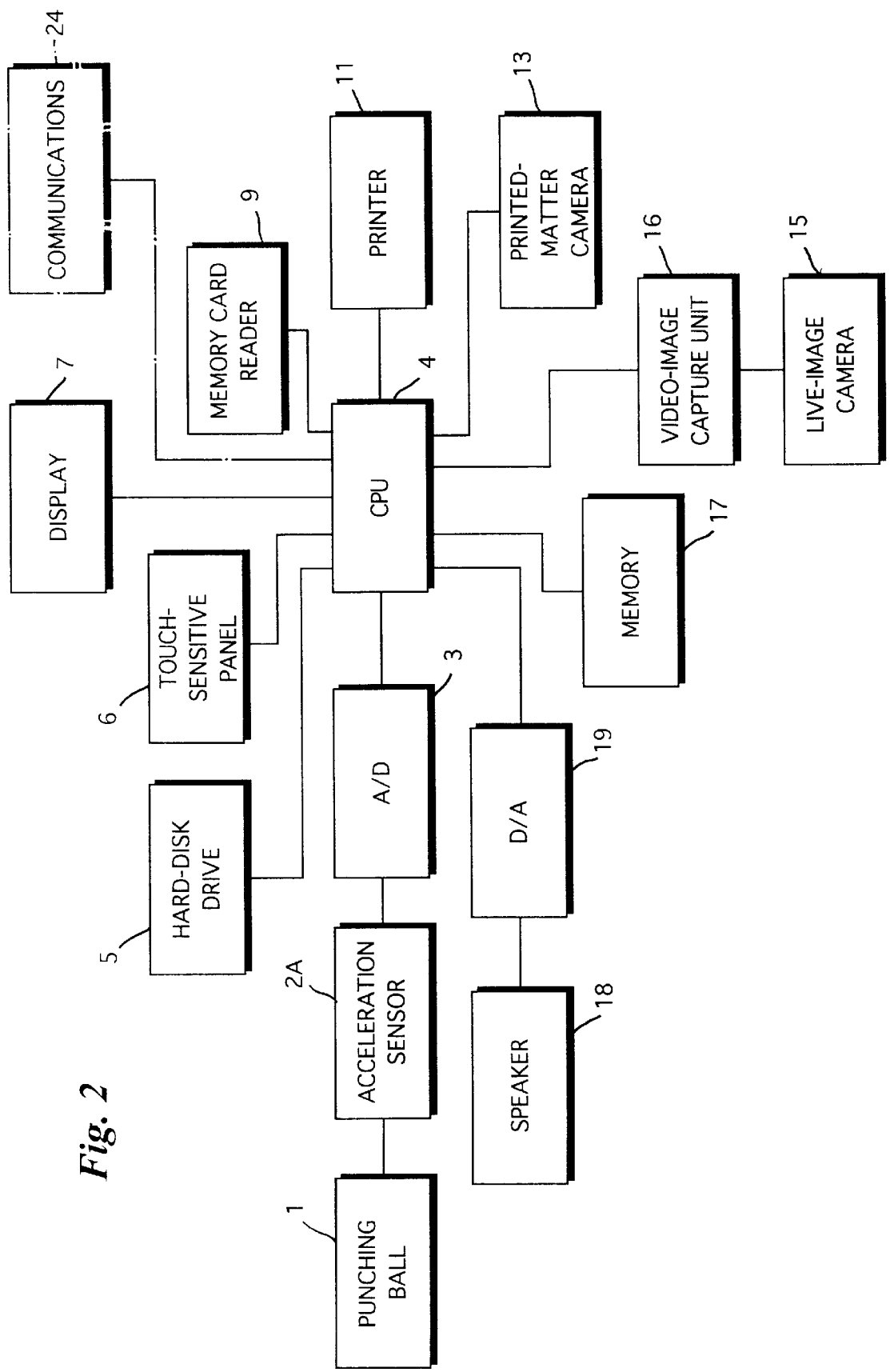
FIG. 2 is a block diagram showing the electrical construction of the punching game machine.

FIG. 2 is a block diagram showing the electrical construction of the punching game machine.

The overall operation of the punching game machine is supervised by a CPU 4.

The punching game machine includes a display unit 7 having the above-mentioned display screen 8. A touch-sensitive panel 6 is formed on the display screen 8 of the display unit 7. A signal indicating that the touch-sensitive panel 6 has been touched is input to the CPU 4. Image data that has been recorded on a memory card inserted into the memory-card insertion slot 10 is read by a memory-card reader 9. Image data that has been read by the memory-card reader 9 is input to the CPU 4. Further, image data representing the image of a user shot by the live-image camera 15 in the manner described above is input to the CPU 4 via a video capture unit 16, and image data representing printed matter shot by the printed-matter camera 13 also is input to the CPU 4.

The punching game machine further includes a printer 11. Printed matter that has been printed by the printer 11 is extracted from the extraction port 12. The punching game machine is further provided with a memory 17 for temporarily storing programs and other necessary data, and with a hard-disk drive 5 for writing data to a hard disk (not shown) and reading out data that has been written to the hard disk. The data that has been read by the hard-disk drive 5 is input to the CPU 4.

Data for an audio output is output from the CPU 4 and input to the speakers 18 via a digital/analog conversion circuit 19, whereby audio is output from the speakers 18.

The punching ball 1 is knocked backward by being punched. Acceleration of the punching ball 1 when it is punched is measured by the acceleration sensor 2A as a value relating to punching force. A signal representing acceleration measured by the acceleration sensor 2A is converted to digital data by an analog/digital conversion circuit 3. The digital data is input to the CPU 4.

The punching game machine is also capable of competing against a plurality of other punching game machines through communication, as will be described later. In a case where a plurality of punching game machines communicate and compete against each other, the punching game machine is provided with a communications circuit 24 for communication with the other punching game machines.

Though the punching game machine includes a coin machine, this is not illustrated in FIG. 2.

Thus, a punching game machine according to this embodiment displays a captured image on the display screen 8 and, in response to punching of the punching ball 1, causes the shape of the displayed image to be transformed in conformity with the degree to which the ball is punched (i.e., in conformity with the acceleration at which the punching ball 1 is knocked backward).

Figure 3:
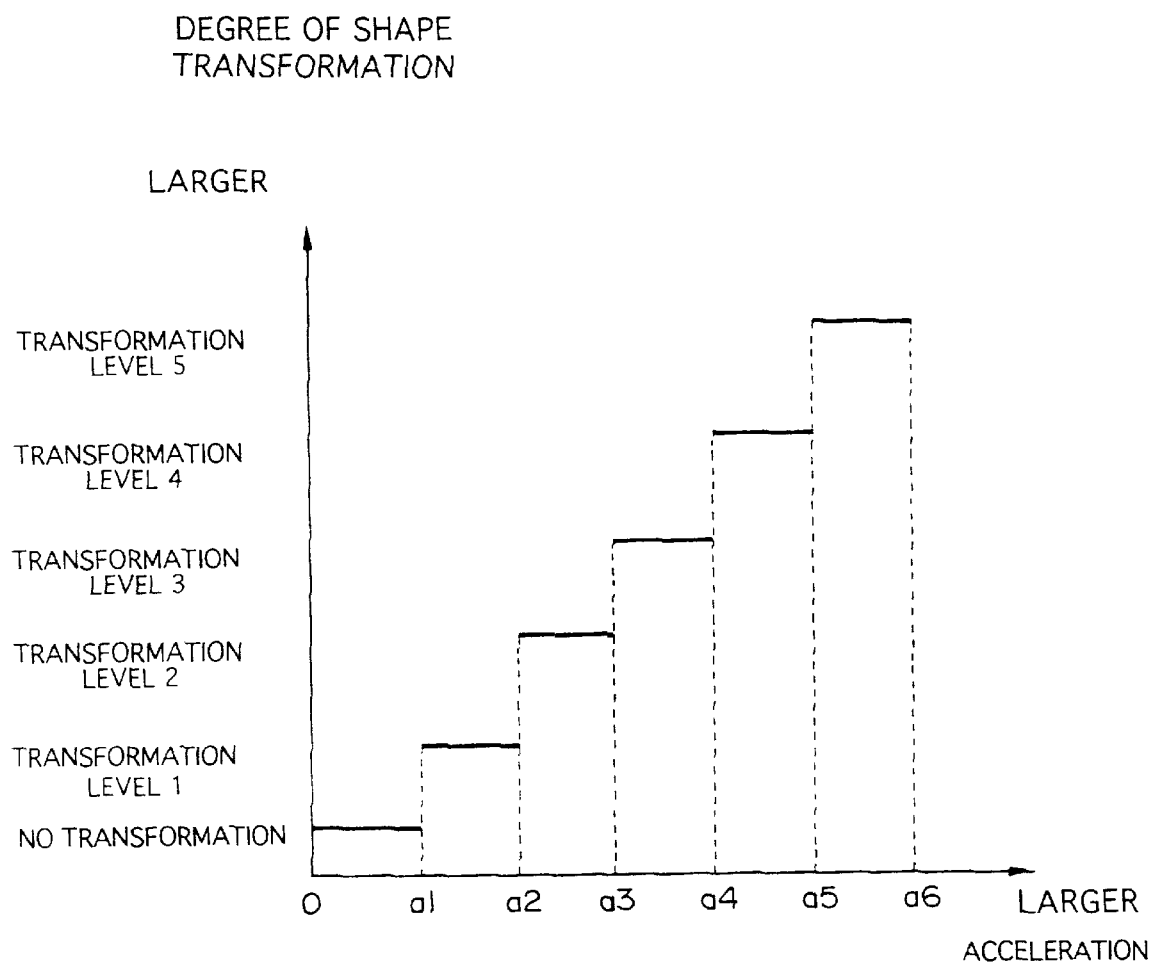
FIG. 3 illustrates the relationship between sensed acceleration and degree of shape transformation.
Figure 4:
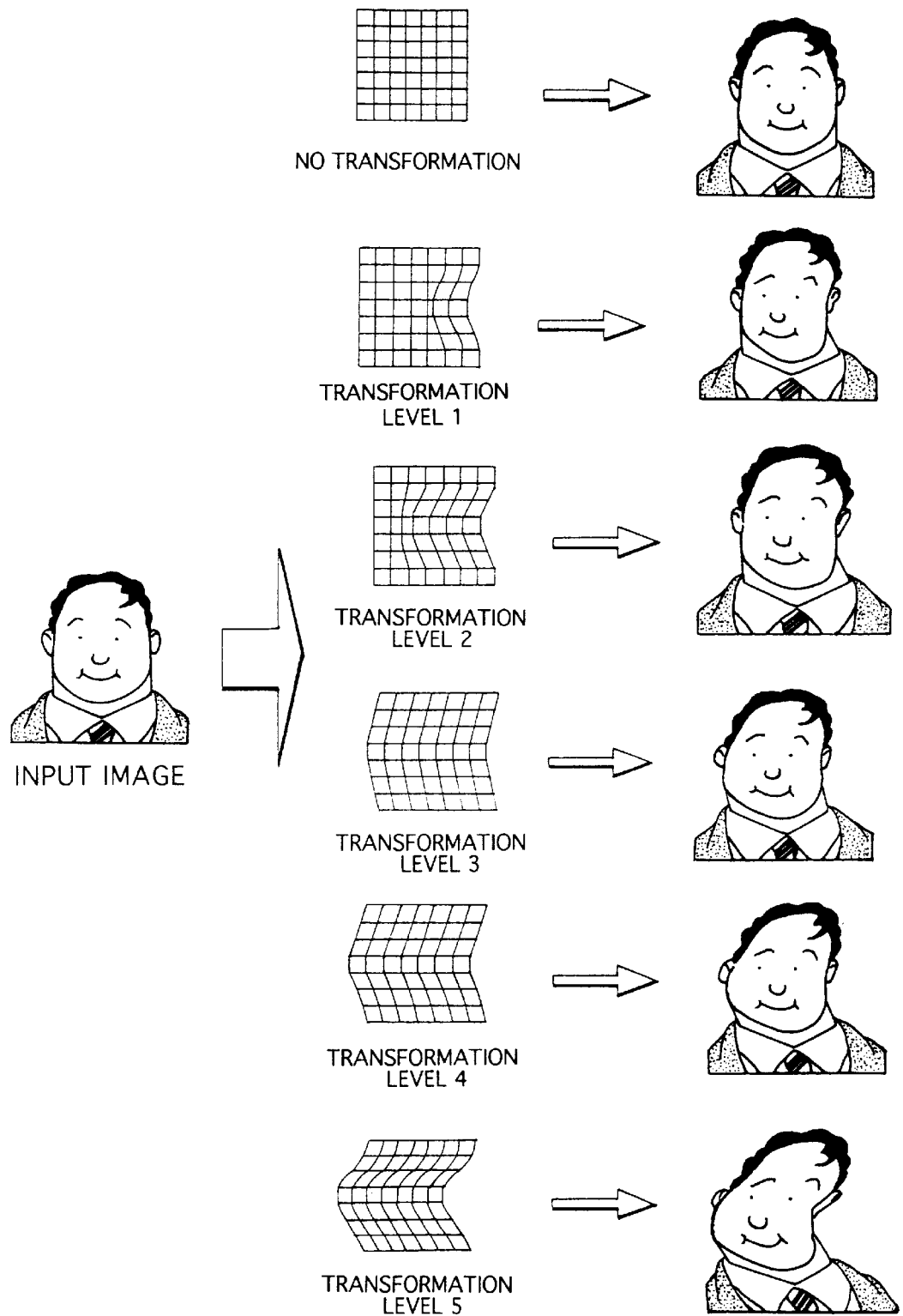
FIG. 4 illustrates the manner in which the shape of a captured image is transformed.

FIG. 3 illustrates the relationship between acceleration measured by the acceleration sensor apparatus 2 and degree of shape transformation of the image displayed on the display screen 8. FIG. 4 illustrates a captured image and a change in the degree of shape transformation thereof.

The larger the acceleration sensed by the acceleration sensor 2A, the greater the degree of transformation of the shape of the captured image. Degrees of shape transformation range from Transformation Level 1 to Transformation Level 5, with the degree of shape transformation becoming gradually larger from 1 to 5.

There is no transformation in the shape of the captured image if the acceleration sensed by the acceleration sensor 2A is between 0 and a1. The shape of the captured image is transformed at the degree of Transformation Level 1 if the acceleration sensed by the acceleration sensor 2A is between a1 and a2, at the degree of Transformation Level 2 if the acceleration sensed by the acceleration sensor 2A is between a2 and a3, at the degree of Transformation Level 3 if the acceleration sensed by the acceleration sensor 2A is between a3 and a4, at the degree of Transformation Level 4 if the acceleration sensed by the acceleration sensor 2A is between a4 and a5, and at the degree of Transformation Level 5 if the acceleration sensed by the acceleration sensor 2A is between a5 and a6. It should be noted that the inequality $a1<a2<a3<a4<a5$ holds.

Figure 5:
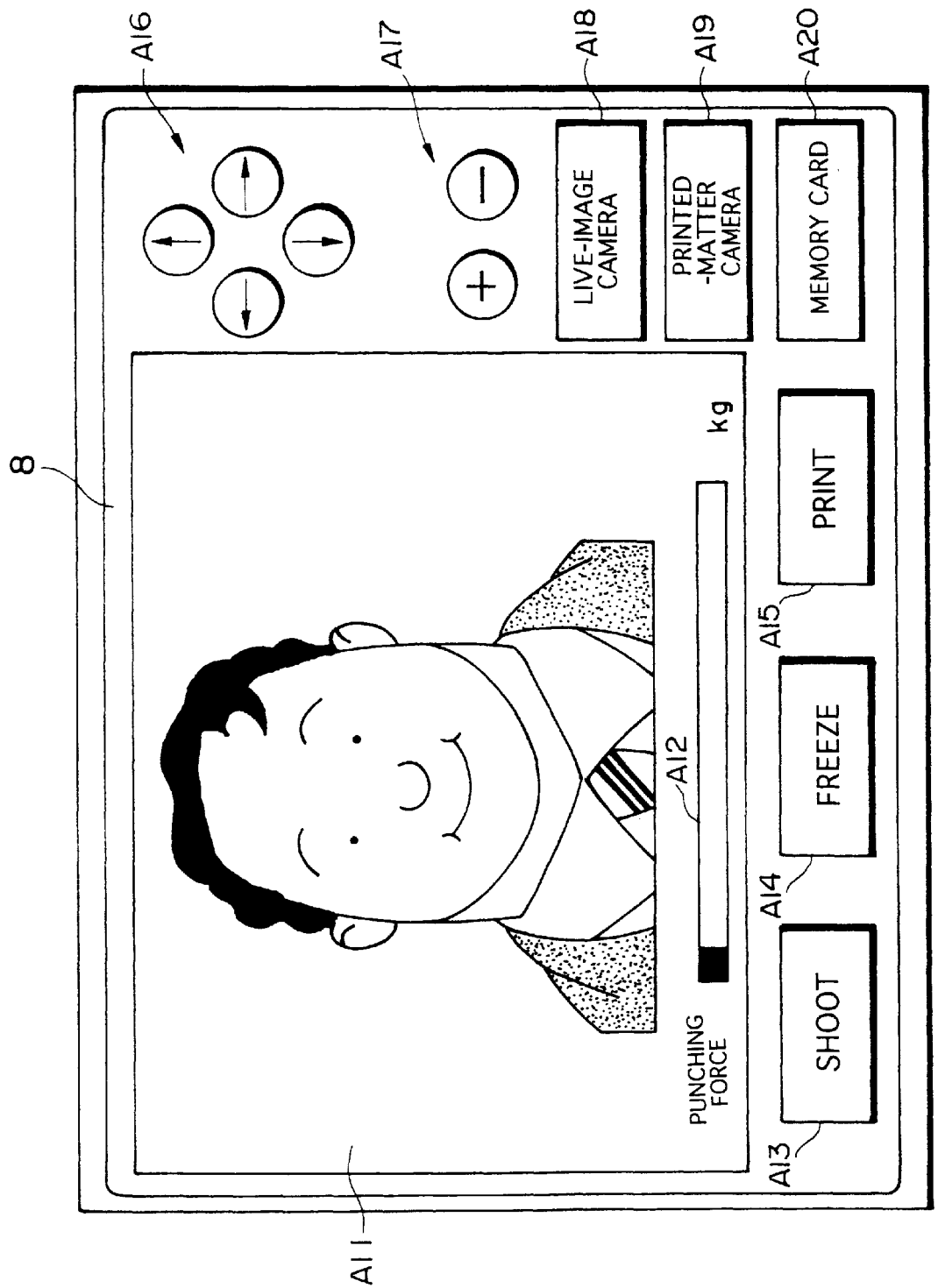
FIGS. 5 and 6 illustrate examples of a display screen.
Figure 6:
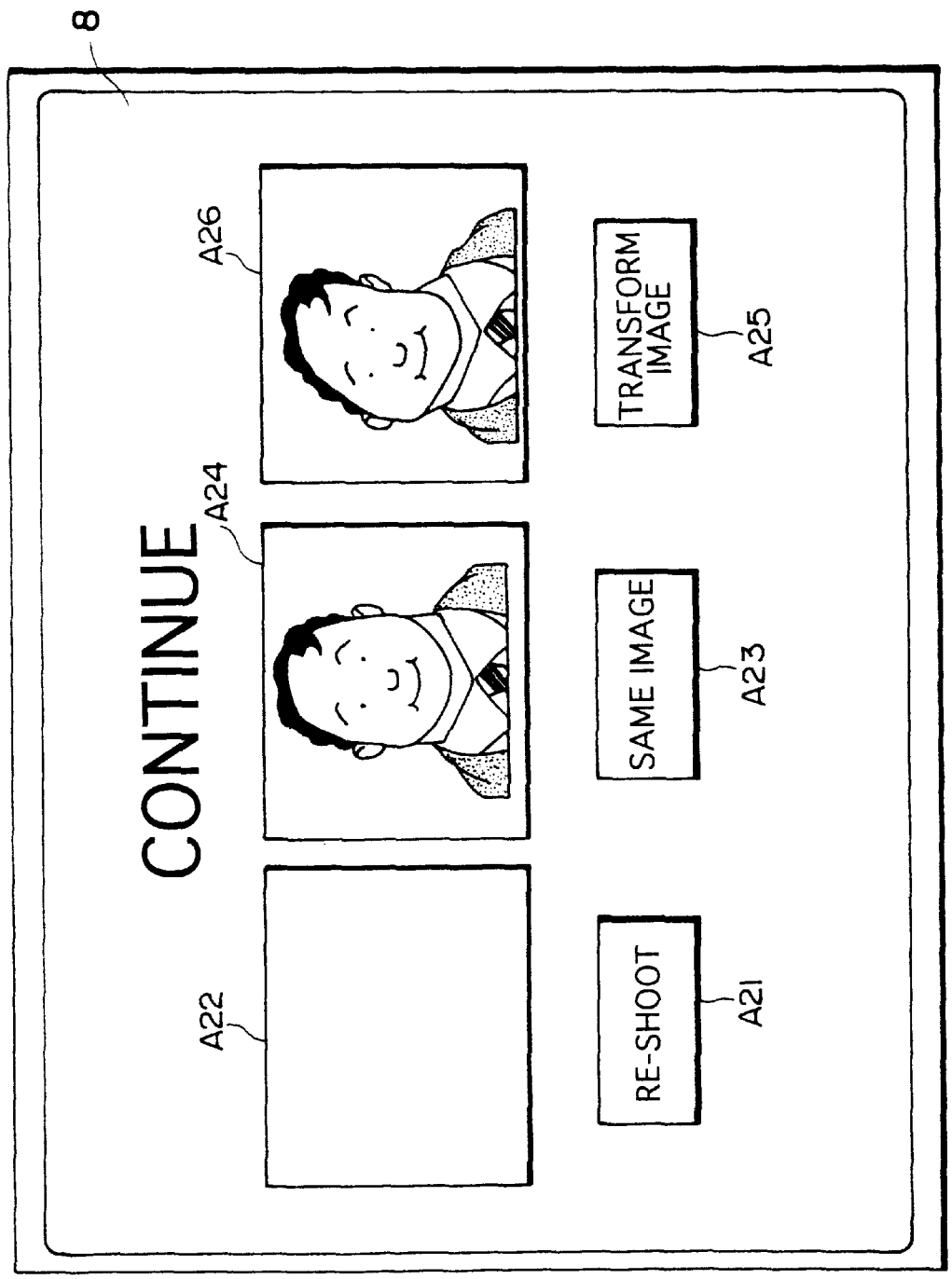
Figure 7:
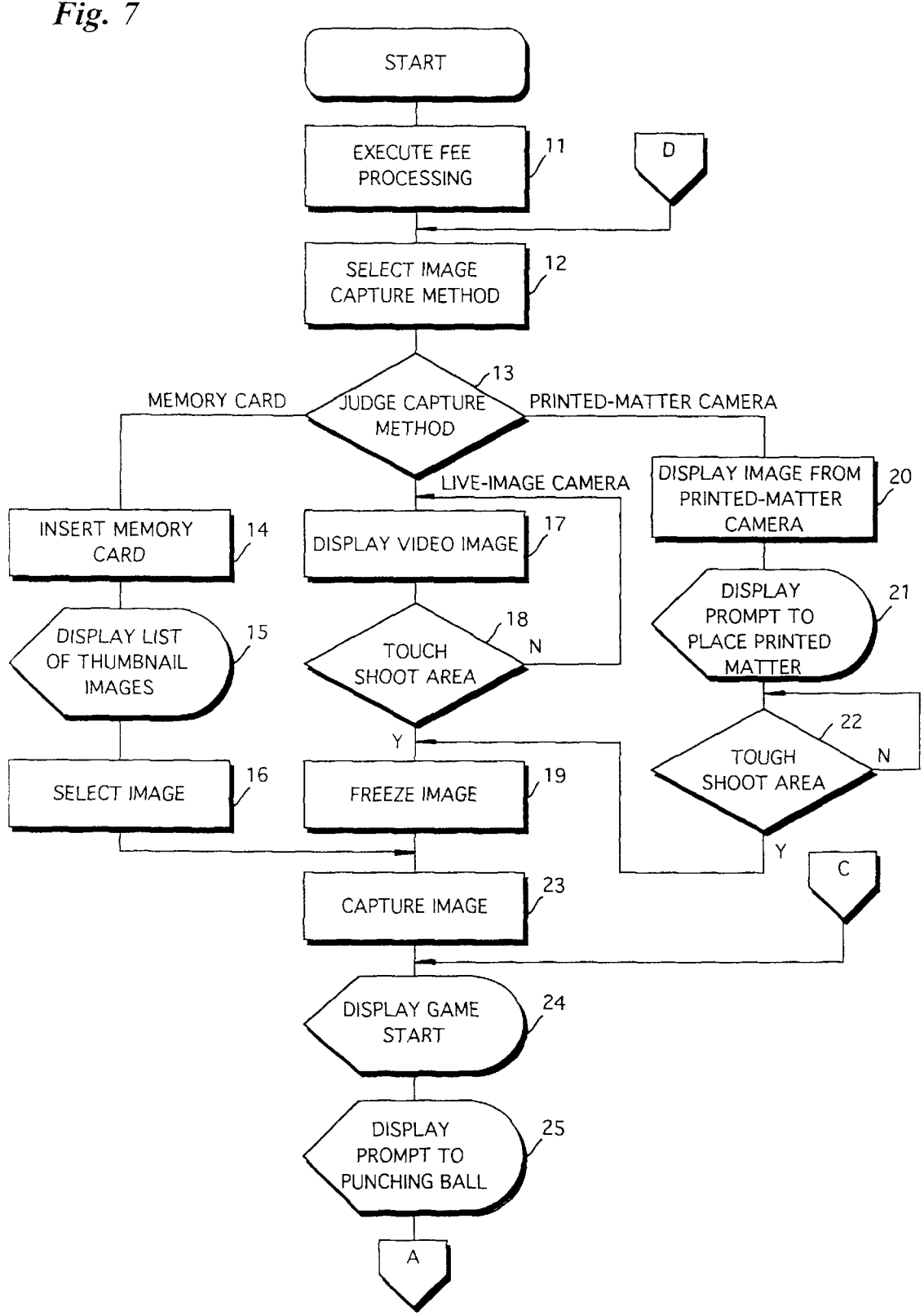
FIGS. 7 to FIG. 9 are flowcharts illustrating the processing procedure of a punching game machine.
Figure 8:
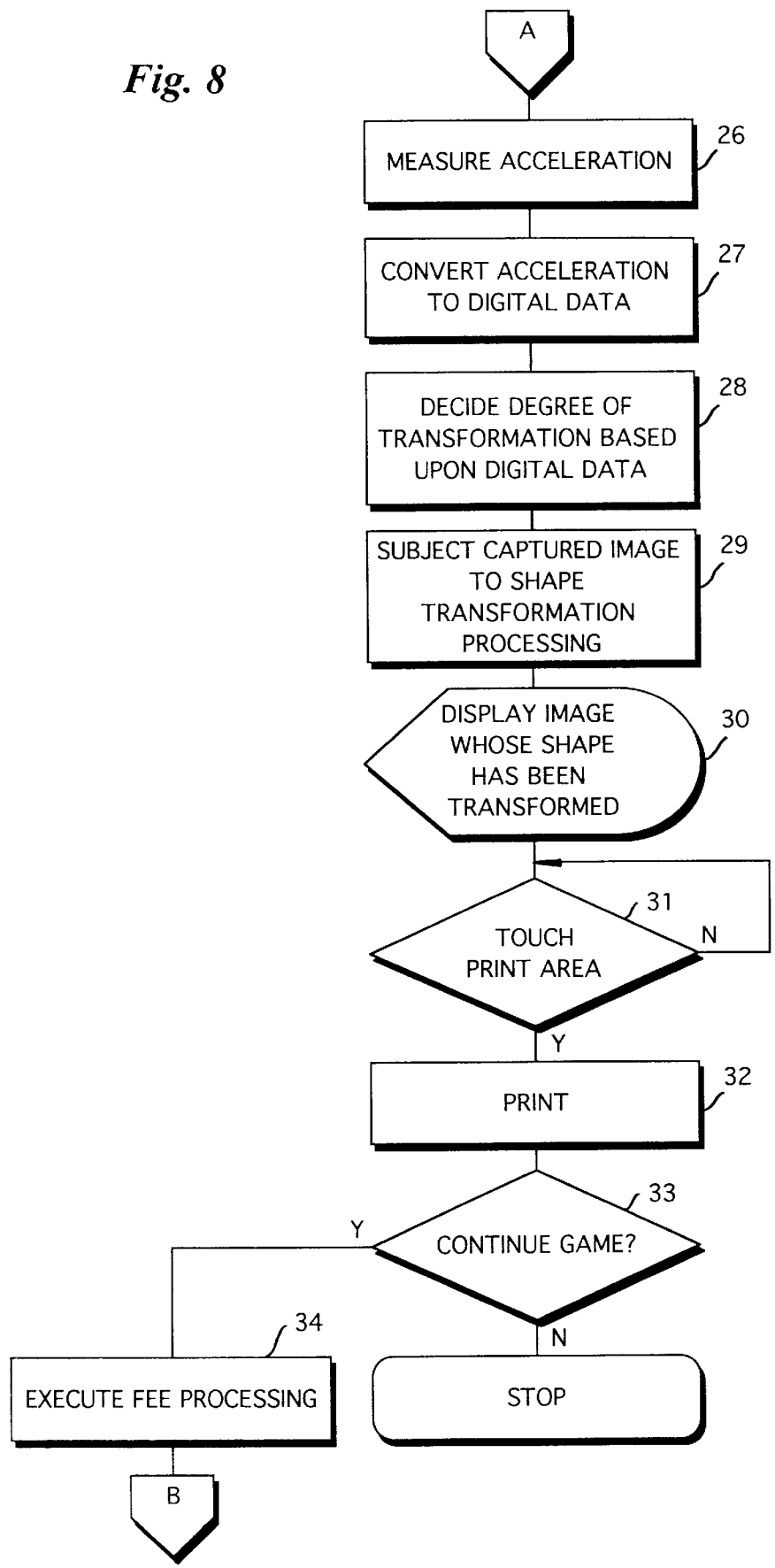
Figure 9:
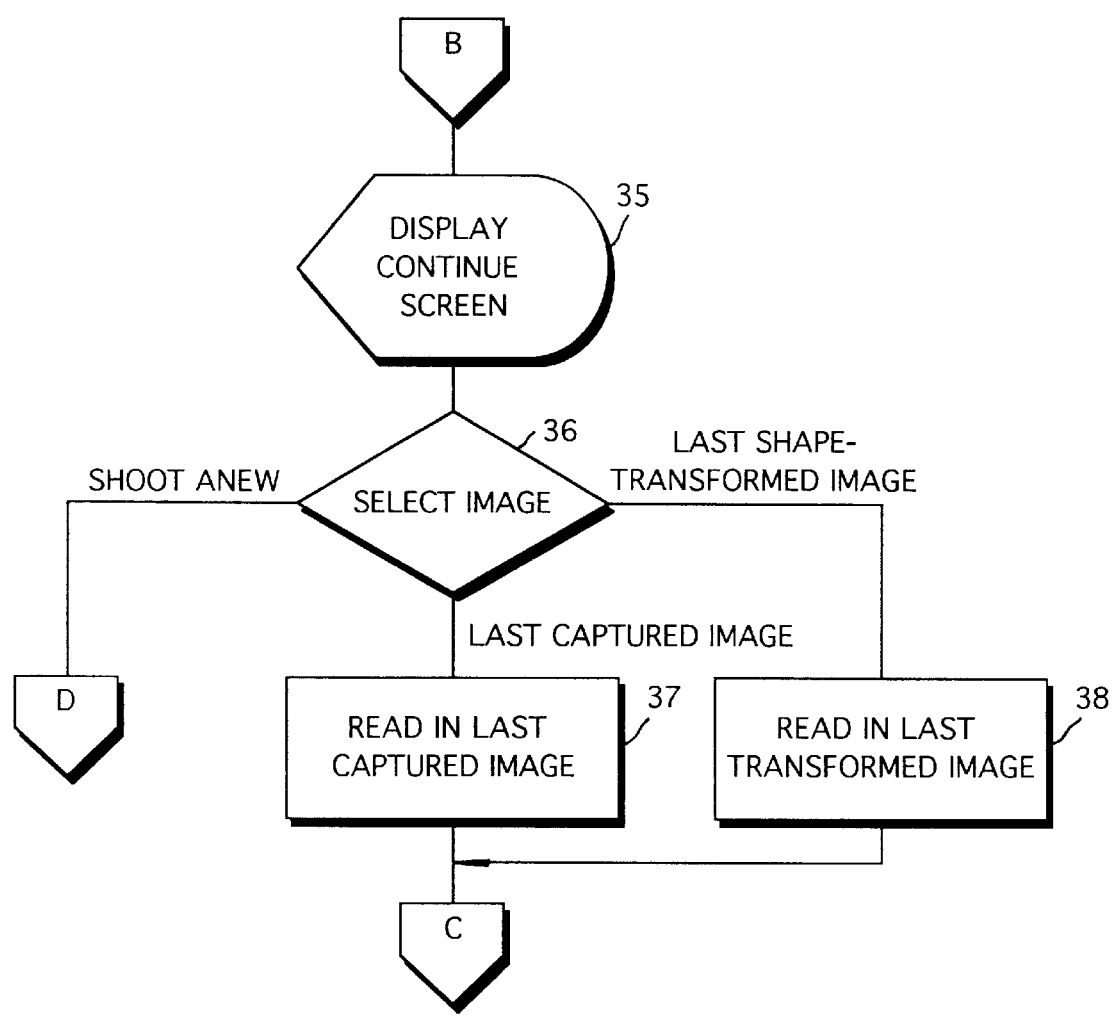

FIGS. 5 and 6 illustrate examples of the display screen 8, and FIG. 7 to FIG. 9 are flowcharts illustrating the processing procedure of the punching game machine.

A coin conforming to the fee for using the punching game machine is introduced by the player from the coin insertion slot 20. When the coin is introduced (step 11), the screen illustrated in FIG. 5 is displayed on the display screen.

The display screen includes the following areas:

Image display area A11:

This displays the captured image.

Punching-force display area A12:

This displays punching force, which is indicated by the length of a bar. Punching force is calculated based upon acceleration measured in response punching of the punching ball 1 by the player.

Shoot area A13:

This is an area touched by the player when the user wishes to freeze the image being shot by the camera 13 or 15.

Freezing area A14:

This is an area touched by the player when a shot image is to be frozen. More specifically, when a plurality of frames of images whose shapes have been transformed are displayed successively at different degrees of transformation, the freeze area A14 is touched when it is desired to freeze a desired transformed image.

Print area A15:

This is an area touched by the player when an image is to be printed.

Trimming area A16:

This is an area touched by the player when the position of a frozen image is adjusted. Four buttons including up, down, left and right are indicated in the trimming area A16. Touching any of the four buttons causes the captured image, which is being displayed in the image display area A11, to be moved in the direction indicated by the button touched.

Zoom area A17:

This is an area touched by the player when the captured image being displayed in the image display area A11 is to be enlarged or reduced in size. A minus button and a plus button are displayed in the zoom area A17. The captured image being displayed in the image display area A11 is reduced in response to the minus button being touched by the player and is enlarged in response to the plus button being touched by the player.

Live-image camera area A18:

This is an area touched by the player when the player is to be shot by the live-image camera 15 to capture the image of the player.

Printed-matter camera area A19:

This is an area touched by the player when the image of printed matter that has been placed on the table 14 is to be captured by the printed-matter camera 13.

Memory card area A20:

This is an area touched by the player when an image represented by image data that has been recorded on a memory card is to be captured.

Any of the areas A18, A19, A20 is touched by the player to select the image capture method (step 12). Which image capture method has been selected is determined (step 13) and processing conforming to the selected image capture method is executed.

If the area A20 is touched by the player, it is determined that an image represented by image data that has been stored on a memory card is to be captured and, as a result, an indication prompting the player to insert the memory card is displayed on the display screen 8. The player inserts the memory card into the memory-card insertion slot 10 in accordance with the display (step 14). Thumbnail images of the images represented by the image data recorded on the inserted memory card are displayed on the display screen 8 in the form of a list (step 15). If image data representing thumbnail images has been recorded on the memory card, the thumbnail images would be displayed in list form by reading out the thumbnail-image data. If thumbnail-image data has not been recorded on the memory card, then the image data would be downsampled by the CPU 4 to generate thumbnail-image data.

If a list of thumbnail images is displayed on the display screen 8, the player touches a desired one of these images to select the image (step 16). Image data representing the selected image is read out of the memory card (image capture; step 23).

If area A18 is touched by the player, shooting of the player standing in front of the punching game machine is started by the live-image camera 15. The image of the player shot is displayed in the image display area A11 of display screen 8 (step 17). If the shoot area A13 is touched by the player (step 18), the image of the player shot is frozen at the moment the area A13 is touched and the frozen image is displayed in the image display area A11 (step 19). The image data representing the frozen image is stored in the memory 17 (image capture; step 23).

If the area A19 is touched by the player, the table 14 for printed matter is shot by the printed-matter camera 13 (step 20). A prompt to place printed matter on the table 14 is then displayed on the display screen 8 (step 21).

If the area A13 is touched by the player (step 22), the image of the printed matter shot when the was touched is frozen and displayed in the image display area A11. The image data representing the frozen image is stored in the memory 17 (image capture; step 23).

When image capture ends, a prompt to start the game is displayed on the display screen 8 (step 24) followed by a prompt instructing the player to punch the punching ball 1 (step 25).

If the player punches the punching ball 1, the ball 1 is knocked backward forcefully. The acceleration at which the punching ball 1 is punched is measured by the acceleration sensor 2A (step 26) and the acceleration sensor 2A outputs a signal representing the acceleration. This signal is converted to digital acceleration data by the analog/digital conversion circuit 3 (step 27) and data is input to the CPU 4.

The degree of the transformation in shape is decided, as shown in FIG. 3, based upon the digital acceleration data (step 28). On the basis of decided degree of transformation, the captured image is subjected to processing which transforms the shape of the image, as shown in FIG. 4 (step 29). This processing for transforming shape may be executed by texture mapping to polygons or by transforming the shape of the captured image using a numerical value, which represents the shape transformation of the image, as the parameter of a transformation function. Data representing the captured image that has been transformed in shape is stored temporarily in the memory 17.

The captured image that has been transformed in shape is displayed in the image display area A11 of display screen 8 (step 30). Further, the punching force is calculated based upon acceleration and the calculated punching force is displayed in the area A12. Moreover, sound effects (a scream, etc.) that have been stored on the hard disk are read out of the hard disk and output from the speakers 18. If area A15 is touched by the player, the captured image that has been transformed in shape is printed by the printer 11 (step 32) and the printout is extracted from the extraction port 12.

When printing is finished, a selection screen (not shown) allowing the player to continue or end the game is displayed on the display screen 8. The game ends when the player selects end of game on this selection screen. If the player selects to continue the game using the selection screen, an indication to the effect that a fee is required is displayed on the display screen 8. The player inserts a coin conforming to the additional fee into the coin insertion slot 20 in accordance with the display. When the coin conforming to the additional fee is inserted into the coin insertion slot 20 (step 34), the display screen 8 changes to a CONTINUE screen shown in FIG. 6 (step 35).

This screen has the following areas:

Re-shoot area A21:

This is an area touched by the player when an image is to be captured anew and the shape of the newly captured image is to be transformed.

Re-shot-image display area A22:

This area displays the newly recaptured image.

Same-image display area A23:

This is an area touched by the player when the shape of the image captured last is to be transformed.

Same-image display area A24:

This area displays the image captured last.

Transform-image area A25:

This is an area touched by the player when the shape of the image transformed last is to be transformed further.

Transformed-image display area A26:

This area displays the image transformed last.

By touching any of the areas A21, A23, A25, the player selects the image that is the object of shape transformation (step 36).

The processing from step 12 onward is repeated if area A21 is touched.

If area A23 is touched, the image captured last is read in from the memory 17 (step 37), after which processing is repeated from step 24.

If area A25 is touched, the last shaped-transformed image is read in from the memory 17 (step 38), after which processing is repeated from step 24. Thus the shape of the last transformed image can be transformed further and displayed (and printed if necessary).

In the embodiment described above, the degree of shape transformation is decided from the measured acceleration and the image data representing the captured image is subjected to shape transformation processing in such a manner that the shape of the image will be transformed to the degree decided. However, an arrangement can be adopted in which an image-processing description file describing the shape transformation processing of the image data is created and stored in the memory 17 in advance and the image transformation processing is executed by referring to this image-processing description file.

FIG. 10 is a diagram showing the file structure of an image-processing description file.

The image-processing description file includes a header, default output, layer list, layer data, layer-specific data, etc.

FIG. 11 shows the details of the header. Header information such as management information and data representing the version number of the image-processing description file are stored in the header.

FIG. 12 shows the details of the default output. Stored in the default output are data representing the size (width and height) of an image when an image whose shape has been transformed is printed and output, output-type data representing the size of printing paper, data indicating whether the direction of output is portrait or landscape, and data representing the background color of the shape-transformed image to be printed.

FIG. 13 illustrates the details of the layer list. Layer information (Layer Info) and data representing the number of items of this layer information (the number of layers) are stored in the layer list. (In the example shown in FIG. 10, five types of layer information have been stored in the layer list.)

Stored in the layer information are a pointer to layer data; layer name (in this case a shape-transformation layer for processing to transform the shape of an image, wherein layer names indicating different degrees of shape transformation have been stored in conformity with the five degrees of shape transformation shown in FIG. 3); display order (indicates display order of priority in a case where a plurality of shape-transformed images are superimposed and displayed); a substitution possible/impossible flag (a sample image has been stored in advance; this flag indicates whether the stored sample image can be substituted); and a substitution number.

FIG. 14 illustrates the details of layer data and layer-specific data (layer-dependent information). Though two items of layer data and two items of layer-specific data are illustrated in FIG. 14, it goes without saying that five items of layer data and five items of layer-specific data have been stored in the image-processing description file.

Layer data includes a pointer to layer-dependent information; a transparency mask pointer (this is a pointer to transparency mask data, which indicates the degree of transparency of the color of superimposed shaped-transformed images, when a plurality of images whose shapes have been transformed are displayed in superimposed form), and a position information pointer representing information indicative of the position of an image whose shape has been transformed.

Stored in the layer-specific data are the layer category (here the shape-transformation layer is indicated), the format of the captured image, a pointer to the captured image, and data representing the maximum and minimum values of a layer parameter.

When an image-processing description file of this kind has been stored in the memory 17 of the punching game machine, a captured image is subjected to shape transformation processing in the manner described below (this is the processing of steps 28 and 29).

Figure 15:
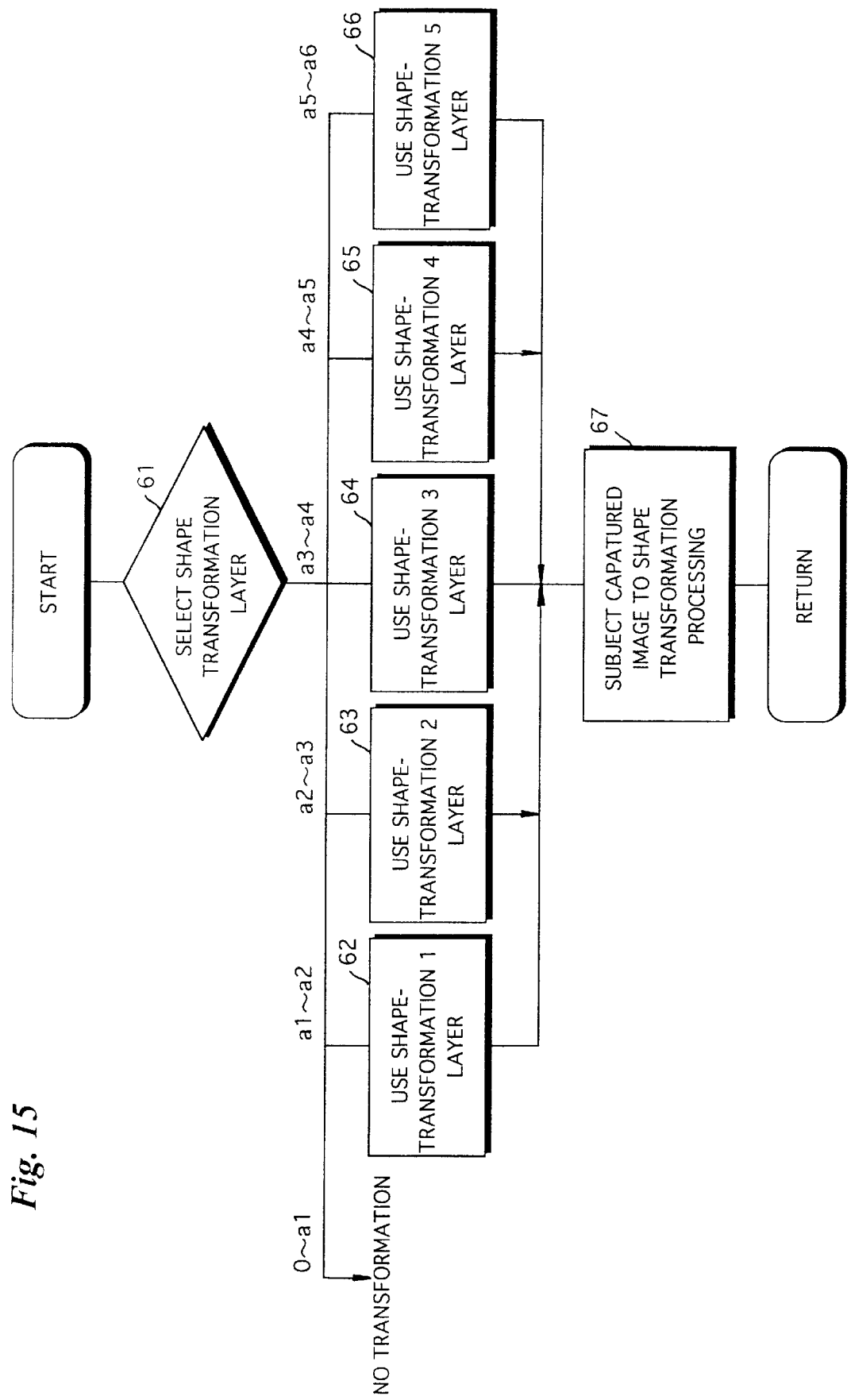
FIG. 15 is a flowchart illustrating the procedure of image shape transformation processing.

FIG. 15 is a flowchart showing the procedure of shape transformation processing.

Processing for selecting the shape transformation layer is executed before processing for transforming the shape of an image (step 61). When acceleration sensed in the manner described above is between 0 and a1, processing for selecting a shape transformation layer is not executed because processing for transforming the shape of a captured image is not executed. Shape transformation layer 1 is selected (step 62) when acceleration is between a1 and a2; transformation layer 2 (step 63) when acceleration is between a2 and a3; transformation layer 3 (step 64) when acceleration is between a3 and a4; transformation layer 4 (step 65) when acceleration is between a4 and a5; and transformation layer 5 (step 66) when acceleration is between a5 and a6.

In any case, when a shape transformation layer is selected, a sample image stored in advance (such an image has been stored in advance) and an image that has been captured are interchanged. The captured image is subjected to shape transformation processing to a degree of shape transformation specified by the shape transformation layer that has been selected (step 67).

Figure 16:
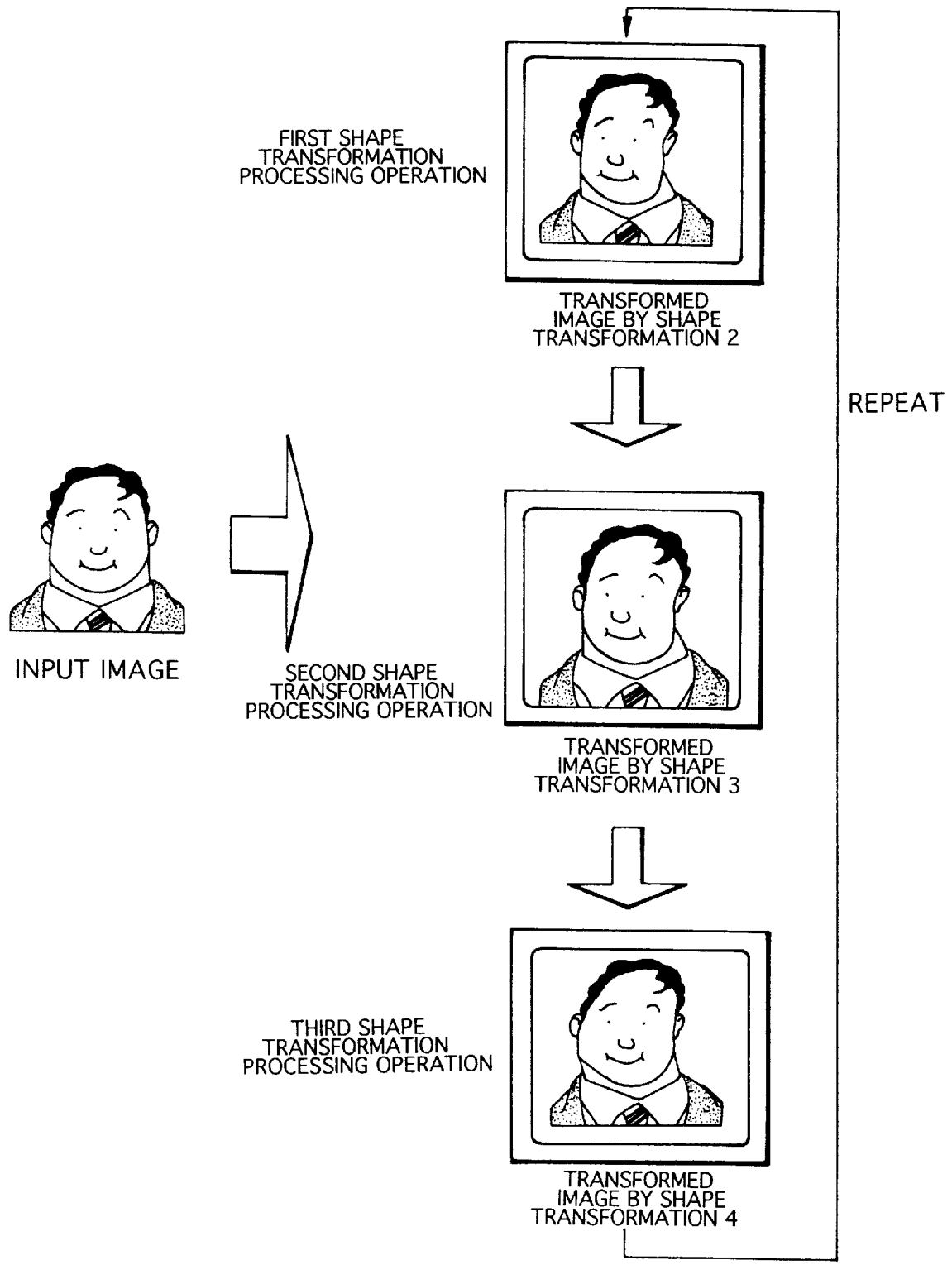
FIG. 16 illustrates the manner in which the shape of a captured image is transformed.
Figure 17:
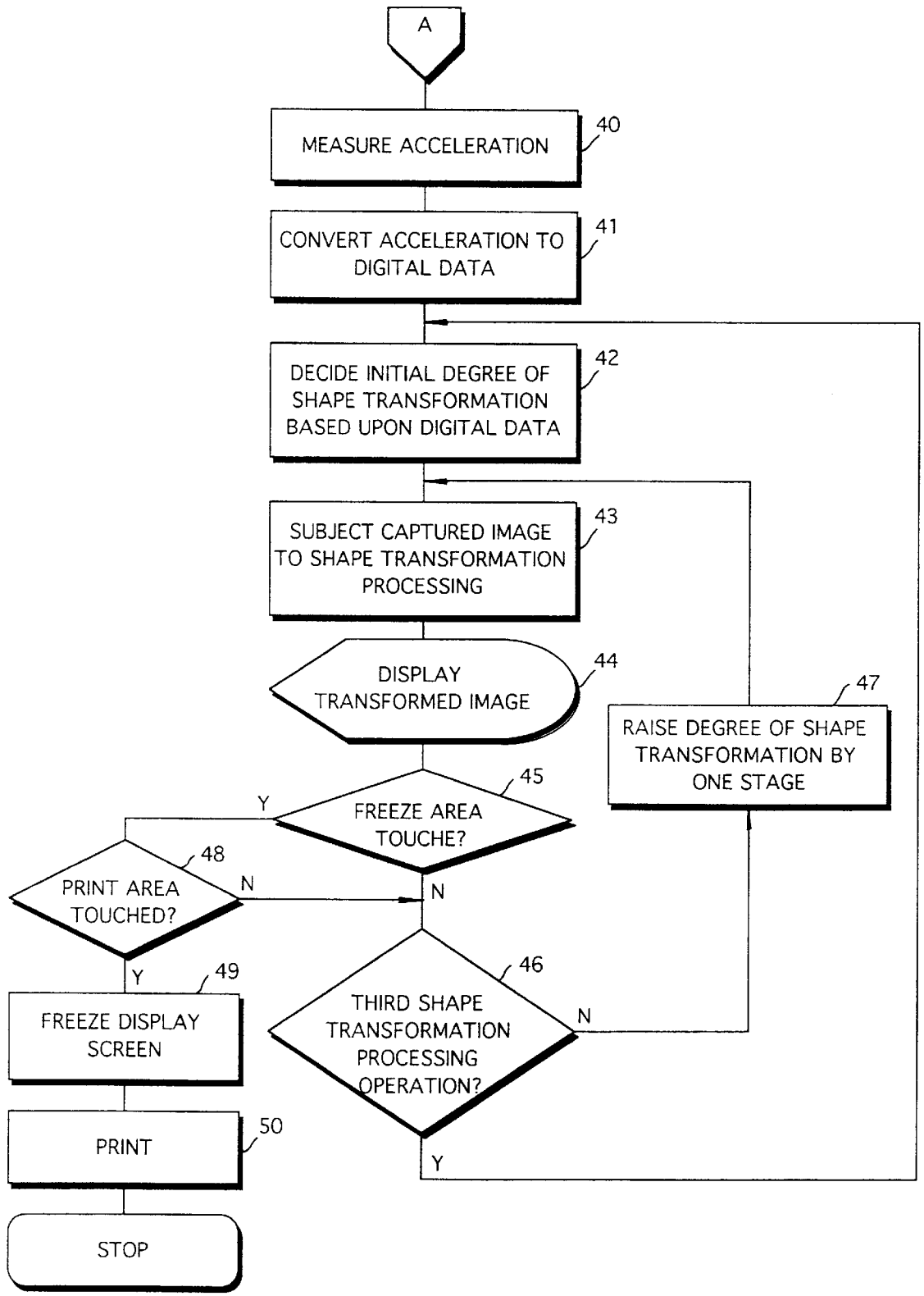
FIG. 17 is a flowchart showing part of the processing procedure of a punching game machine.

FIG. 16 illustrates the manner in which the shape of a captured image is transformed, and FIG. 17 is a flowchart showing part of the processing procedure of the punching game machine.

In the embodiment described above, a degree of shape transformation of one type is decided based upon measured acceleration, and the shape of a captured image is transformed to this degree of shape transformation of one type. In the example shown in FIGS. 16 and 17, the degree of shape transformation changes over a plurality of stages and transformed images are displayed on the display screen 8 successively per each transformation of the plurality of stages.

When acceleration is sensed by the acceleration sensor 2A, the acceleration is converted to digital acceleration data by the digital/analog conversion circuit 19 (step 41), the degree of shape transformation is decided based upon the digital acceleration data resulting from the conversion (step 42), and a captured image is transformed in shape in accordance with the degree of shape conversion decided (step 43). As a result, a first shape transformation processing operation is carried out and the image whose shape has been transformed is displayed on the display screen 8 (step 44) If the freeze area A14 is touched ("YES" at step 45), then the image being displayed on the display screen 8 at this time is frozen.

If the freeze area A14 is touched ("YES" at step 45) and, moreover, the print area A15 is touched ("YES" at step 48), then the image being displayed on the display screen 8 when the area A15 is touched is frozen (step 49). It goes without saying that the image being displayed on the display screen may be frozen at the moment the freeze area A14 is touched. The image is then printed by the printer 11 (step 50).

If freeze area A14 is not touched ("NO" at step 45) and shape transformation processing has not reached the third time ("NO" at step 46), the shape of the captured image is transformed using the next largest degree of shape transformation (steps 47, 43, 44). The processing of steps 43, 44 and 47 is repeated until shape transformation processing is carried out a third time.

If the freeze area A14 is not touched even when shape transformation processing reaches the third time ("YES" at step 46), control returns to the processing of step 42. As a result, shape transformation processing is repeated starting from the beginning.

Figure 18:
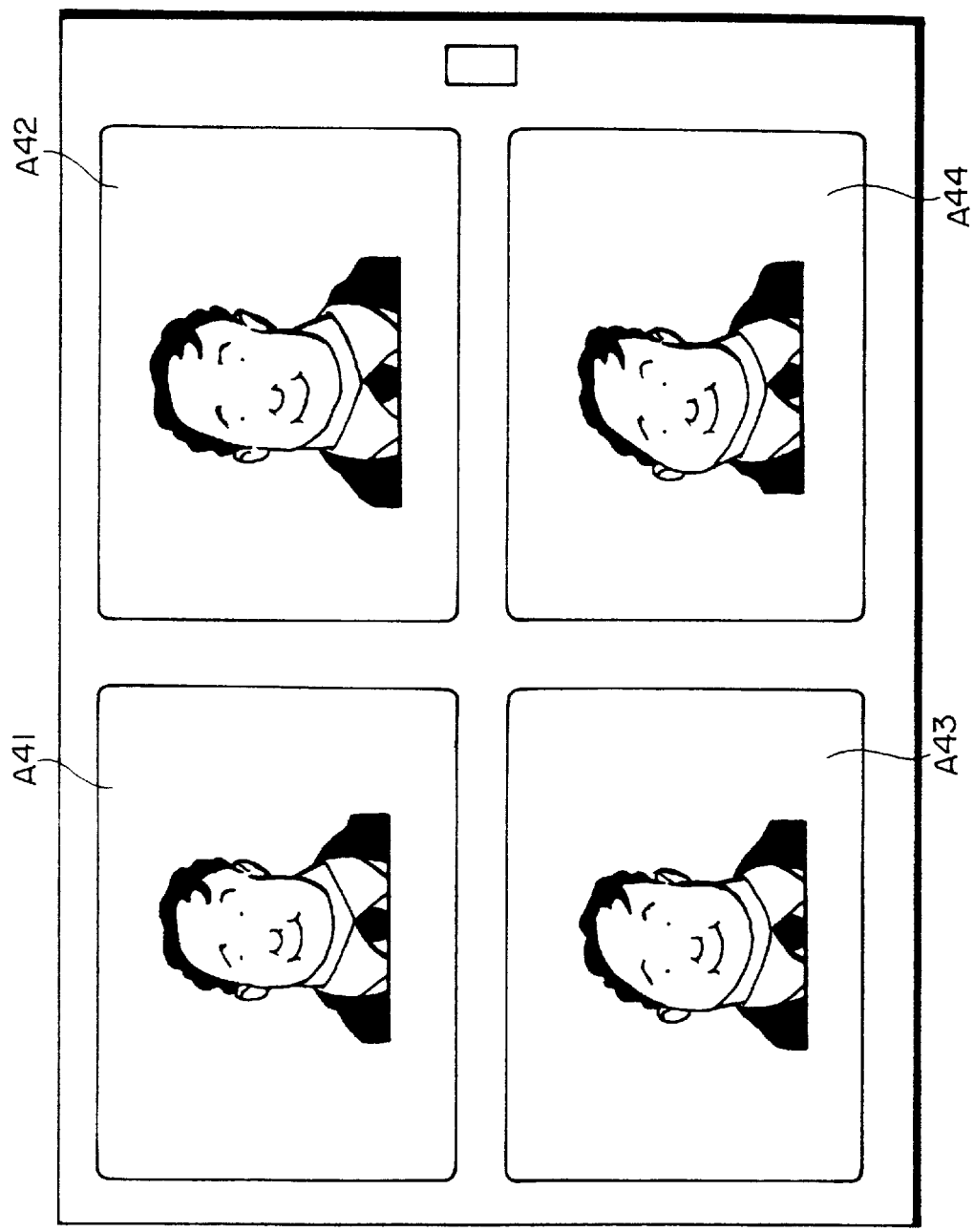
FIG. 18 shows an example of printed matter that has been printed by a punching game machine.

FIG. 18 shows the manner in which images have been printed on a seal.

As shown in FIG. 18, four areas A41, A42, A43 and A44 are formed on a seal S. Images whose shapes have been transformed to four different degrees of shape transformation have been printed in respective ones of the four areas A41 to A44. An image whose shape has been transformed to the degree of Transformation Level 1 has been printed in the first area A41, an image whose shape has been transformed to the degree of Transformation Level 2 has been printed in the second area A42, an image whose shape has been transformed to the degree of Transformation Level 3 has been printed in the third area A43, and image whose shape has been transformed to the degree of Transformation Level 4 has been printed in the fourth area A44.

Figure 19:
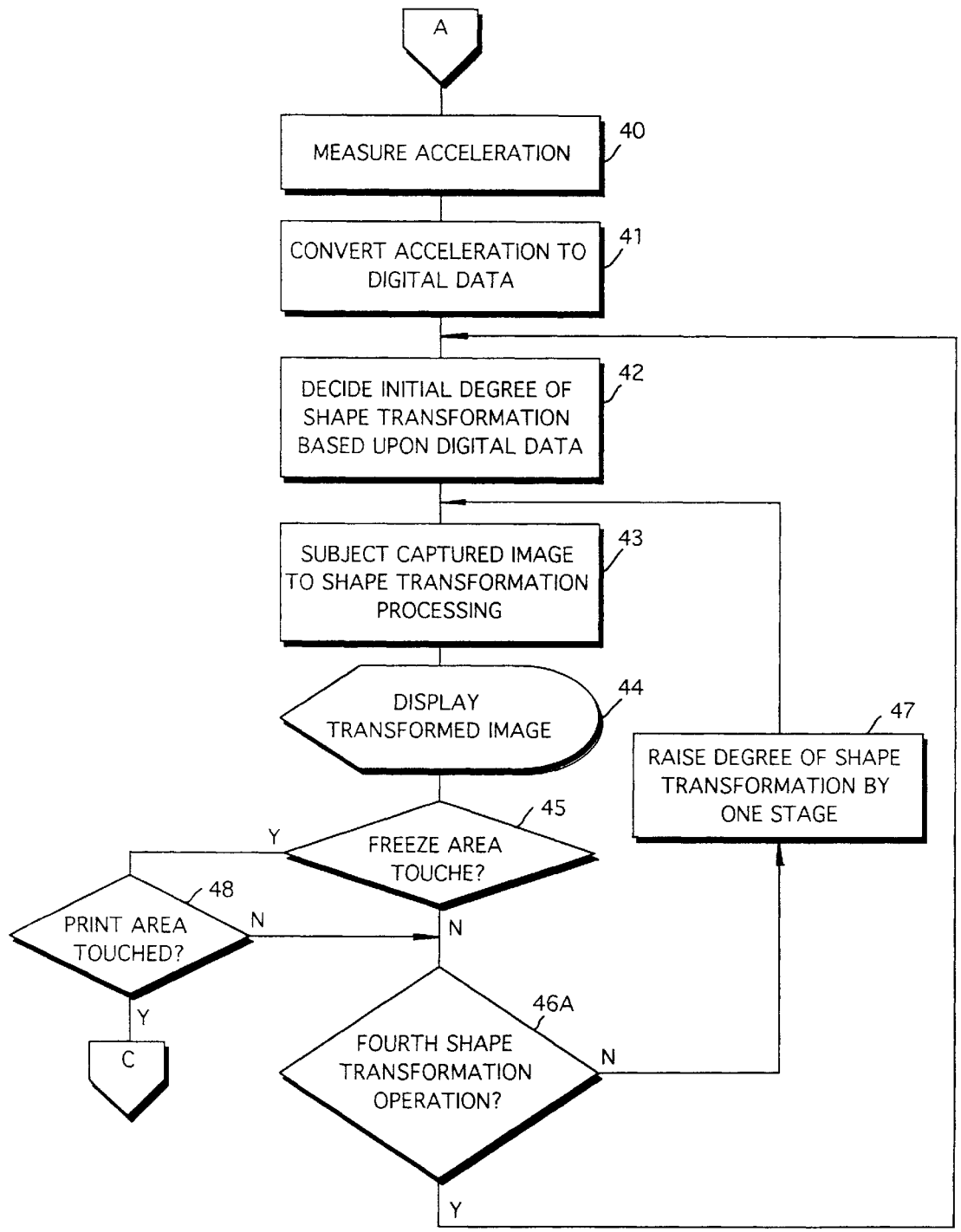
FIGS. 19 and 20 are flowcharts showing the processing procedure of the punching game machine.
Figure 20:
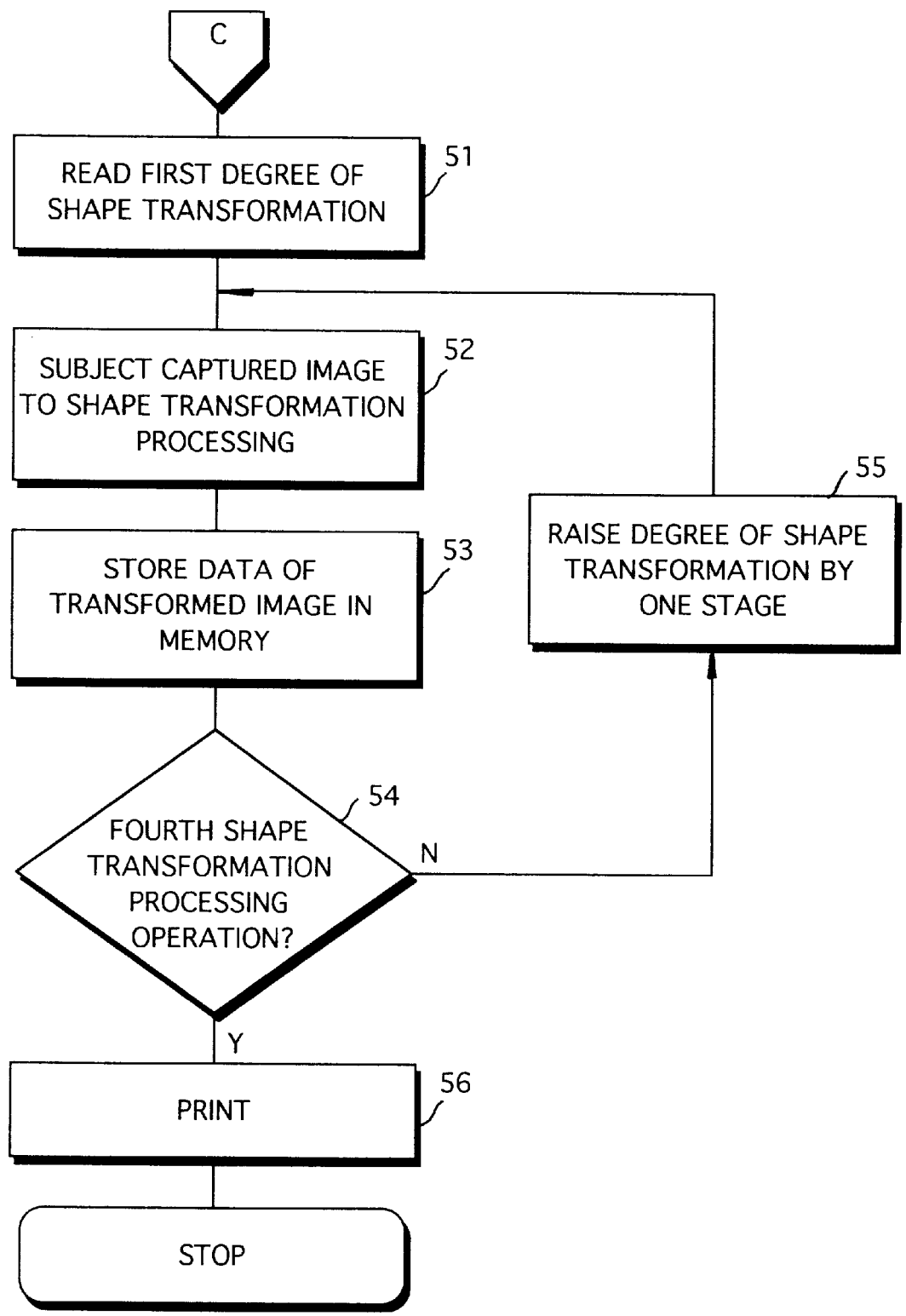

FIGS. 19 and 20 are flowcharts showing part of the processing procedure of the punching game machine. The printed images shown in FIG. 18 are obtained on the basis of the processing procedure shown in FIGS. 19 and 20. Processing steps identical with those shown in FIG. 17 are designated by like step numbers and are not described again.

In the processing shown in FIG. 17, shape transformation processing having a different degree of shape transformation is executed three times (the processing of step 46 in FIG. 17). In the processing shown in FIG. 19, shape transformation processing having a different degree of shape transformation is executed four times (step 46A of FIG. 19). Images having four stages of shape transformation are displayed on the display screen 8 in successive fashion.

If the freeze area A14 is touched by the player ("YES" at step 45) and, moreover, the print area A15 is touched ("YES" at step 48), the first degree of shape transformation that was decided at step 42 is read (step 51).

The shape transformation processing having the degree of shape transformation read is applied to the captured image (step 52). Image data representing the image that has been subjected to shape transformation processing is stored temporarily in the memory 17 (step 53). Until shape transformation processing has been performed four times (step 54), shape transformation processing is repeated raising the degree of shape transformation one step at a time (step 55).

Image data representing a transformed image is stored temporarily in the memory 17 whenever shape transformation processing is executed. Thus, what is stored temporarily in the memory 17 is image data representing a first degree of shape transformation; image data representing an image whose shape has been transformed to a second degree of shape transformation higher by one step than the first degree of shape transformation; image data representing an image whose shape has been transformed to a third degree of shape transformation higher by one step than the second degree of shape transformation; and image data representing an image whose shape has been transformed to a fourth degree of shape transformation higher by one step than the third degree of shape transformation.

When shape transformation processing is performed four times, images having different degrees of shape transformation will be printed in four different areas, as illustrated in FIG. 18 (step 56).

FIGS. 21 to 29 illustrate another embodiment of the present invention.

Figure 21:
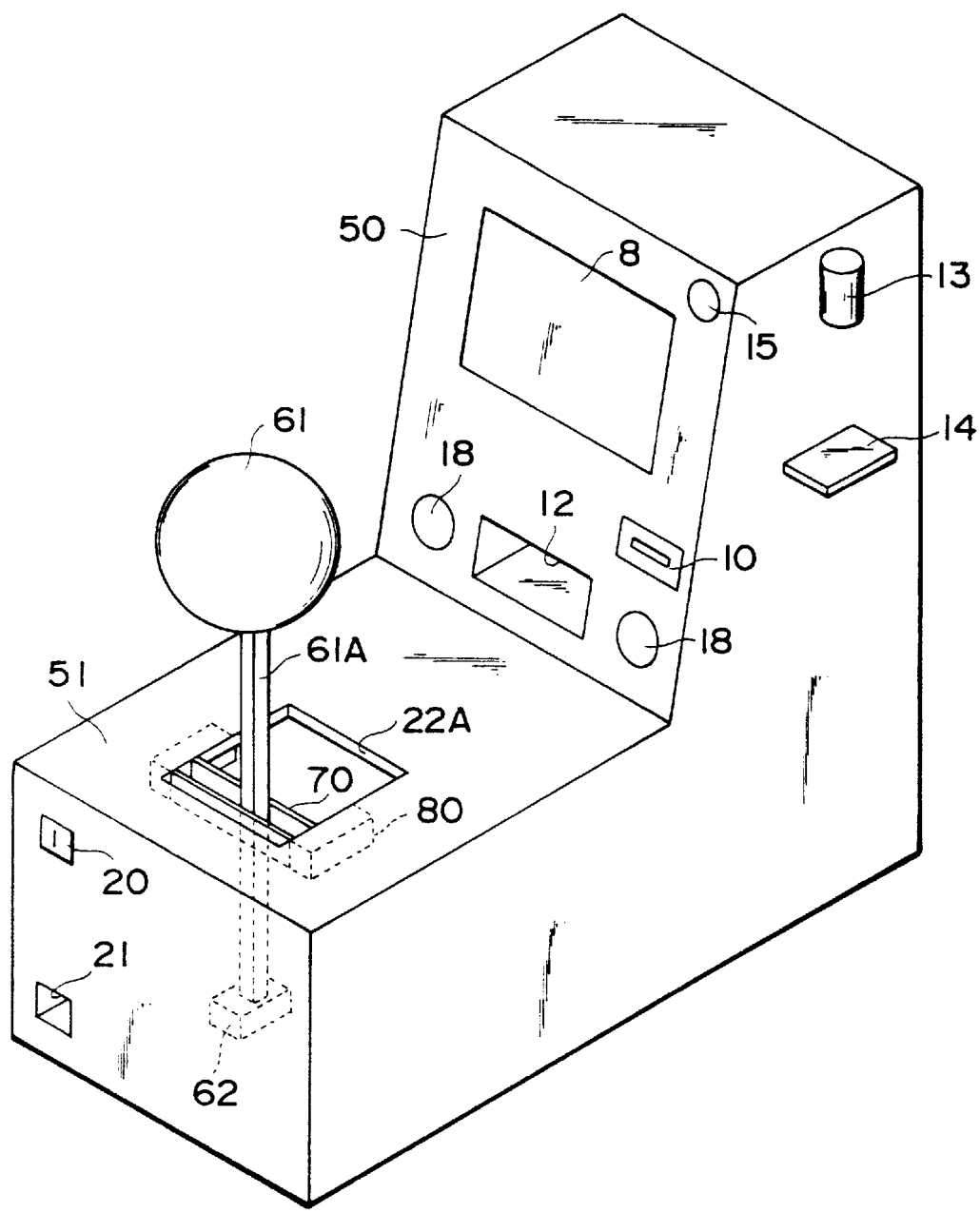
FIG. 21 is a perspective view showing the appearance of a punching game machine in another embodiment.
Figure 22:
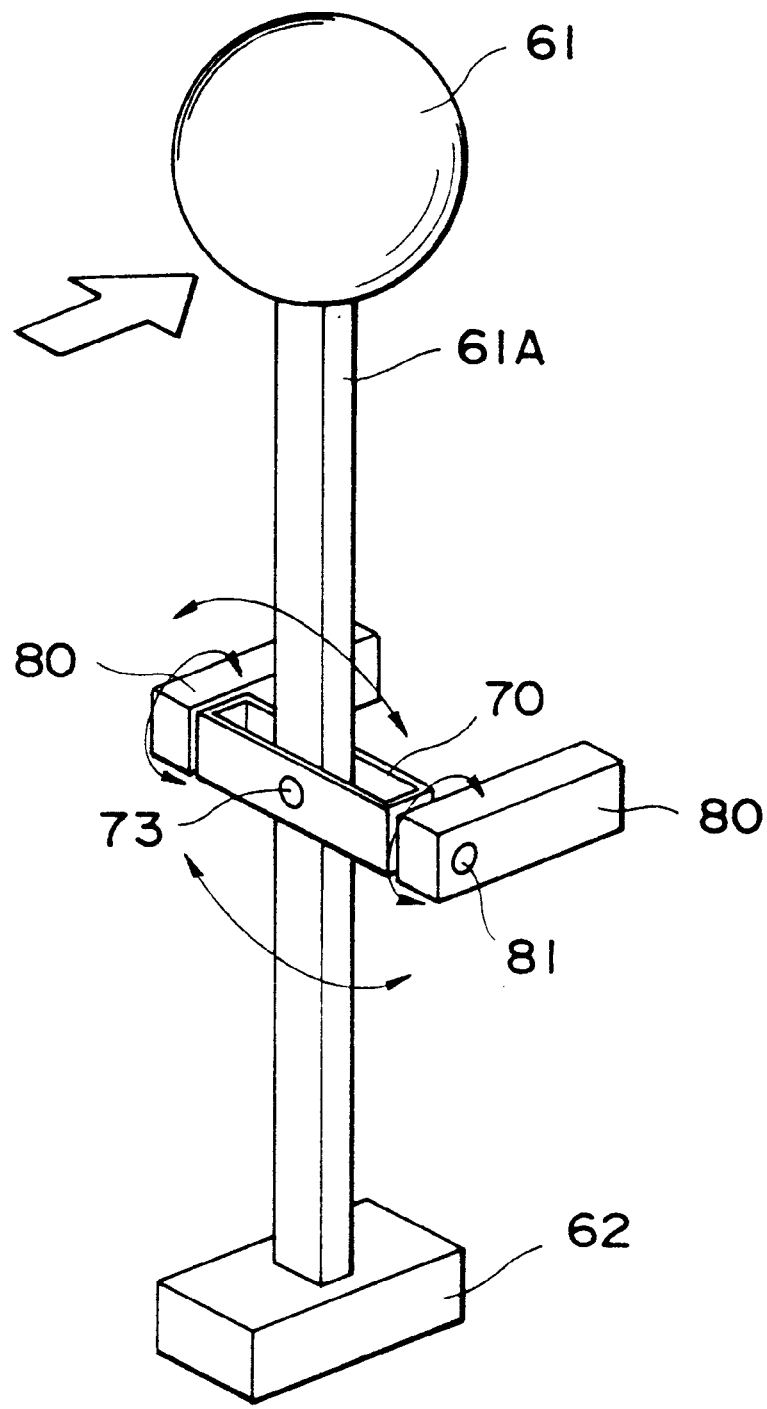
FIG. 22 illustrates the support structure of a punching ball in this embodiment.
Figure 23:
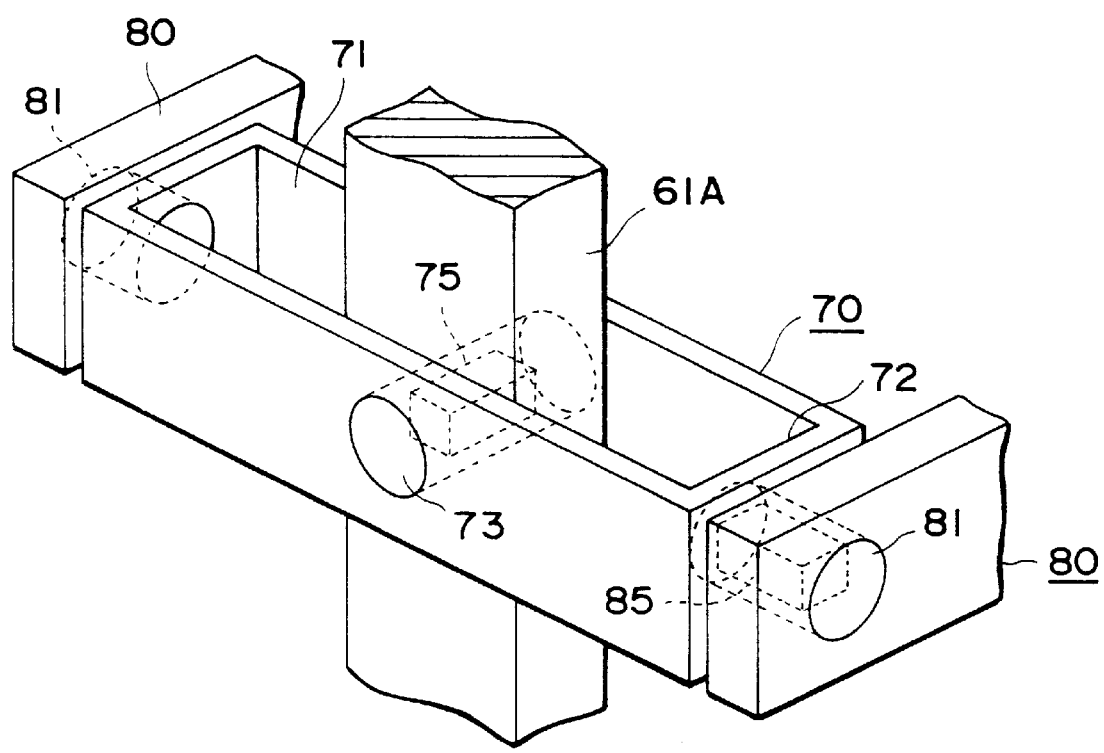
FIG. 23 illustrates part of the support structure of the punching ball in this embodiment.

FIG. 21 is a perspective view of a punching game machine. Unlike the punching ball 1 in the punching game machine shown in FIG. 1, in which the ball moves only back and forth, a punching ball 61 shown in FIG. 21 moves to the left and right as well as back and forth. FIGS. 22 and 23 illustrate part of the structure of the punching game machine shown in FIG. 21.

A substantially square opening 22A is formed in the horizontal portion 51 of the punching game machine. A support rod 61A protrudes from the opening 22A and has an upper end to which the punching ball 61 is secured. A weight 62 for returning the punching ball 61 to the initial position is secured to the lower end of the support rod 61A.

The support rod 61A is freely rotatably attached substantially at its mid-point to a mounting member 70 by a first rotary shaft 73. The mounting member 70 extends horizontally across the lower part of the opening 22A. The mounting member 70 has a hollow portion 71 in the approximate mid-point of which the support rod 61A is fit. Thus the punching ball 61 is supported so as to be free to move transversely.

The mounting member 70 has side walls 72 in the transverse direction. A second rotary shaft 81 is passed through each side wall 72. The mounting member 70 is freely rotatably attached to arms 80 by the second rotary shafts 81. The upper surface of each arm 80 is secured to the underside of the horizontal portion 51. By thus freely rotatably attaching the mounting member 70 to the arms 80, the punching ball 61 is capable of moving in the depth direction.

The first rotary shaft 73 has a built-in first angular velocity sensor 75. The first angular velocity sensor 75 measures a first angular velocity formed when the support rod 61A (punching ball 61) is moved transversely. The transverse acceleration of the punching ball 61 is calculated based upon the first angular velocity.

The second rotary shaft 81 has a built-in second angular velocity sensor 85. The second angular velocity sensor 85 measures an angular velocity of the mounting member 70 formed when the mounting member 70 is rotated. In other words, a second angular velocity formed when the support rod 61A (punching ball 61) is moved in the depth direction is measured. The acceleration of the punching ball 61 in the depth direction is calculated based upon the second angular velocity.

Figure 24:
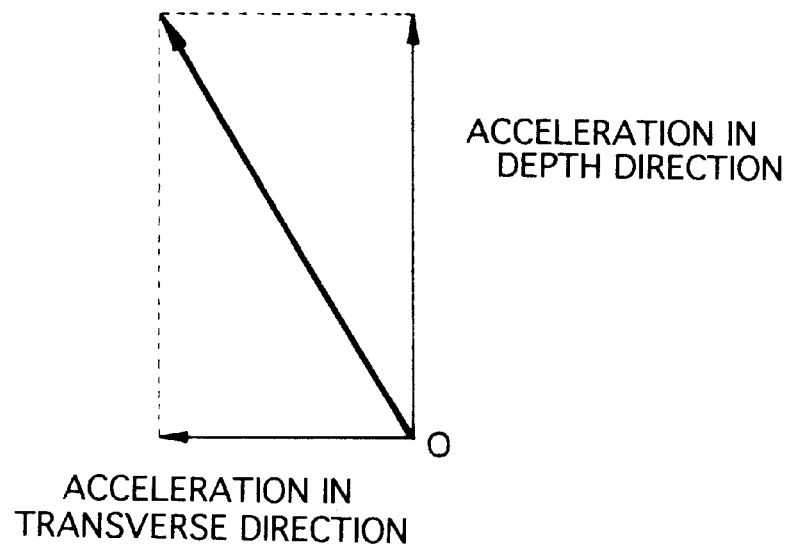
FIG. 24 illustrates the relationship between acceleration in the transverse direction and acceleration in the depth direction.

Resultant acceleration is calculated from acceleration in the depth direction and acceleration in the transverse direction in the manner shown in FIG. 24.

Figure 25:
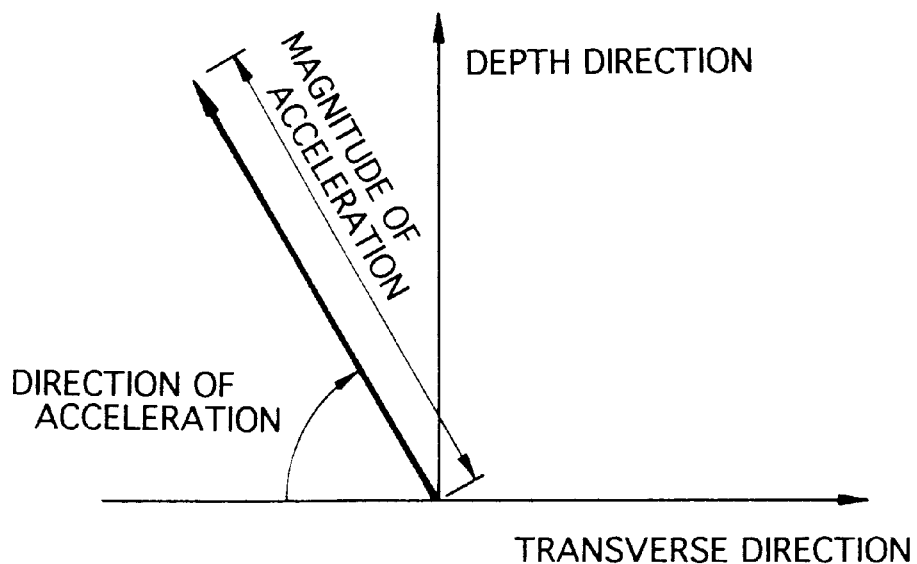
FIG. 25 illustrates the direction and magnitude of measured acceleration.

As shown in FIG. 25, the calculated resultant acceleration is treated as the magnitude of acceleration, and the direction of acceleration is calculated from the vector of this resultant acceleration.

When the resultant acceleration (magnitude of acceleration) and direction of acceleration are thus calculated, shape transformation processing is decided based upon the calculated resultant acceleration and direction of acceleration.

Figure 26:
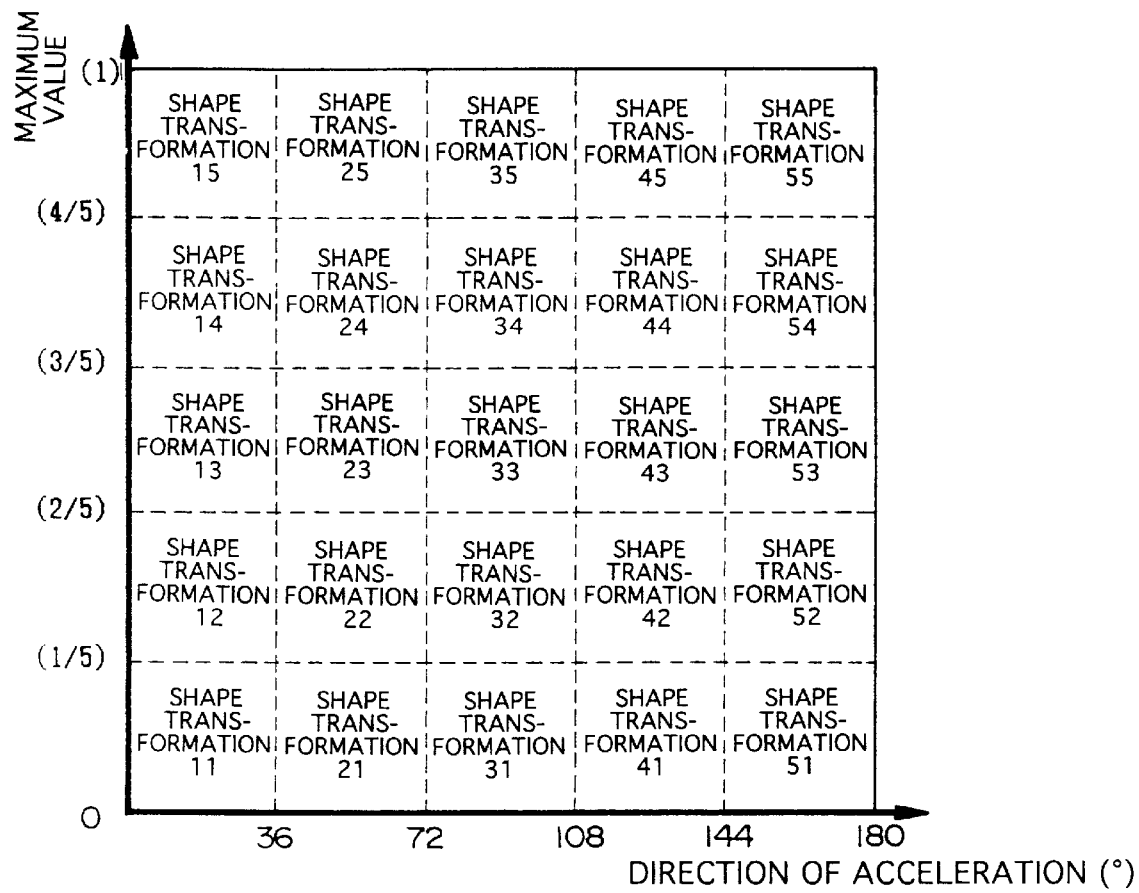
FIG. 26 illustrates the relationship among magnitude of acceleration, direction of acceleration and shape transformation processing.
Figure 27:
FIG. 27 illustrates an example of a captured image.
Figure 28A:
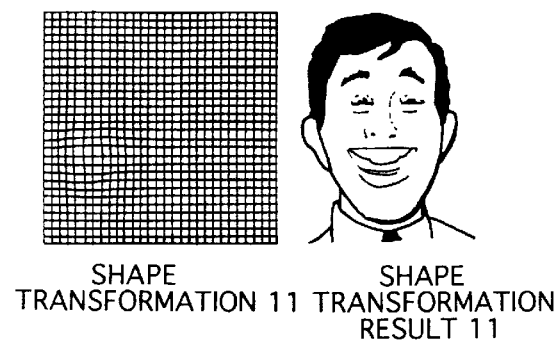
FIGS. 28a to 28e and FIGS. 29a to 29e illustrate methods of shape transformation and images resulting from such transformation.
Figure 28B:
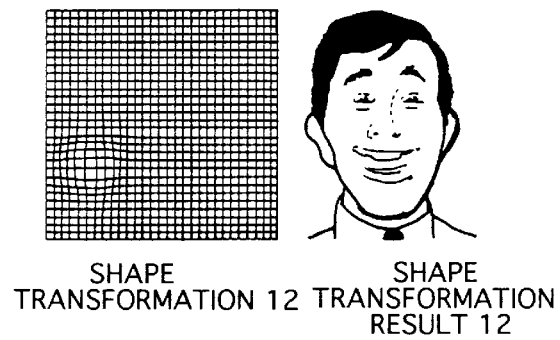
Figure 28C:
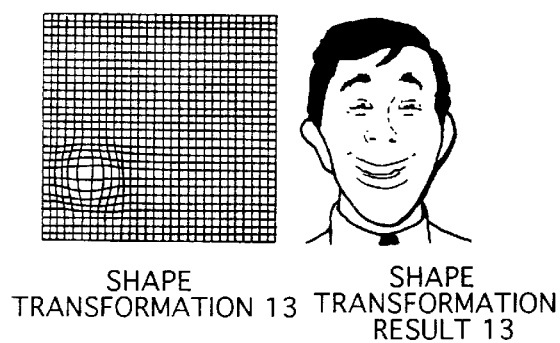
Figure 28D:
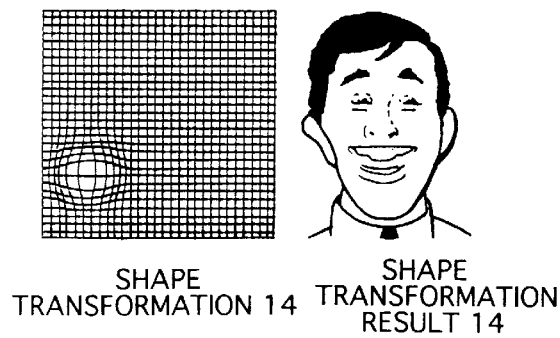
Figure 28E:
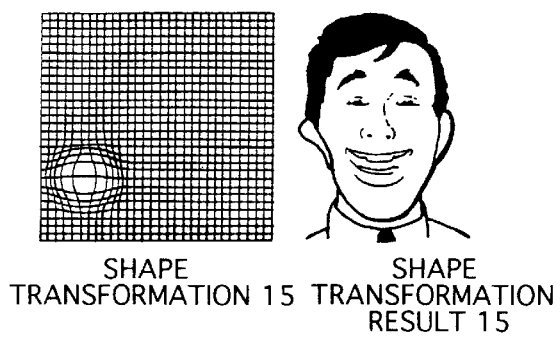
Figure 29A:
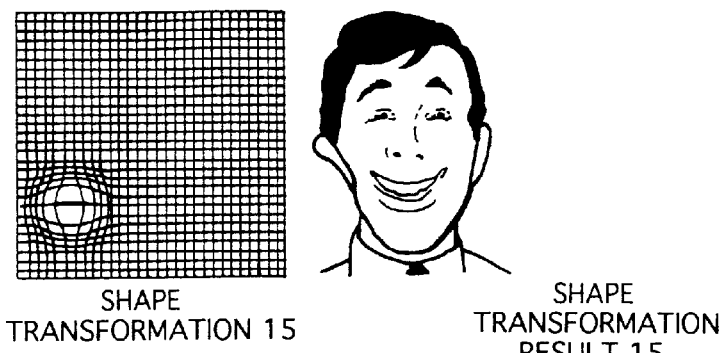
Figure 29B:
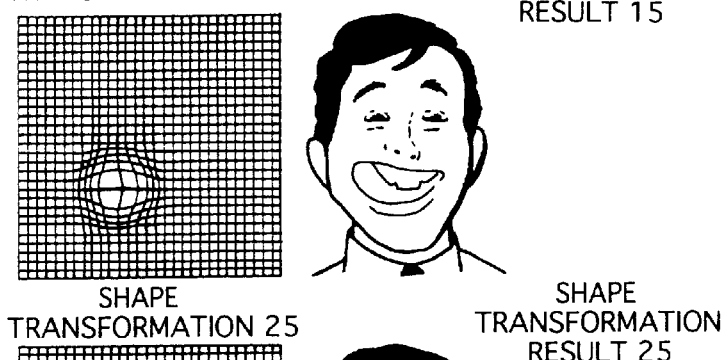
Figure 29C:
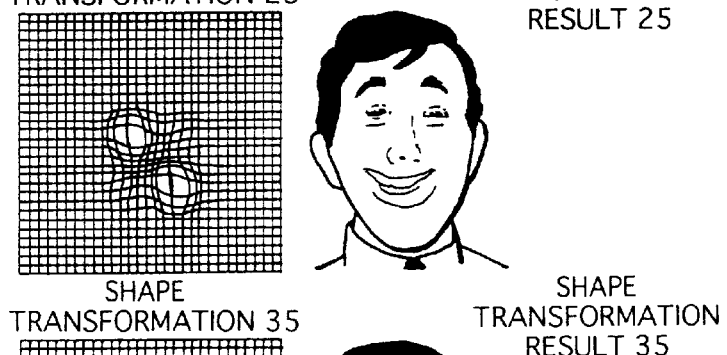
Figure 29D:
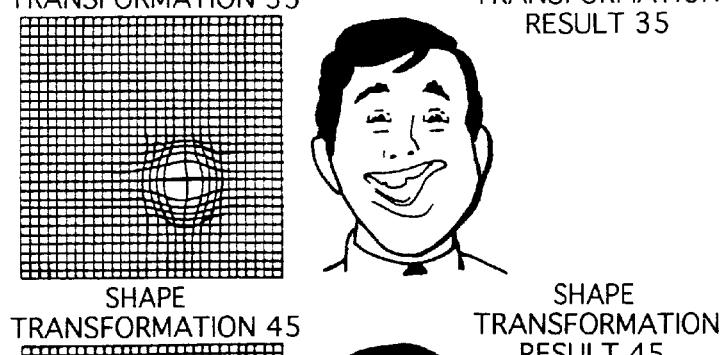
Figure 29E:
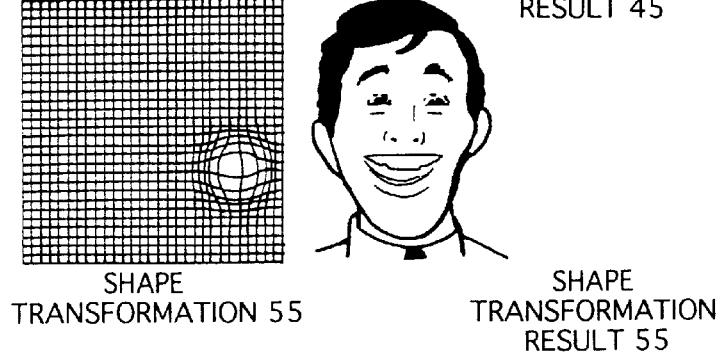

FIG. 26 is a graph for deciding shape transformation processing, and FIG. 27 illustrates an example of a captured image. FIGS. 28a to 28e and FIGS. 29a to 29e illustrate methods of shape transformation and the results of shape transformation when the shape of the captured image is transformed by these methods.

In this example, directions of acceleration are divided into five stages between 0° and 180°. Further, the magnitudes of acceleration are divided into five stages between zero and a maximum value.

By way of example, if the direction of acceleration is between 0° and 36°, shape transformation processing in accordance with any of a shape transformation method 11 (see FIG. 28a), shape transformation method 12 (see FIG. 28b), shape transformation method 13 (see FIG. 28c), shape transformation method 14 (see FIG. 28d) or shape transformation method 15 (see FIG. 28e) is executed in dependence upon the magnitude of acceleration. Shape transformation processing is performed in accordance with a particular shape transformation method in similar fashion for directions of acceleration between 36° and 72°, 72° and 108°, 108° and 144° and 144° and 180°.

If the magnitude of acceleration is between four-fifths of the maximum value and the maximum value, shape transformation processing in accordance with any of a shape transformation method 15 (see FIG. 29a), shape transformation method 25 (see FIG. 29b), shape transformation method 35 (see FIG. 29c), shape transformation method 45 (see FIG. 29d) or shape transformation method 55 (see FIG. 29e) is executed in dependence upon the direction of acceleration.

Thus, since acceleration in the depth direction and acceleration in the transverse direction are sensed and processing for transforming the shape of an image is changed in conformity with these accelerations, the processing for transforming the shape of an image becomes more realistic.

Figure 30:
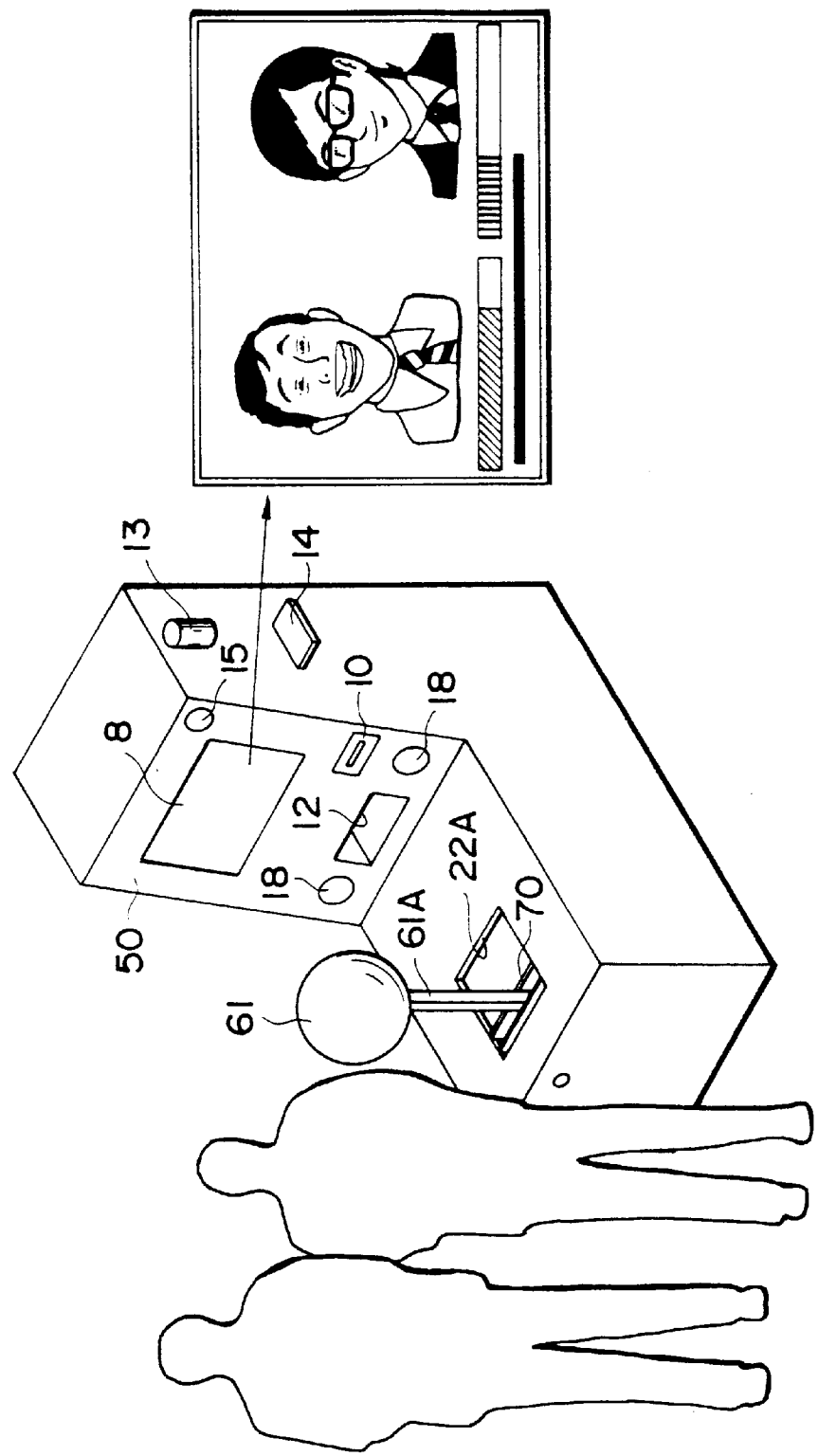
FIG. 30 is a perspective view showing the appearance of a punching game machine in another embodiment.

FIG. 30 is a perspective view showing the appearance of a punching game machine according to another embodiment of the present invention. The punching game machine shown in FIG. 30 is such that two players take turns in punching one punching ball 61.

Figure 31:
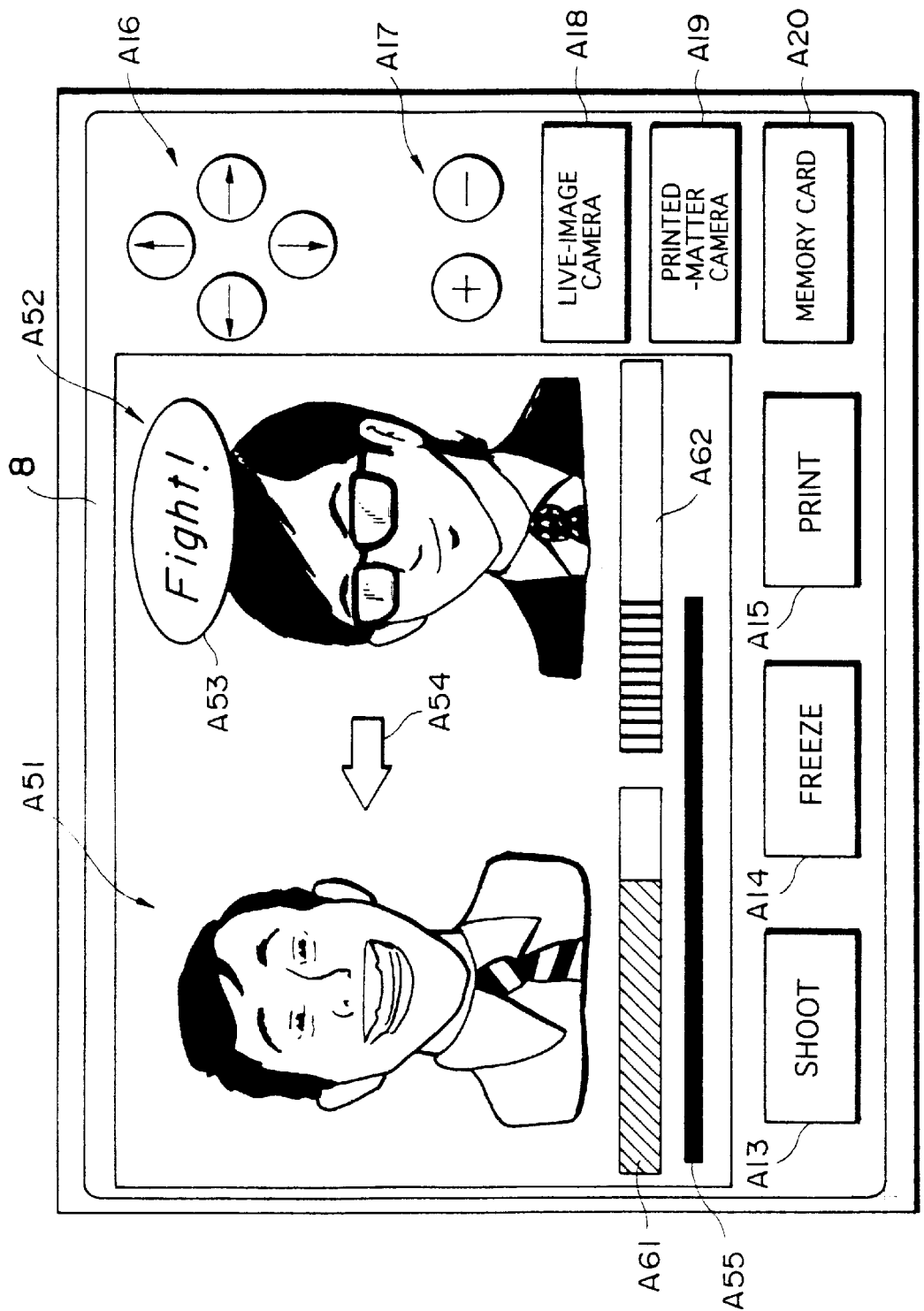
FIG. 31 illustrates an example of a display screen of a punching game machine in this embodiment.

FIG. 31 illustrates an example of the display screen 8 of the display unit 7 of this punching game machine.

A first image display area A51 and a second image display area A52 are displayed on the display screen. An image captured by the second player is displayed in the first image display area A51, and an image captured by the first player is displayed in the second image display area A52.

Instructive characters A53 and an arrow A54 that indicate the player that is to punch the punching ball 61 are displayed on the display screen 8. The first player punches the punching ball 61 when the characters A53 are displayed in the first image display area A51 and the arrow points from the first image display area A51 to the second image display area A52. The second player punches the punching ball 61 when the characters A53 are displayed in the second image display area A52 and the arrow points from the second image display area A52 to the first image display area A51.

A damage bar A61 indicating the value of damage inflicted upon the first player is displayed below the first image display area A51, and a damage bar A62 indicating the value of damage inflicted upon the second player is displayed below the second image display area A52.

A remaining-time bar A55, which indicates remaining game time by the length of a bar, is displayed below the damage bard A61 and A62.

Figure 32:
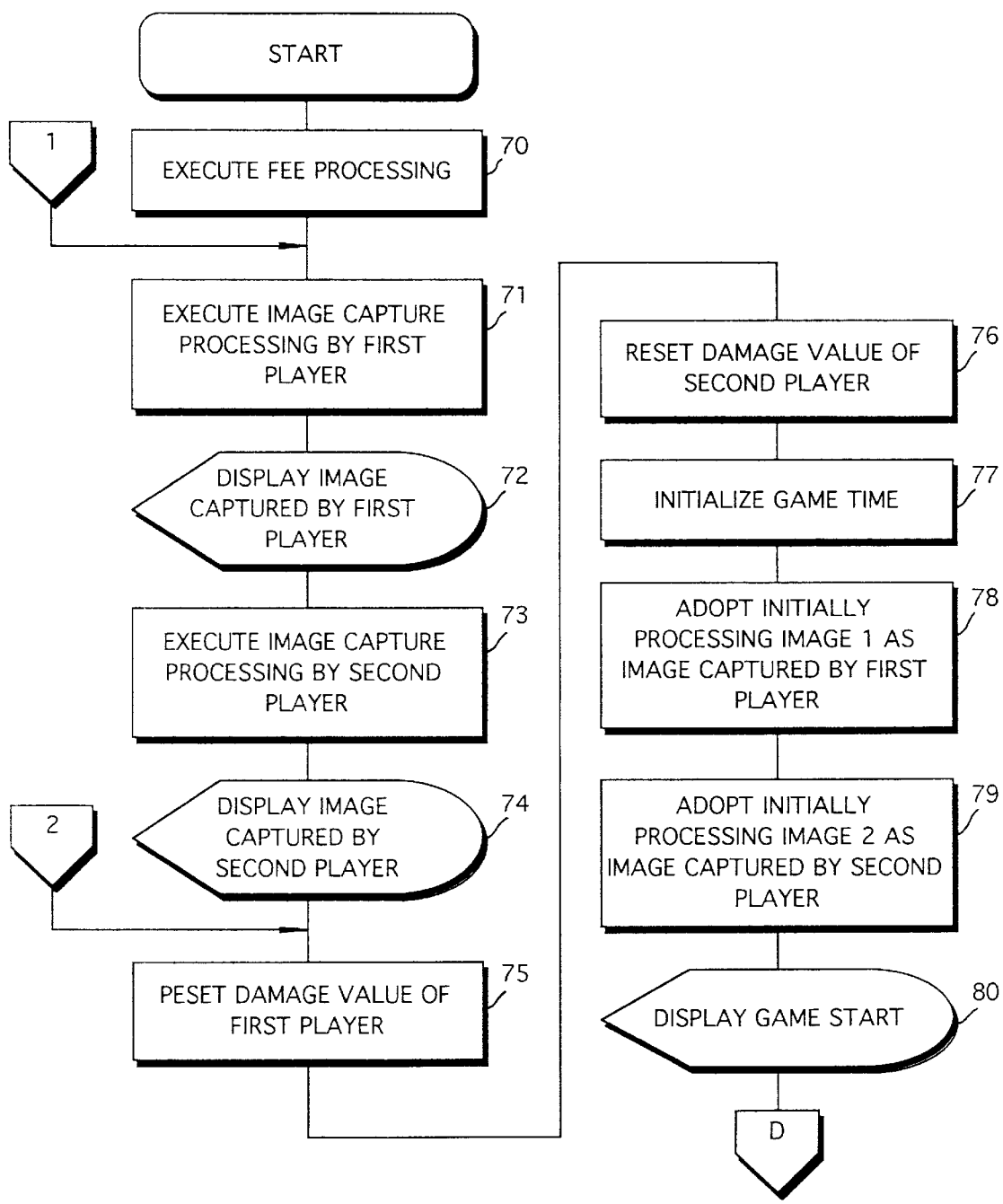
FIGS. 32 to 34 are flowcharts showing the processing procedure of the punching game machine in this embodiment.
Figure 33:
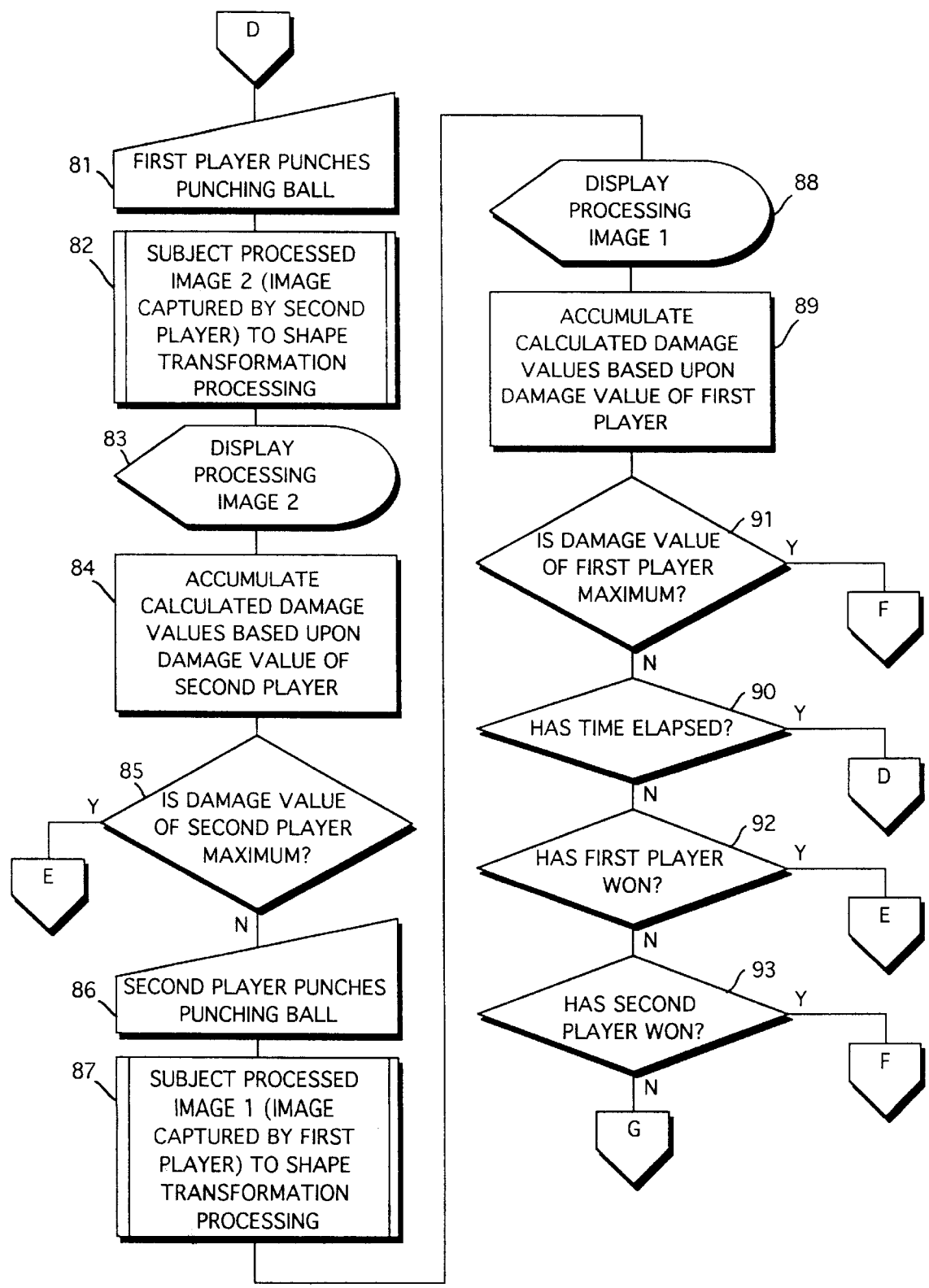
Figure 34:
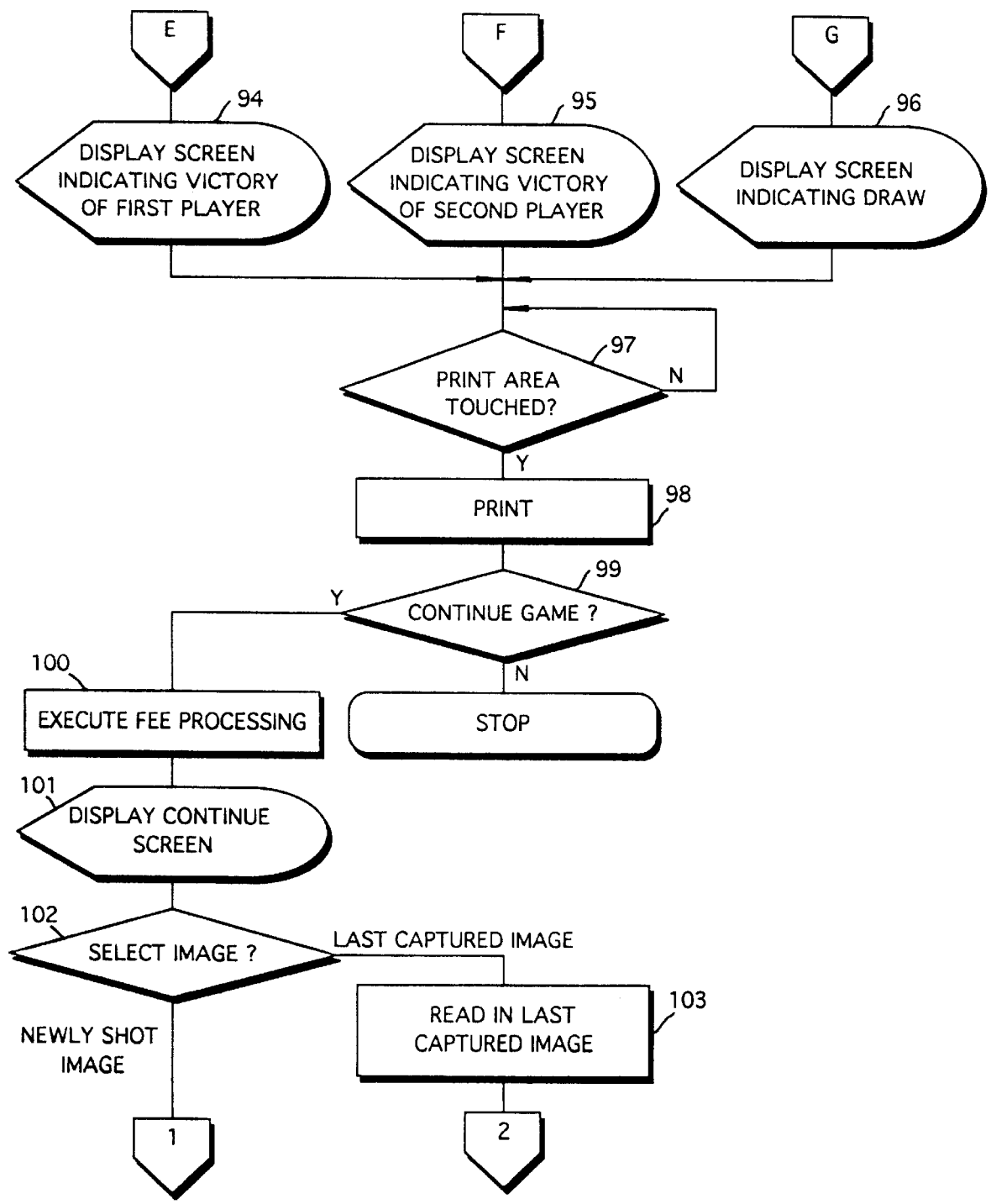

FIGS. 32 to 34 are flowcharts illustrating the processing procedure for operating the punching game machine.

This punching game machine is of the type that allows the first and second players to play against each other.

If the punching ball 61 is punched by the second player and the punching force is sensed, the shape of the image captured by the first player is transformed in conformity with the sensed punching force. The punching force is accumulated as the damage value and the shape of the image is transformed in accordance with the accumulated result. If the punching ball 61 is punched by the first player and the punching force is sensed, the shape of the image captured by the second player is transformed in conformity with the sensed punching force. The punching force is accumulated as the damage value and the shape of the image is transformed in accordance with the accumulated result.

The image captured by the first player is thought of as being an image representing the first player, and the image captured by the second player is thought of as being an image representing the second player. However, it goes without saying that the images captured by the first and second players may be images other than those of the first and second players.

If coins conforming to the playing fee are inserted by the first and second players (step 70), image capture processing by the first player is executed (step 71). It goes without saying that the image capture processing may capture an image by shooting using the live-image camera 15, by shooting printed matter using the printed-matter camera 13, or by reading in image data from a memory card, as described earlier. When an image has been captured by the first player, the captured image is displayed in the second image display area A52 (step 72).

Next, image capture processing by the second player is carried out (step 73) and the captured image is displayed in the first image display area A51 (step 74).

The damage values of the first and second players are each reset (steps 75, 76). Game time is then initialized (step 77).

A first initially processed image 1 is adopted as the image captured by the first player (step 78), and a second initially processed image 2 is adopted as the image captured by the second player (step 79). A game starting screen is displayed on the display screen 8 (step 80).

The instructive characters A53 are displayed in the first image display area A51 and the arrow A54 is displayed so as to point from the first image display area A51 to the second image display area A52. The displayed characters and arrow prompt the first player to punch the punching ball 61, and the first player responds by doing so (step 81). The punching force of the first player is calculated and the shape of the second processed image 2 (the image captured by the second player) is transformed in dependence upon the calculated punching force (step 82). The second processed image that has been subjected to transformation processing is displayed in the second image display area A52 (step 83).

The damage value of the second player is calculated in dependence upon the punching force of the first player. Calculated damage values are accumulated (step 84) and the accumulated damage value is displayed in the damage bar A62. If the calculated second damage value does not attain the maximum value ("NO" at step 85), the game continues.

If the game continues, the instructive characters A53 are displayed in the second image display area A52 and the arrow A54 is displayed so as to point from the second image display area A52 to the first image display area A51. The displayed characters and arrow prompt the second player to punch the punching ball 61, and the second player responds by doing so (step 86). The punching force of the second player is calculated and the shape of the first processed image 1 (the image captured by the first player) is transformed in dependence upon the calculated punching force (step 87). The first processed image that has been subjected to transformation processing is displayed in the first image display area A51 (step 88).

The damage value of the first player is calculated and the damage values are accumulated (step 89). If the calculated second damage value does not attain the maximum value ("NO" at step 90), the game continues.

If a predetermined game time has not elapsed ("NO" at step 91), the game continues and it is determined, based upon the damage values, whether the first player or second player has won (steps 92, 93).

If the accumulated damage value of the second player is greater than the accumulated damage value of the first player ("YES" at step 92), it is determined that the first player has won and a screen indicating the victory of the first player is displayed on the display screen (step 94). If the accumulated damage value of the first player is greater than the accumulated damage value of the second player ("YES" at step 93), it is determined that the second player has won and a screen indicating the victory of the second player is displayed on the display screen (step 95). If the damage value of the first player is the same as that of the second player ("NO" at steps 92 and 93), then it is determined that the game is a draw and a screen indicating this is displayed on the display screen of the display unit (step 96).

If the first player or second player touches the print area A15 ("YES" at step 97), the transformed images prevailing at the end of the game (the image resulting from transformation of the shape of the image captured by the first player and the image resulting from transformation of the shape of the image captured by the second player) are printed. It is of course possible to adopt an arrangement in which the image to be printed is specified by the winning player so that only the specified image is printed.

If a case where the game is to be continued ("YES" at step 99), payment is required again and the fee is inserted (step 100). The CONTINUE screen is then displayed on the display unit (step 101). It is then determined whether the images used in the next game are to be made newly shot images or whether images captured last are to be employed. If images are to be newly shot, then images are captured anew. If the images captured last are to be used, then the images captured last are read out again (step 103).

Though the punching game machine described above allows two players to compete using a single punching game machine, it can be so arranged that two players compete using two punching game machines.

Figure 35:
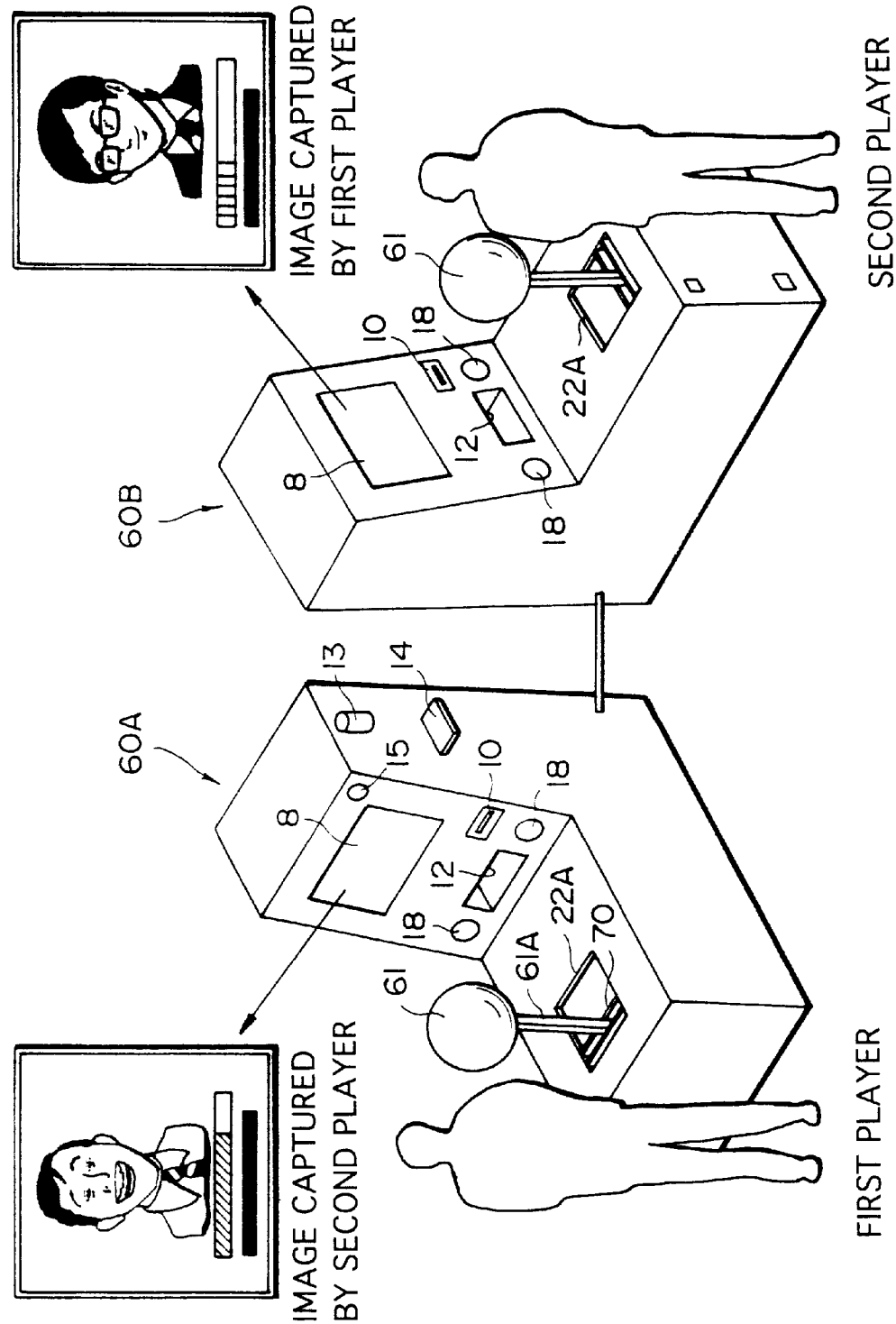
FIG. 35 is a perspective view showing the appearance of punching game machines in another embodiment.
Figure 36:
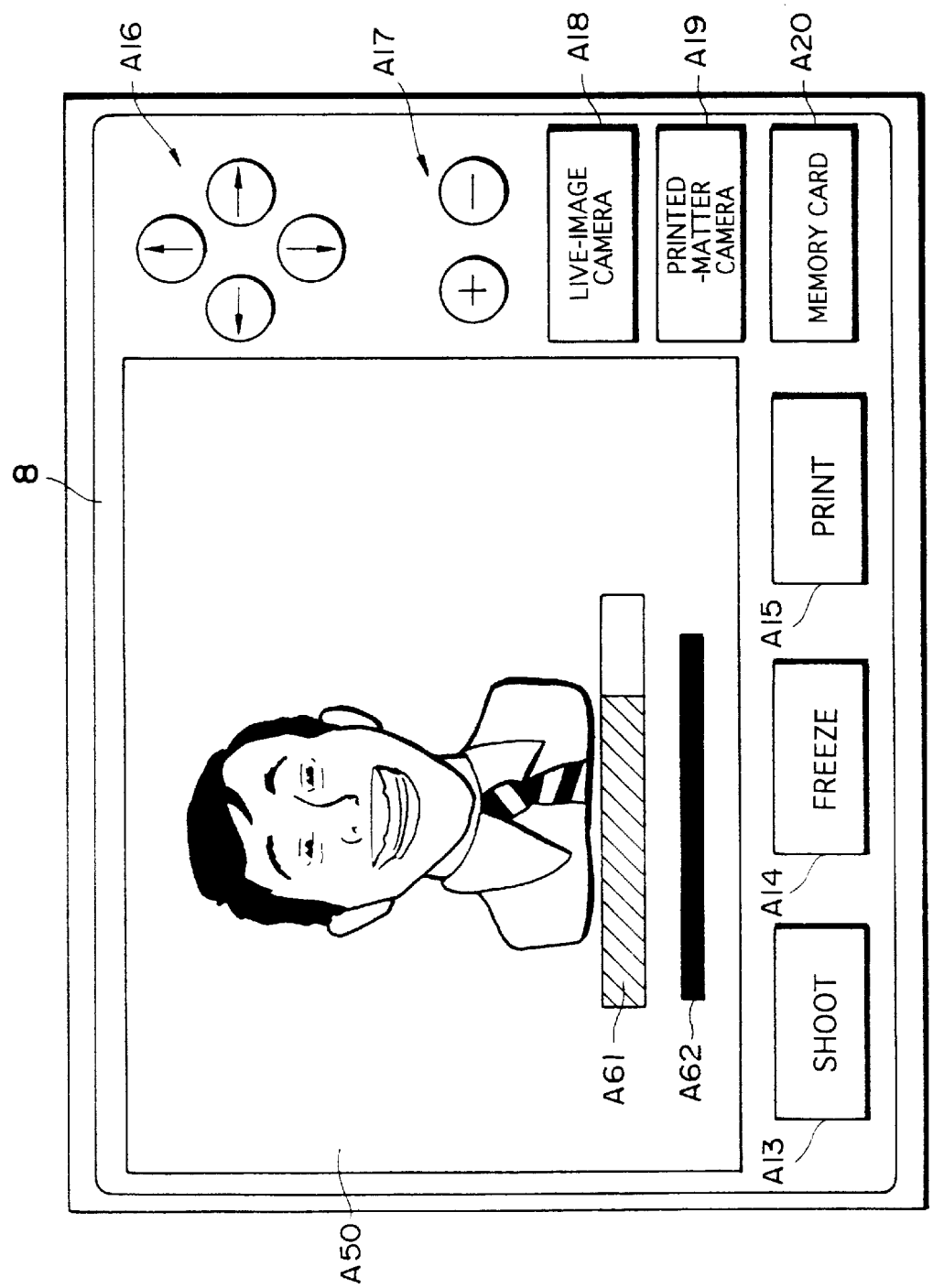
FIG. 36 illustrates an example of a display screen of a punching game machine in this embodiment.
Figure 37:
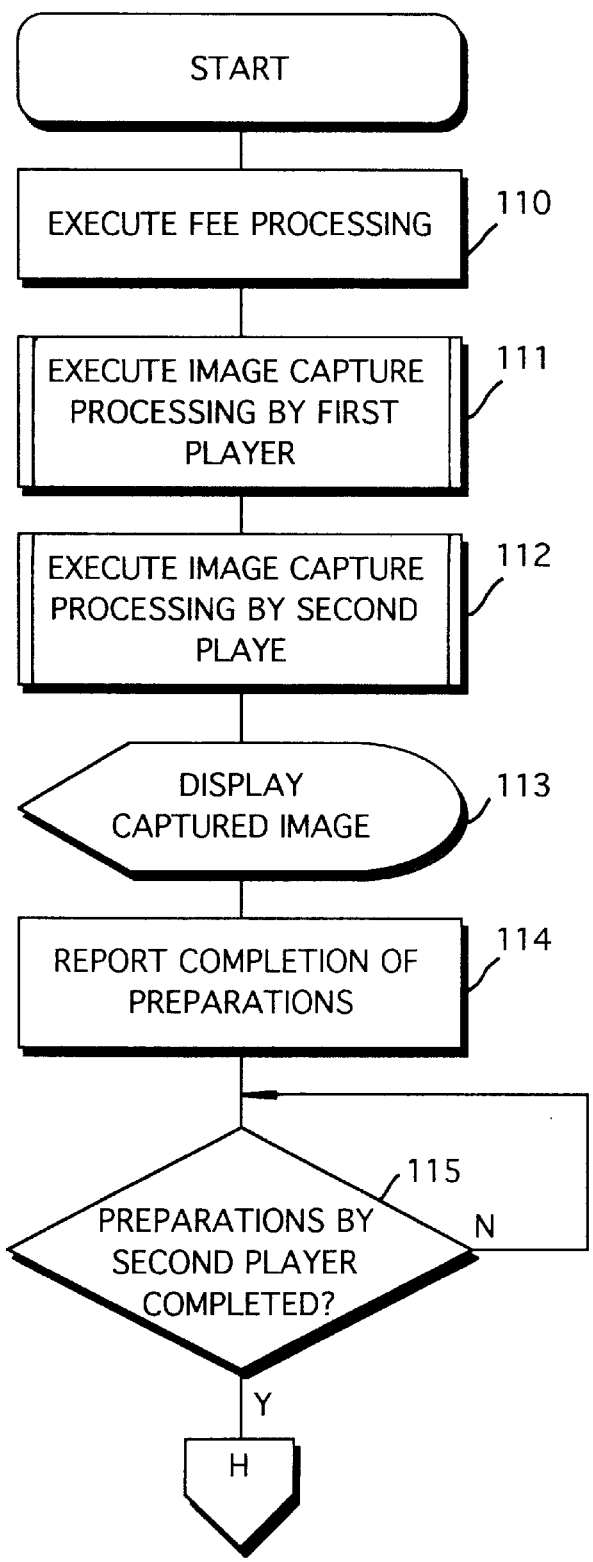
FIGS. 37 to 41 are flowcharts showing the processing procedure of the punching game machine in this embodiment.
Figure 38:
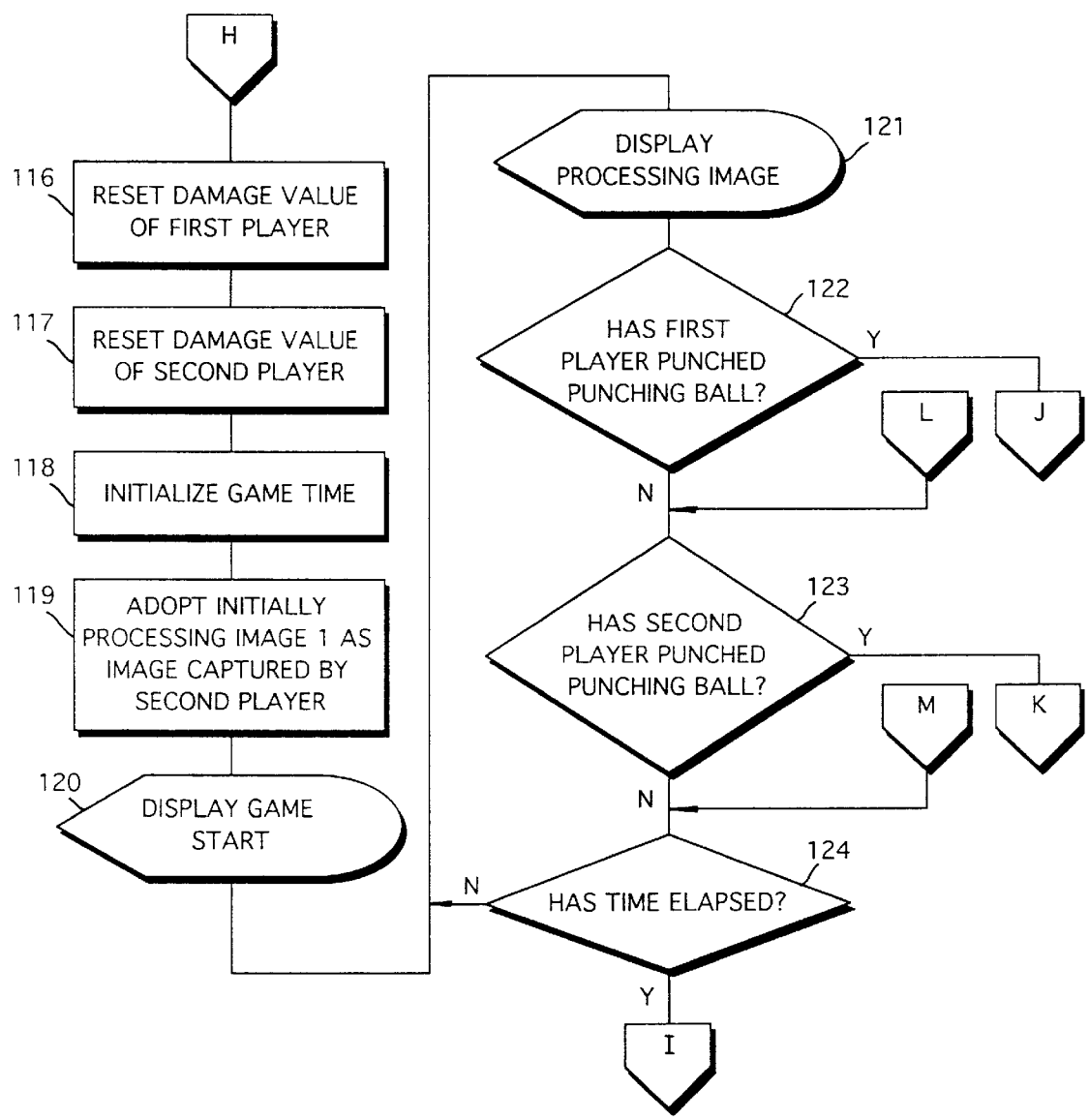
Figure 39:
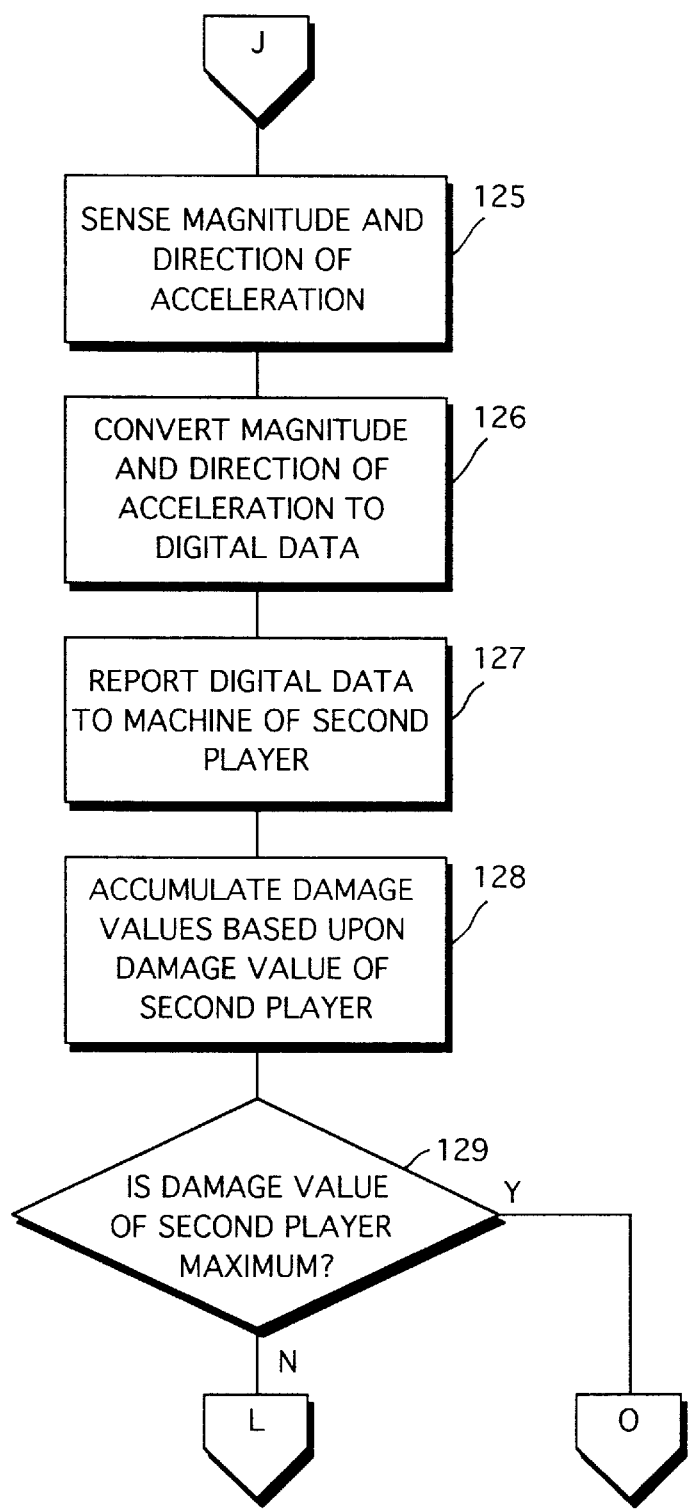
Figure 40:
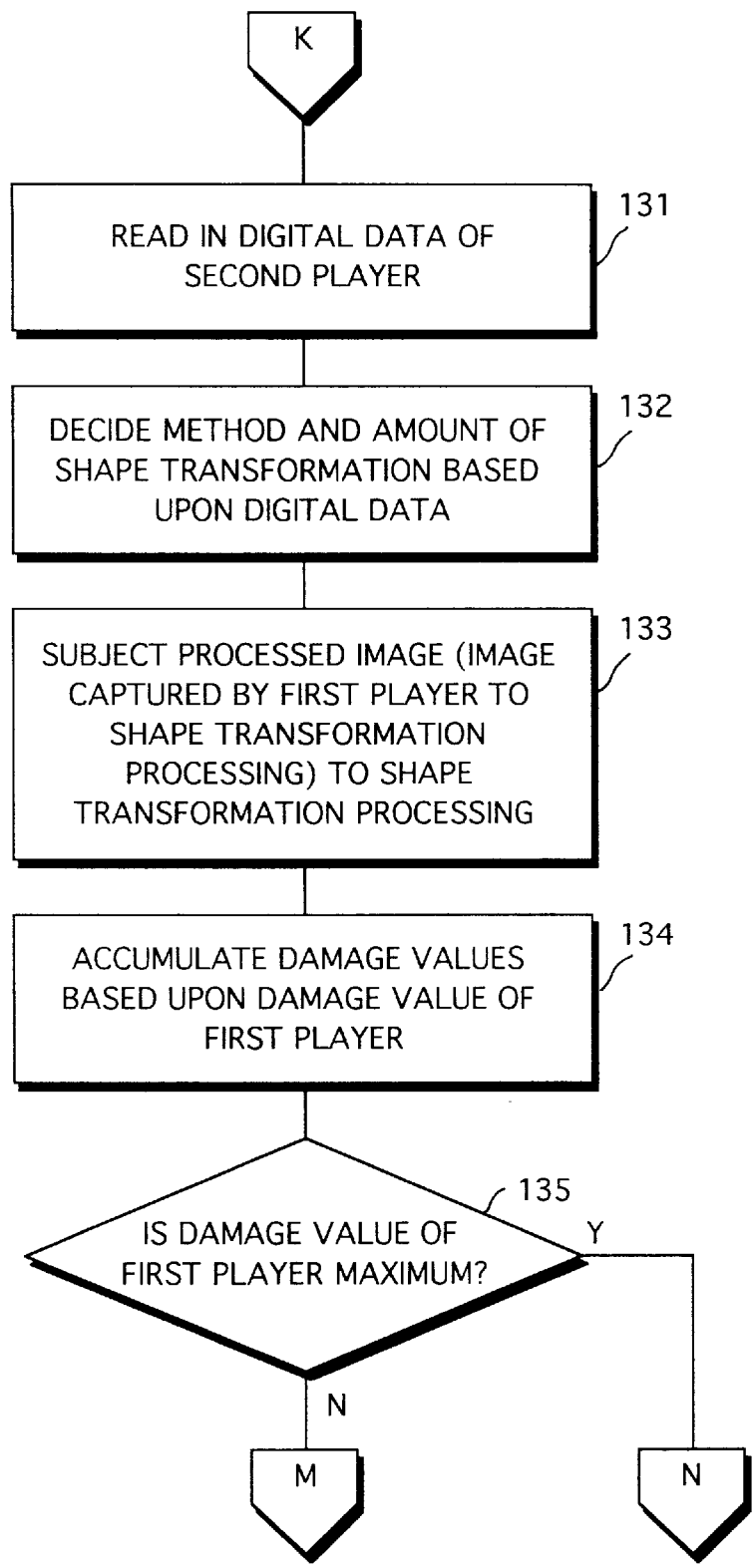
Figure 41:
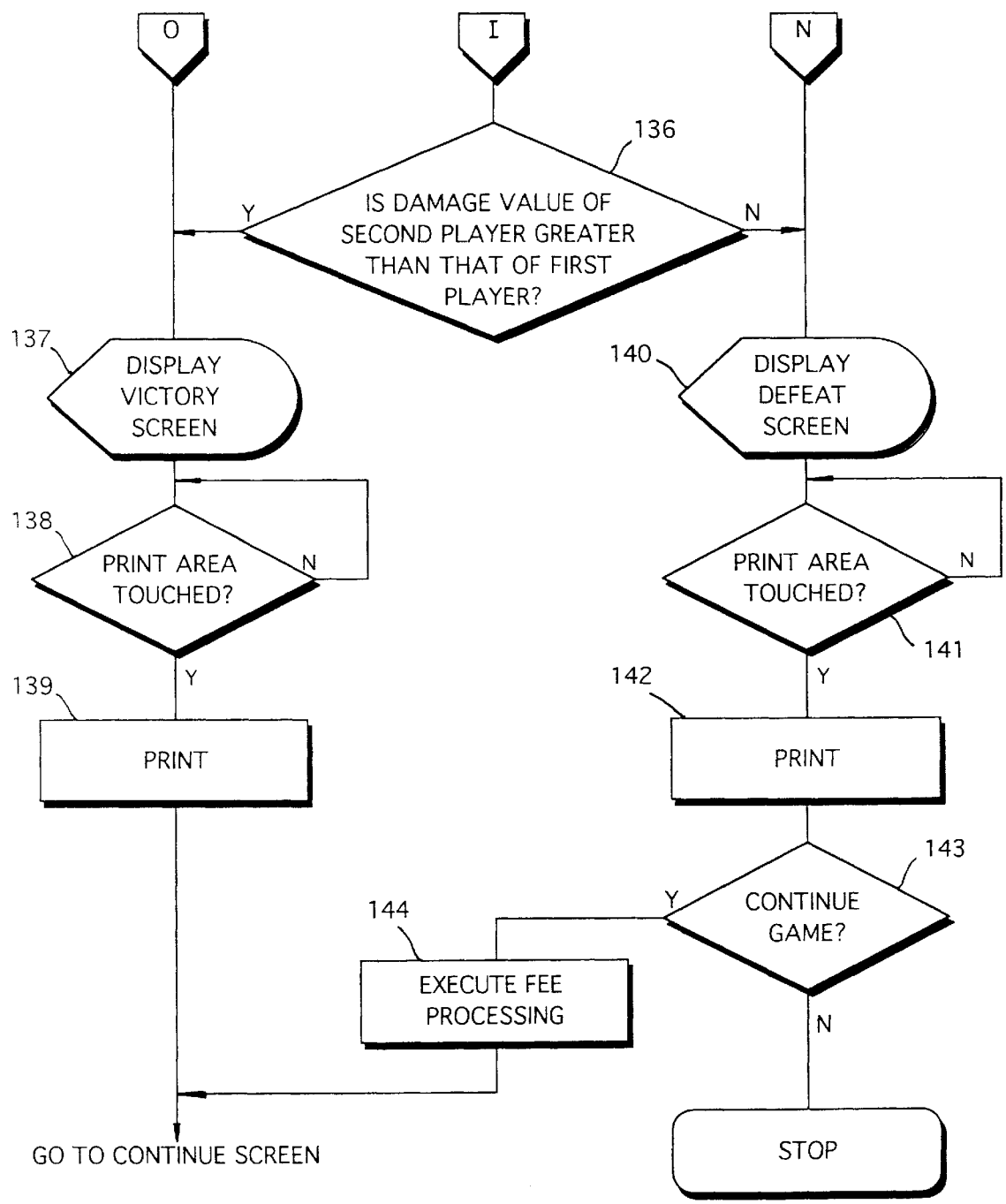

FIGS. 35 to 41 illustrate an embodiment for a case where two players compete using two punching game machines. FIG. 35 shows the appearance of the punching game machines, FIG. 36 illustrates an example of a display screen of the punching game machines, and FIGS. 37 to 41 are flowcharts showing the processing procedure of these punching game machines.

Two punching game machines 60A and 60B are connected so as to be capable of communicating with each other, as shown in FIG. 35. It goes without saying that each of the punching game machines 60A and 60B is provided with the communications circuit 24.

The first player stands in front of the first punching game machine 60A, and the second player stands in front of the second punching game machine 60B. The image captured by the second player (this image usually represents the second player) is displayed on the display screen 8 of the display unit 7 of first punching game machine 60A. The image captured by the first player (this image usually represents the first player) is displayed on the display screen 8 of the display unit 7 of second punching game machine 60B.

FIG. 36 illustrates an example of the display screen 8 of the display unit 7 of the first punching game machine 60A.

Items in FIG. 36 identical with those shown in FIG. 5 are designated by like reference characters and need not be described again.

An image display area A50 is defined on the display screen 8 and displays the image captured by the second player. It goes without saying that a screen corresponding to FIG. 36 is displayed on the display screen 8 of the display unit 7 of second punching game machine 60B as well, and that the image captured by the first player is displayed in an image display area on the display screen 8 of the display unit 7 of second punching game machine 60B.

The damage bar A61 and a remaining-time bar A62 are displayed below the image display area A50.

FIGS. 37 to 41 illustrate the processing procedure of the first punching game machine 60A. The second punching game machine 60B also executes processing similar to that shown in FIGS. 37 to 41.

The punching game machines 60A and 60B shown in FIG. 35 are so adapted that image capture processing is performed by both the first and second players in a manner similar to that of the punching game machine shown in FIG. 30. The image captured by the first player is displayed on the display screen 8 of the second punching game machine 60B facing the second player, and the image captured by the second player is displayed on the display screen 8 of the first punching game machine 60A facing the first player.

When the game fees are introduced into the punching game machines by the first and second players (step 110), image capture processing by the first player (step 111) is executed and image capture processing by the first player (step 112) is executed. As described above, the image captured by the first player is displayed on the display screen 8 of the display unit 7 of second punching game machine 60B, and the image captured by the second player is displayed on the display screen 8 of the display unit 7 of first punching game machine 60A (step 113).

When image capture by the first player ends, notification of end of this image capture is transmitted from the first punching game machine 60A to the second punching game machine 60B (step 114). When image capture by the second player at the second punching game machine 60B ends, notification of end of this image capture is transmitted from the second punching game machine 60B to the first punching game machine 60A (step 114).

When notification of end of image capture transmitted from the second punching game machine 60B is received by the first punching game machine 60A ("YES" at step 115), the damage values of the first and second players are each reset (steps 116, 117). Game time is then initialized (step 118).

An initially processed image is adopted as the image captured by the second player (step 119). A screen informing start of the game is displayed on the display screen (step 120) and then a processed image (the image captured by the second player in this case) is displayed (step 121).

A prompt is displayed on the display screen of the display unit urging the first player to punch the punching ball 61. The first player punches the punching ball 61 in compliance with this display. If the first player punches the punching ball 61 ("YES" at step 122), then the magnitude and direction of acceleration of the punching ball 61 are sensed in the manner described earlier (step 125). The sensed magnitude and direction of acceleration are converted to digital data (step 126), and the digital data resulting from the conversion is transmitted from the first punching game machine 60A to the second punching game machine 60B (step 127).

The damage value is calculated based upon the digital data resulting from the conversion and is accumulated by being added to the damage value of the second player (step 128). It is determined whether the damage value of the second player has attained the maximum value (step 129). If the damage value of the second player is not the maximum value, the game continues and a display is presented on the display unit of the second punching game machine 60B urging the second player to punch the punching ball of the second punching game machine 60B.

If the second player punches the punching ball of the second punching game machine 60B ("YES" at step 123), processing similar to that of steps 125 to 127 is executed by the second punching game machine 60B. Digital data based upon the sensed magnitude and direction is transmitted from the second punching game machine 60B to the first punching game machine 60A and is received by the first punching game machine 60A (step 131).

The method and amount of shape transformation are decided based upon the digital data received (step 132). The processed image (the image captured by the first player in this case) is subjected to shape transformation processing based upon the shape transformation method and amount decided (step 133). The damage value of the first player is calculated based upon the digital data and is accumulated by being added to the damage value of the first player (step 134). It is determined whether the damage value of the first player has attained the maximum value (step 135).

If the game ends ("YES" at step 124), the damage values of the first and second players are compared (step 136). If the damage value of the second player is larger than that of the first player ("YES" at step 136), or if the damage value of the second player is maximum ("YES" at step 129), it is deemed that the first player is the winner and a victory screen is displayed on the display screen 8 of the display unit of the first punching game machine 60A (step 137). In response to the print area A15 of the display screen 8 being touched by the first player ("YES" at step 138), the image obtained by transforming the shape of the image captured by the second player is printed (step 139). It goes without saying that an arrangement may be adopted in which the image obtained by transforming the shape of the image captured by the first player is printed.

If the damage value of the first player is larger than that of the second player ("NO" at step 136) or if the damage value of the first player is maximum ("YES" at step 135), it is construed that the first player has been defeated and a defeat screen is displayed on the display screen 8 of the display unit 7 of first punching game machine 60A. The screen showing that the second player is the winner is displayed on the display screen 8 of the display unit 7 of second punching game machine 60B.

If the print area A15 of the display screen 8 of first punching game machine 60A is touched ("YES" at step 141), the image obtained by transforming the shape of the image captured by the first player is printed (step 142). If the game is to be continued (step 143), then a coin conforming to the fee is dropped in the first punching game machine 60A or 60B by the first or second player (step 144).

In the embodiments described above, the images of the faces of players are captured. However, the image of the entire body of the player may be captured and the shape of the image of the entire body of the player may be transformed. In a case where the image of the entire body of a player is captured, it can be so arranged that the machine is kicked by the player and the corresponding part of the image of the entire player is transformed in shape in conformity with the kicking force and the position kicked.

Further, according to the foregoing embodiments, an image is captured from the cameras 13, 15 or from the memory card reader 9. However, image data representing an image (e.g., the image of a famous person) may be stored on the hard disk in advance and the image represented by the stored image data may be displayed on the display screen 8. The shape of the stored image can then be transformed.

Furthermore, an arrangement may be adopting in which image data is communicated in accordance with a communications scheme based upon the IrDA (Infrared Data Association) and the image is captured by the punching game machine.

Further, in the foregoing embodiments, punching force is calculated and the shape of a captured image is transformed in conformity with the punching force. However, a player's gripping strength, back-muscle strength, lung capacity, pushing strength or pulling strength can be measured and the shape of the image can be transformed based upon the measured value obtained. Instrumentation suitable for such measurement would be provided to measure the particular quantity.

Furthermore, in the foregoing embodiments, areas are displayed on the display screen 8 and a player touches these displayed areas to thereby select shooting, freezing, printing, positioning of a captured image, enlargement/reduction of the captured image and a camera or memory card reader. However, the front of the horizontal portion 51 may be provided with mechanical buttons for selecting these functions. The player would play the game while pressing the various buttons provided on the front of the horizontal portion 51.

In the foregoing embodiments, the damage values of two players are accumulated and the winning and losing players are decided depending upon the accumulated values. However, the winning and losing players may be decided by damage values that are based upon measurement of punching force without accumulating the damage values.

(2) Rapport measuring game

Figure 42:
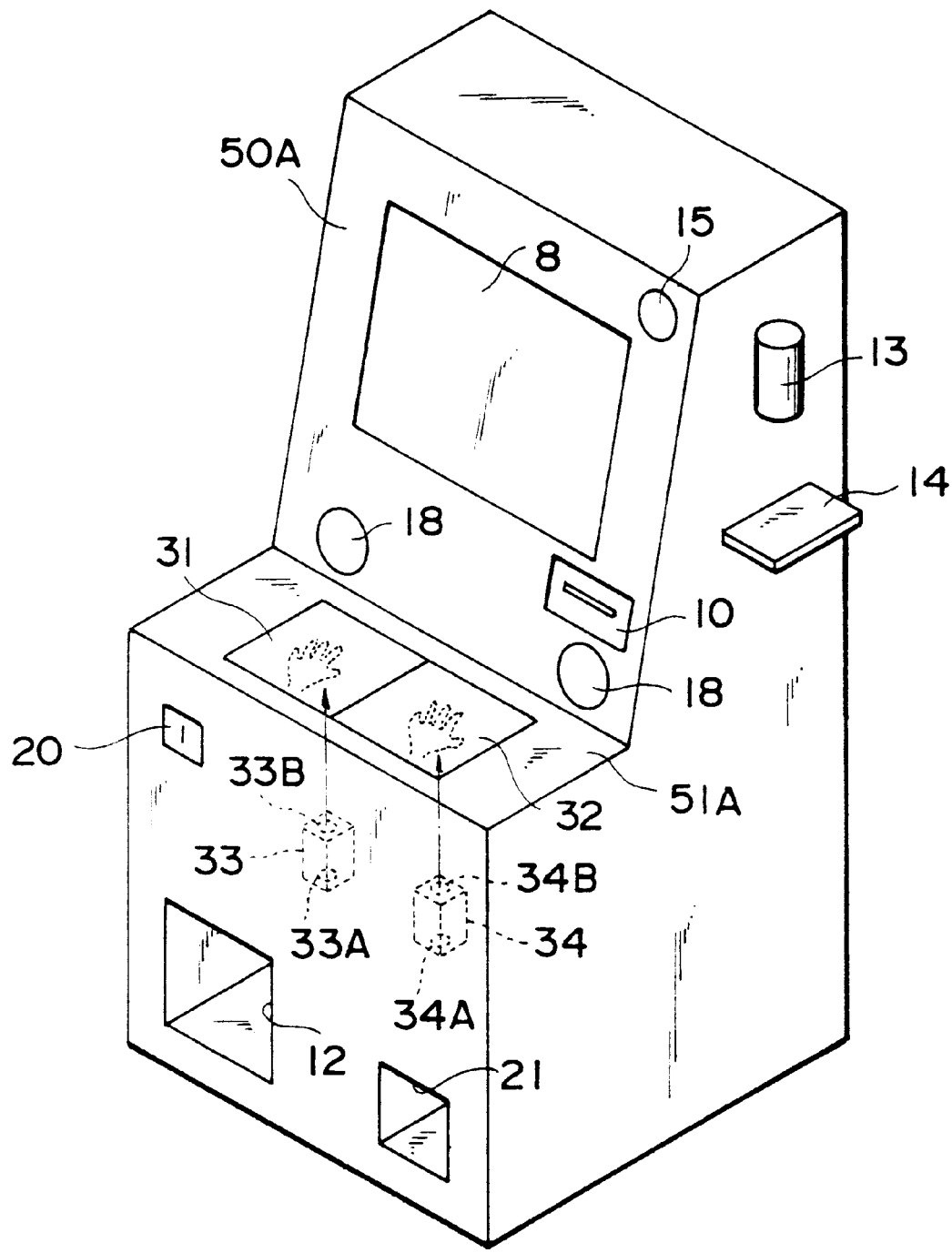
FIG. 42 is a perspective view showing the appearance of a rapport measuring game machine.

FIG. 42 is a shows the appearance of a rapport measuring game machine. Components in FIG. 42 identical with those shown in FIG. 1 are designated by like reference characters and are not described again.

The rapport measuring game displays two frames of images on a display screen and displays the degree of rapport between these two frames of images (the degree of rapport between two people). The higher the degree of rapport, the redder the two frames of images become; the lower the degree of rapport, the greener the two frames of images become.

The rapport measuring machine has a vertical portion 50A, which is erected in a substantially vertical attitude, and a horizontal portion 51A. A first transparent pad 31 and a second transparent pad 32 are disposed horizontally on the horizontal portion 51A of the rapport measuring game.

A first temperature sensor 33 and a second temperature sensor 34 are disposed under the first transparent pad 31 and second transparent pad 32, respectively. A first infrared sensor 33A is incorporated within the first temperature sensor 33, and the temperature of a hand placed upon the first transparent pad 31 is measured by the first infrared sensor 33A. The temperature of a hand placed upon the second transparent pad 32 is measured by a second infrared sensor 34A incorporated in the second temperature sensor 34.

Though infrared sensors are used in the example described above, a variety of temperature sensors such as magnetic temperature sensors or IC temperature sensors can be utilized. If magnetic or IC temperature sensors are utilized, these would be provided on the first transparent pad 31 and second transparent pad 32.

Though the first transparent pad 31 and second transparent pad 32 are planar in the example described above, the pads need not be planar. An arrangement may be adopted in which the temperature of a hand is measured by grasping a handle.

Figure 43:
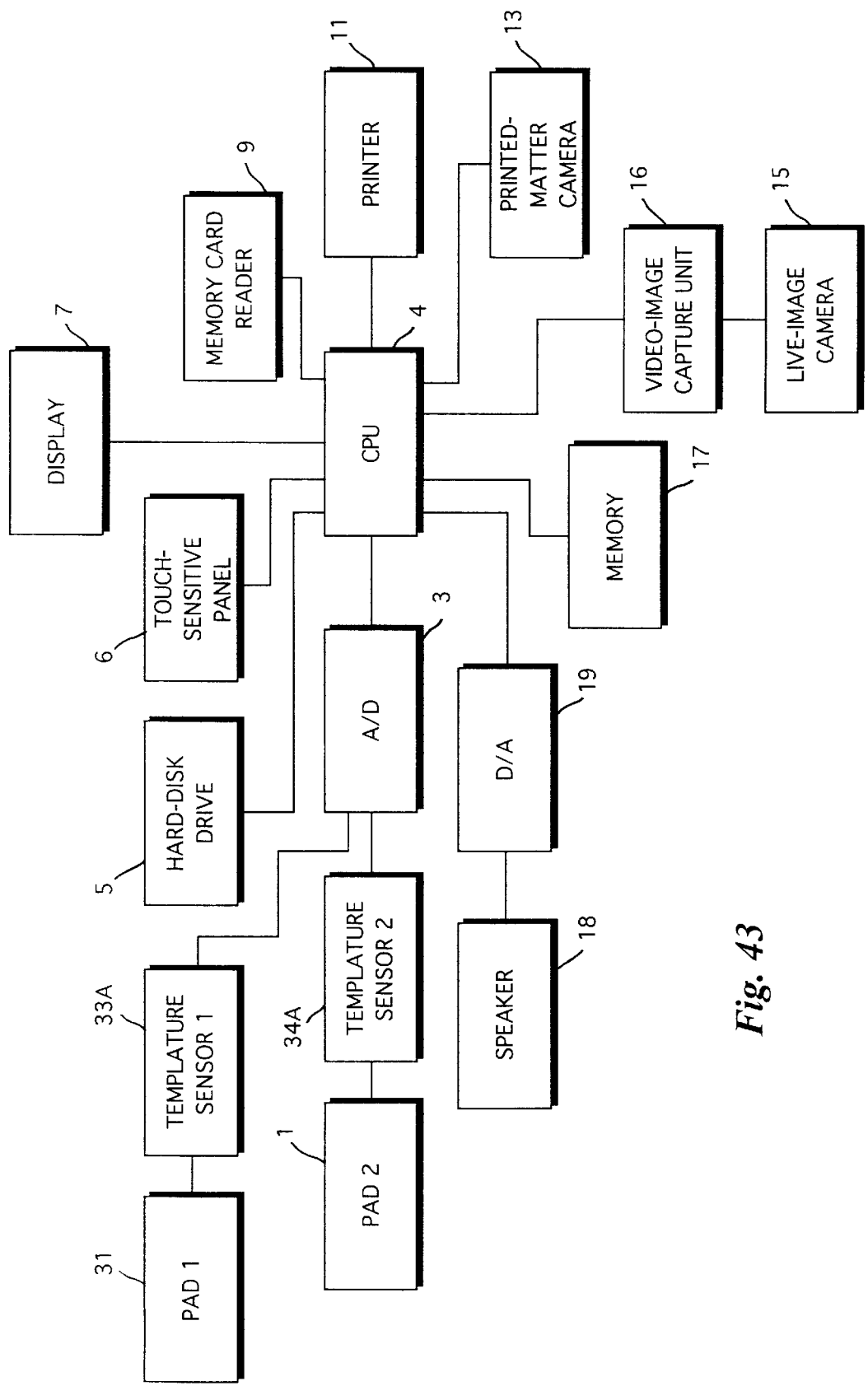
FIG. 43 is a block diagram showing the electrical construction of the rapport measuring machine.

FIG. 43 is a block diagram showing the electrical construction of the rapport measuring game. Components in FIG. 43 identical with those shown in FIG. 2 are designated by like reference characters and are not described again.

The hand of a first player is placed upon the first transparent pad 31, and the hand of a second player is placed upon the second transparent pad 32. The temperature of the hand of the first player placed upon the first transparent pad 31 is measured by the first infrared sensor 33A, and the temperature of the hand of the second player placed upon the second transparent pad 32 is measured by the second infrared sensor 34A.

A signal representing the temperature measured by the first temperature sensor 33A is input to the CPU 4 upon being converted by the analog/digital conversion circuit 3, and a signal representing the temperature measured by the second temperature sensor 34A is input to the CPU 4 upon being converted by the analog/digital conversion circuit 3.

Figure 44:
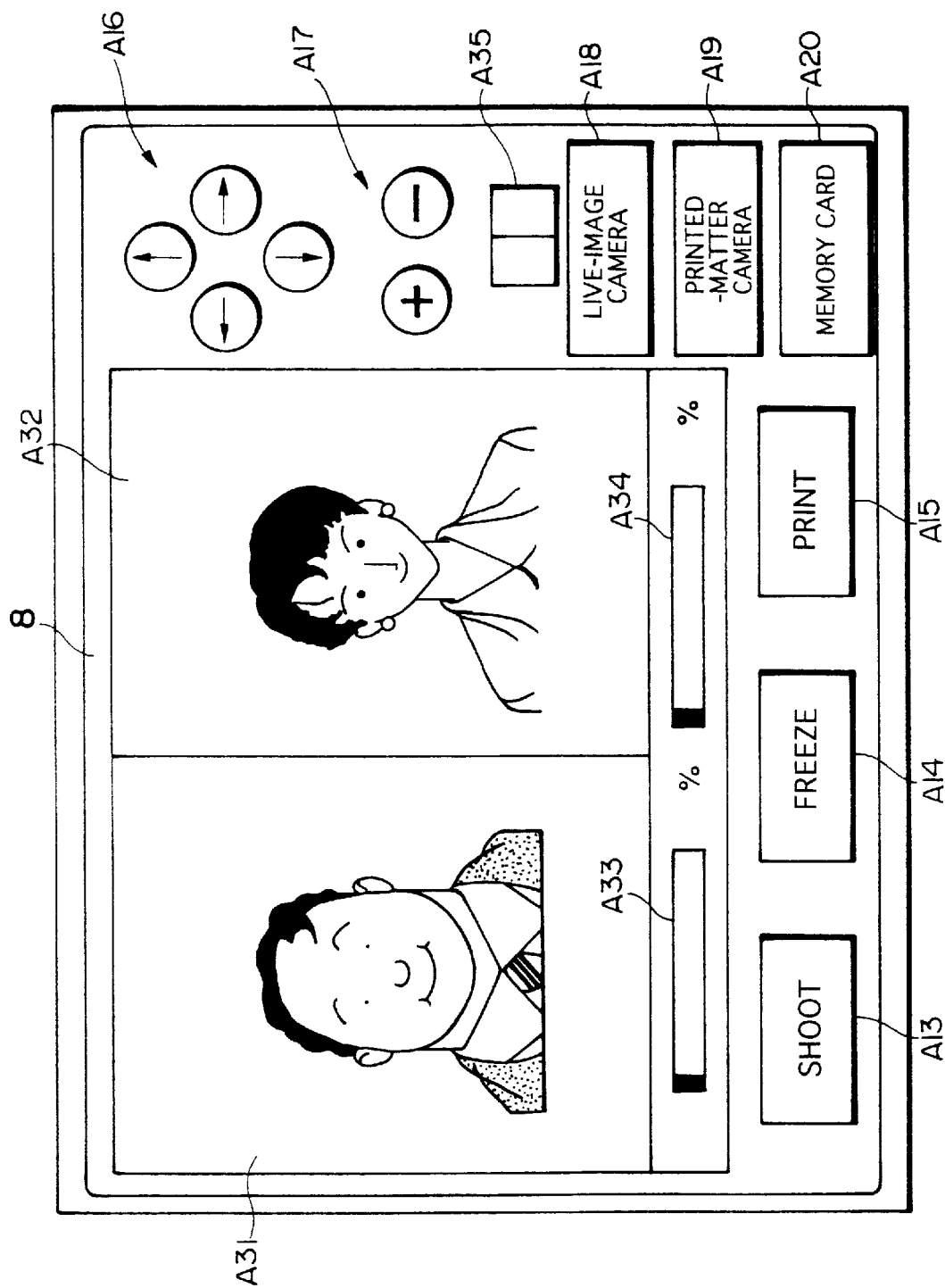
FIG. 44 illustrates an example of a display screen.

FIG. 44 illustrates an example of the display screen. Items in FIG. 44 identical with those shown in FIG. 5 are designated by like reference characters and need not be described again.

The display screen includes a first image display area A31 and a second image display area A32. The first image display areas A31 and A32 each display one frame of an image. The image of the first player is displayed in the first image display area A31, and the image of the second player is displayed in the second image display area A32.

An area A33 indicates the degree of rapport of the first player with respect to the second player, and an area A34 indicates the degree of rapport of the second player with respect to the first player. An area A35 comprises two zones. The zone on the left side is touched when the image displayed in area A31 is to be captured, and the zone on the right side is touched when the image displayed in area A32 is to be captured.

Figure 45:
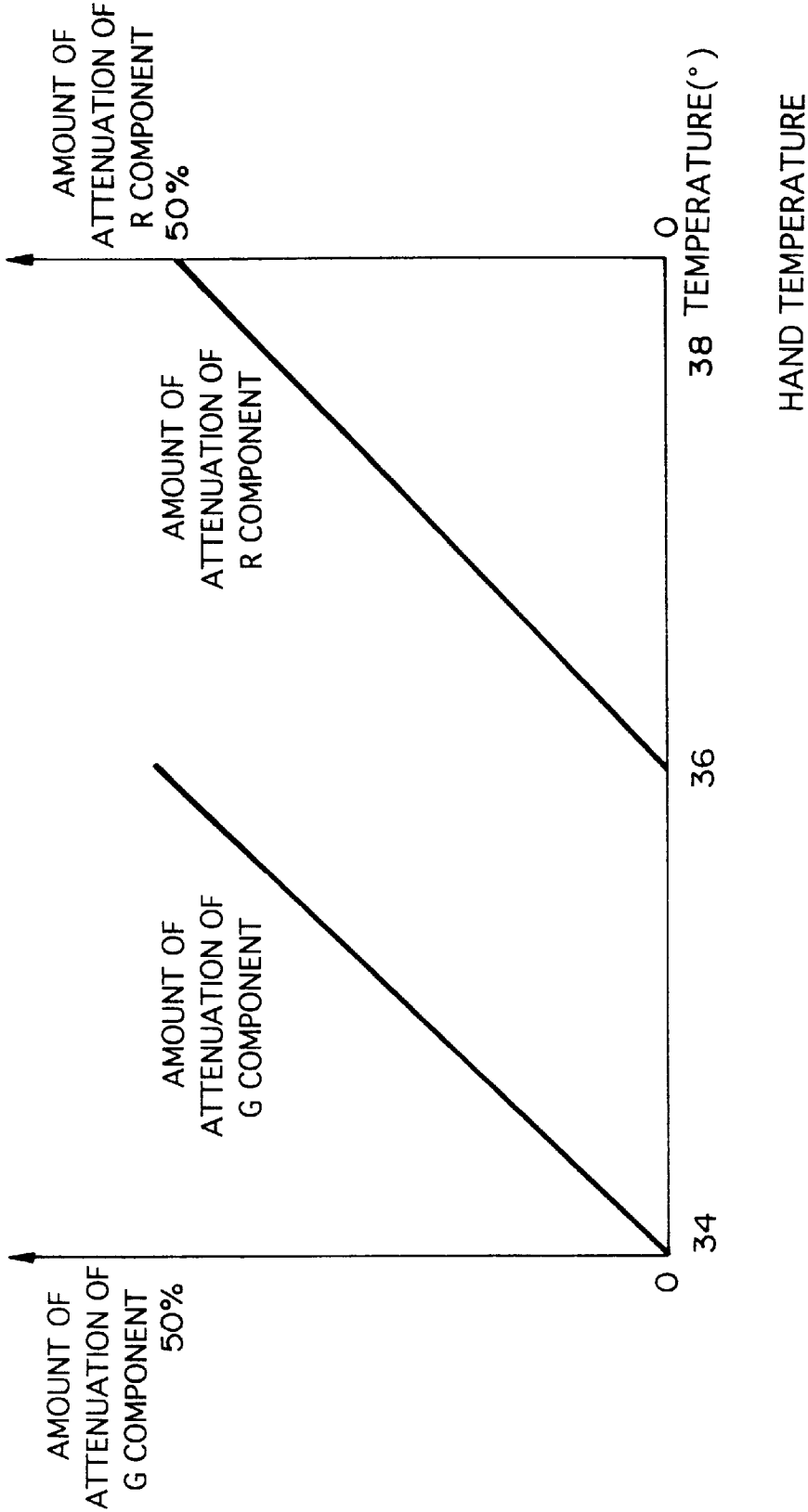
FIG. 45 illustrates the relationship between hand temperature and amounts of attenuation of R and G components.

FIG. 45 illustrates temperatures measured by the temperature sensors 33 and 34 and degrees of attenuation of G (green) and R (red) components from captured images.

If measured temperature is between 36° C. and 38° C., then the higher the temperature above 36° C., the more the R component is attenuated and, hence, the redder the flesh-tone portion (the face) of the image becomes. If measured temperature is between 34° C. and 36° C., then the higher the temperature above 34° C., the more the G component is attenuated and, hence, the bluer the flesh-tone portion (the face) of the image becomes.

Processing for transforming the color of an image may be performed by extracting image data representing the flesh-tone portion of the image and attenuating the G or R component in regard to the extracted image data.

Figure 46:
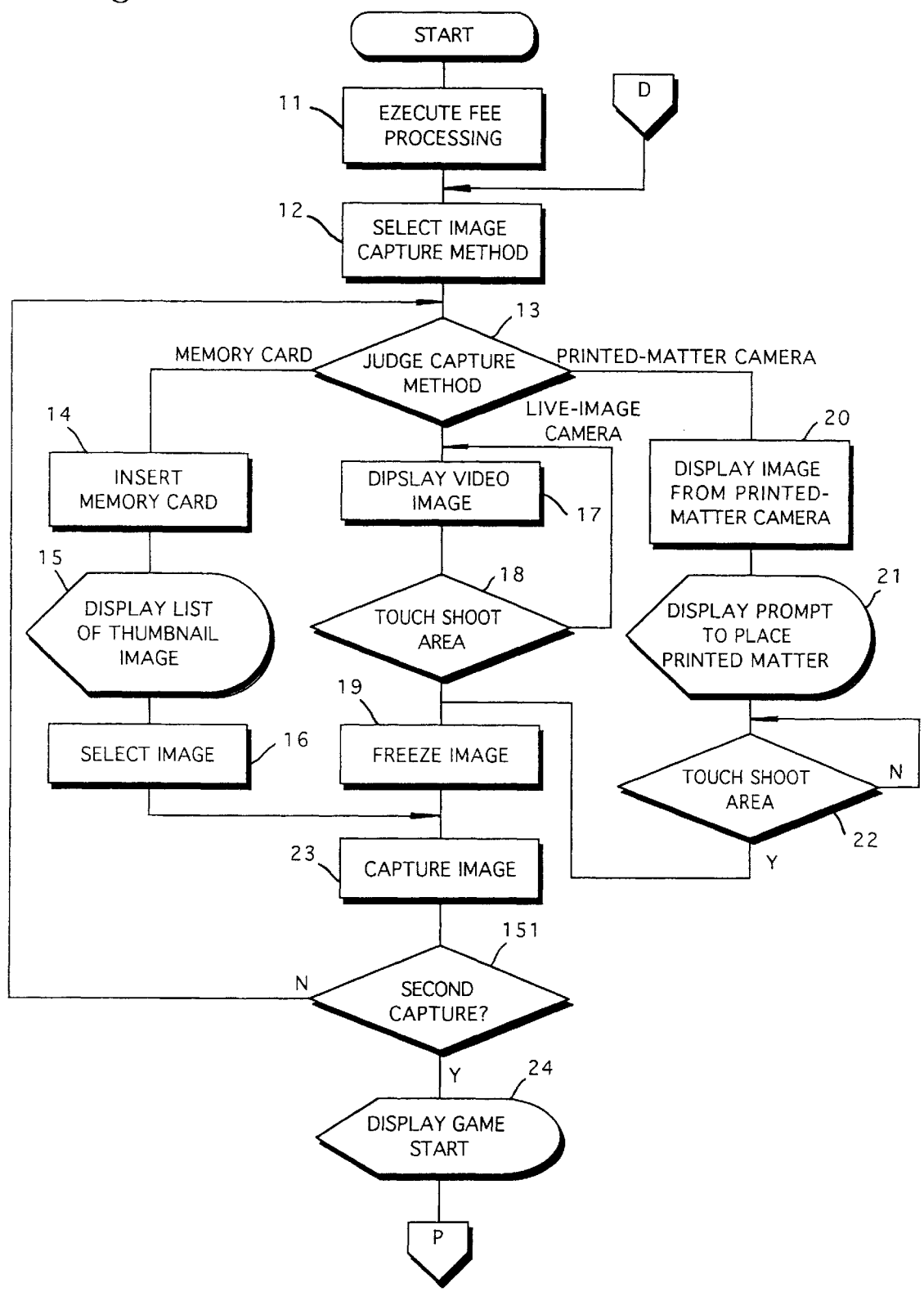
FIGS. 46 to 48 are flowcharts showing the processing procedure of the rapport measuring game machine.
Figure 47:
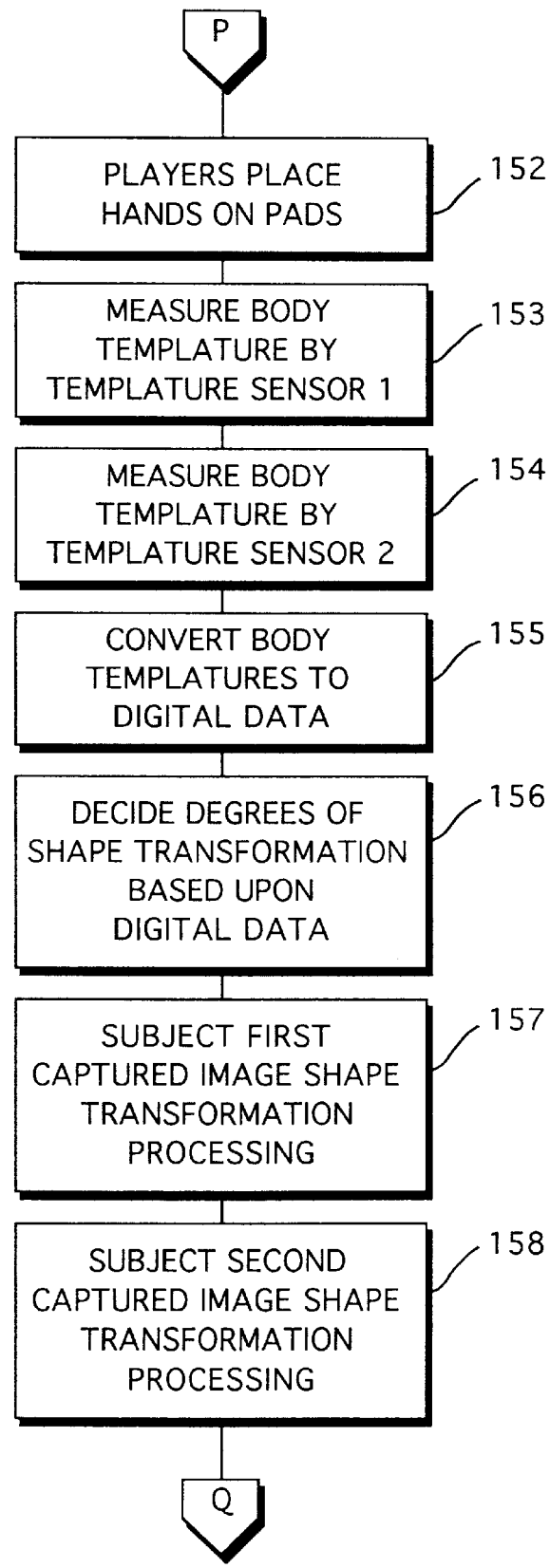
Figure 48:
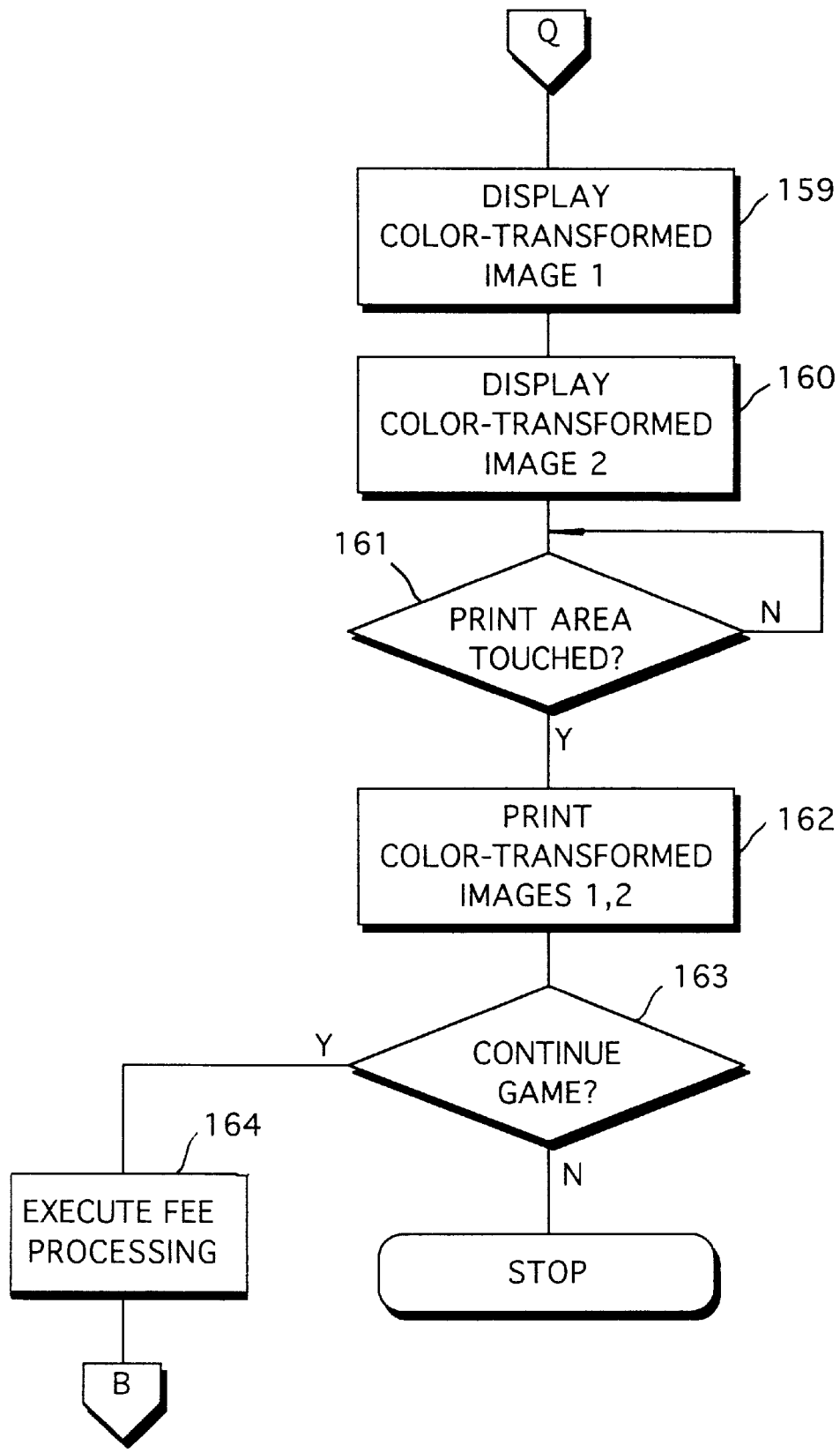

FIGS. 46 to 48 are flowcharts illustrating the processing procedure of the rapport measuring game. Processing steps identical with those shown in FIGS. 7 to 9 are designated by like step numbers and need not be described again.

Image capture is performed twice by the rapport measuring game (step 151). The zone on the left side of area A35 is touched and the image that was captured the first time is displayed in the first image display area A31. The zone on the right side of area A35 is touched and the image that was captured the second time is displayed in the second image display area A32. It goes without saying that image capture may be performed by shooting using the camera 13 or 15 or by capturing an image from a memory card.

The hand of the first player is placed on the first transparent pad 31, and the hand of the second player is placed on the second transparent pad 32 (step 152).

The temperature of the hand of the first player placed on the first transparent pad 31 is measured by the first temperature sensor 33 (step 153), and the temperature of the hand of the second player placed on the second transparent pad 32 is measured by the second temperature sensor 34 (step 154). A signal representing the temperature of the hand of the first player is output by the first temperature sensor 33 and is converted to digital data by the analog/digital conversion circuit 3. A signal representing the temperature of the hand of the second player is output by the second temperature sensor 34 and is converted to digital data by the analog/digital conversion circuit 3 (step 155).

The degrees of color transformation (the amounts of attenuation of the R and G components) of the first and second captured images are decided by referring to FIG. 45 in accordance with the digital temperature data (step 156).

The color of the first captured image is transformed in accordance with the decided degree of color transformation of the image (step 157), and the color of the second captured image is transformed in accordance with the decided degree of color transformation of the image (step 158).

The first captured image whose color has been transformed is displayed in the first image display area A31 (step 159), and the second captured image whose color has been transformed is displayed in the second image display area A32 (step 160). The degrees of rapport are displayed in the respective areas A33 and A34 based upon the measured hand temperatures. The higher the temperature measured by the first temperature sensor 33, the longer the bar in the area A33; the higher the temperature measured by the second temperature sensor 34, the longer the bar in the area A34.

The color-transformed image being displayed in the first image display area A31 and the color-transformed image being displayed in the second image display area A32 are printed by the printer 11 in response to the print area A15 being touched by a player (step 52).

In a case where the game using the rapport measuring game is to be continued, it goes without saying that images may be captured anew, the color of images captured last may be transformed, or images transformed in color last may have their colors transformed further (see FIG. 9), in a manner similar to that of the punching game machine described above. Color may be transformed gradually so that the process of the color change can be ascertained.

In the embodiment described above, the temperature of a player's hand is measured and the color of a captured image is transformed in dependence upon this temperature. However, it goes without saying that a player's amount of perspiration, heart rate or blood pressure may be measured and the color of a captured image transformed in dependence upon the results of measurement. In a case where these quantities are measured, it goes without saying that instrumentation suitable for such measurement would be provided.

(3) Intoxication measuring game machine

Figure 49:
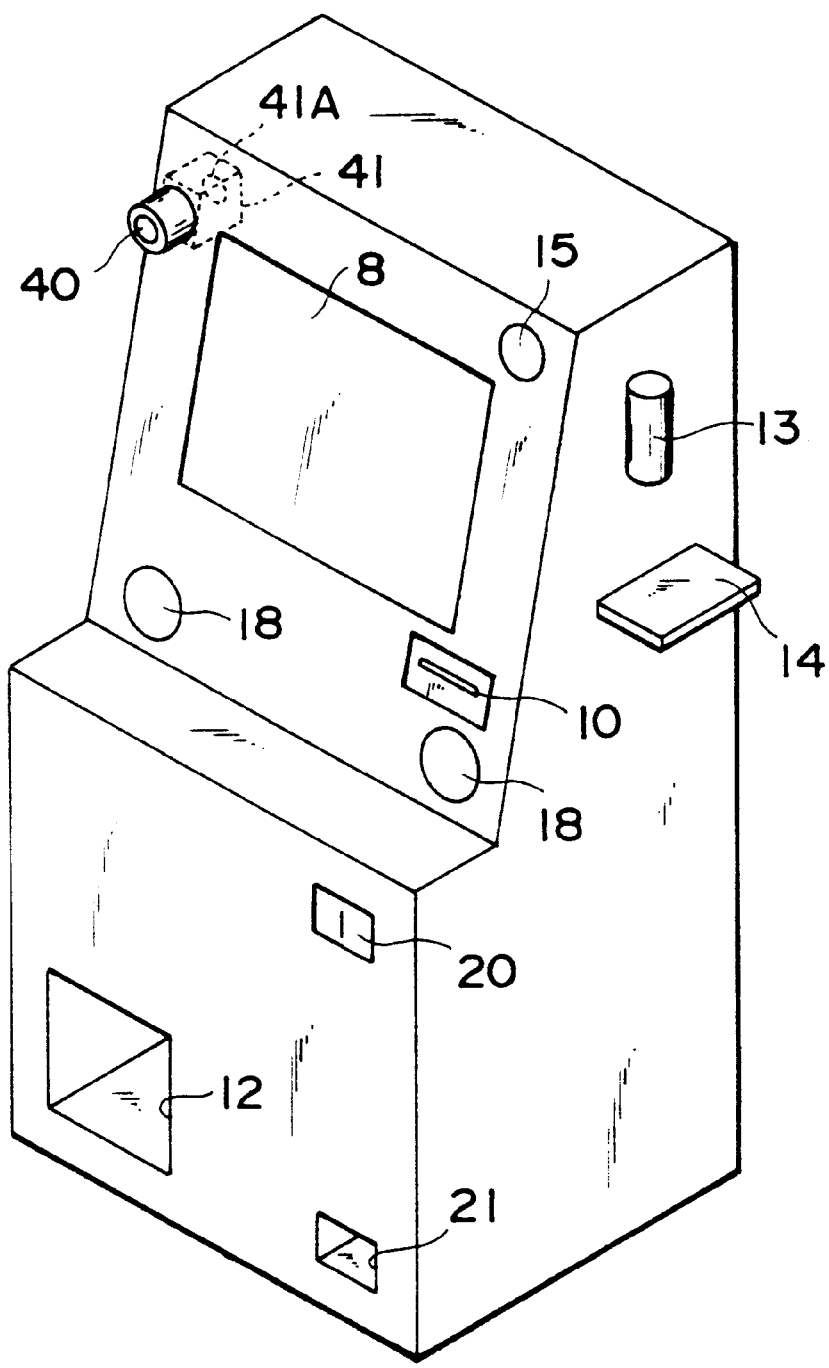
FIG. 49 is a perspective view showing the appearance of an intoxication measuring game machine.

FIG. 49 is a shows the appearance of an intoxication measuring game machine. Components in FIG. 49 identical with those shown in FIG. 1 are designated by like reference characters and are not described again.

The front side of the intoxication measuring game machine is provided at its upper left with a blow port 40 having its front end open. A player blows his or her breath into the blow port 40. The intoxication measuring game machine is provided internally with an alcohol sensor apparatus 41. The latter has a built-in alcohol sensor 41A (constituted by an enzyme sensor, microorganism sensor, etc.) for sensing the content of alcohol contained on breath blown in from the blow port 40. The color of the image of a face being displayed on the display screen 8 is transformed in dependence upon the sensed alcohol content.

Figure 50:
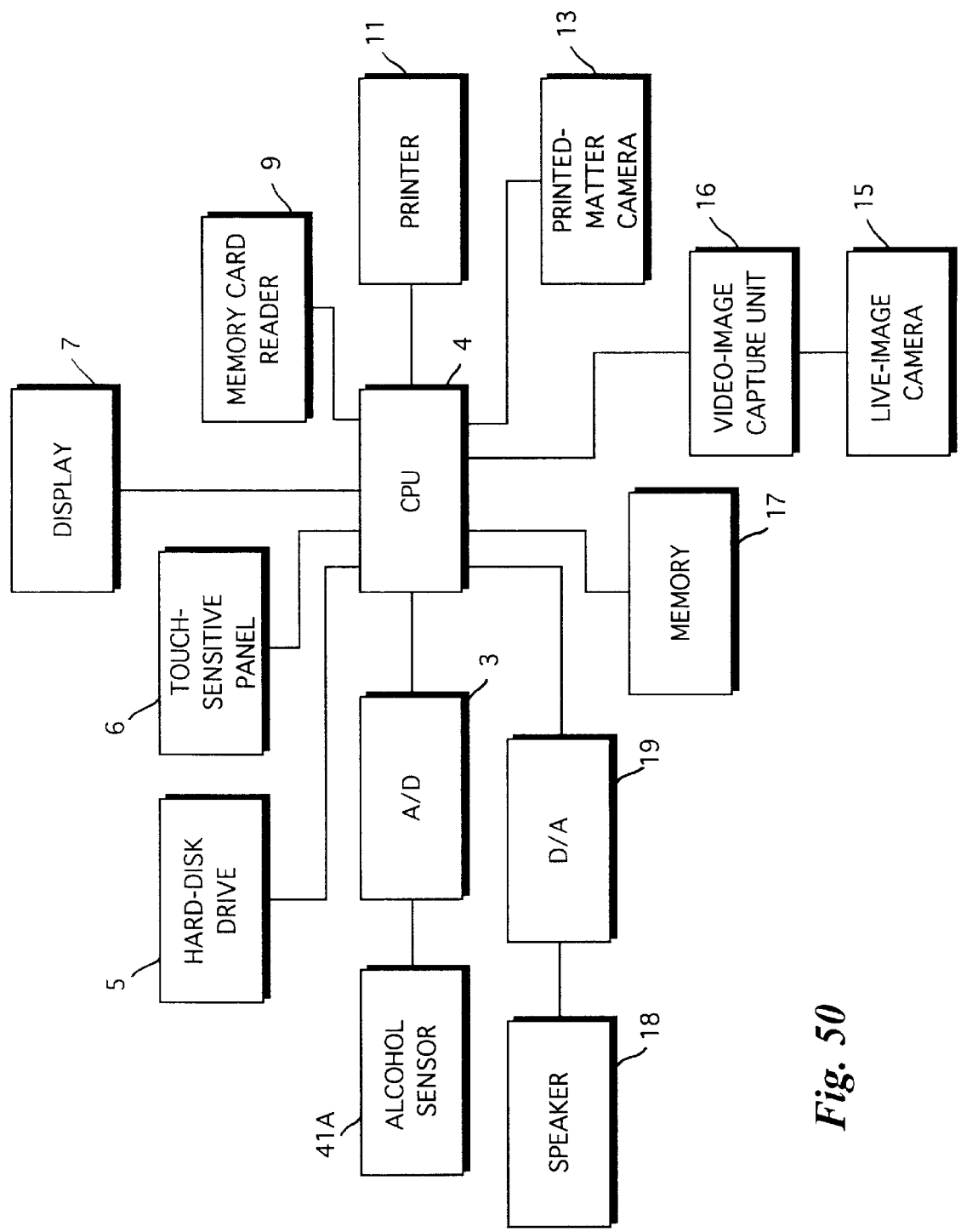
FIG. 50 is a block diagram showing the electrical construction of the intoxication measuring game machine.

FIG. 50 is a block diagram showing the electrical construction of the intoxication measuring game machine. Components in FIG. 50 identical with those shown in FIG. 2 are designated by like reference characters and are not described again.

A signal representing alcohol content sensed by the alcohol sensor 41A is input to the CPU 3 upon being converted to digital data by the analog/digital conversion circuit 3. The color of the image of a face being displayed on the display screen 8 is transformed, in the manner described above, based upon the input digital data.

Figure 51:
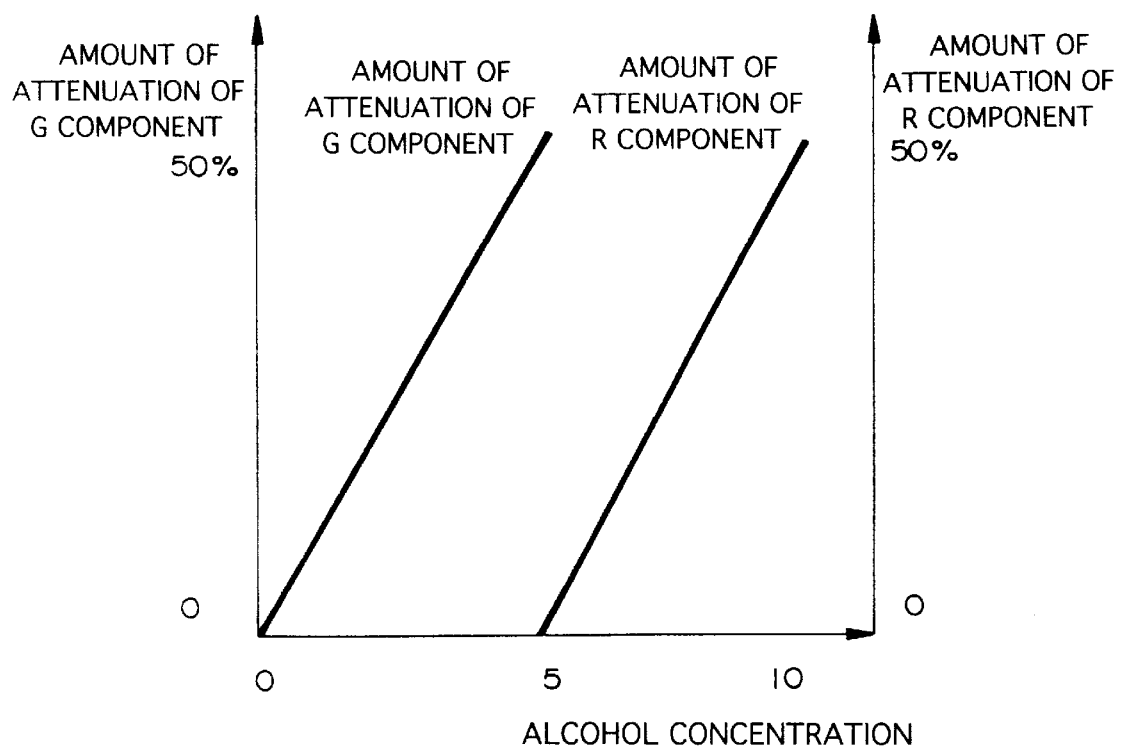
FIG. 51 illustrates the relationship between alcohol concentration and amounts of attenuation of R and G components.

FIG. 51 illustrates the relationship between sensed alcohol concentration and amounts of attenuation of R and G components.

It is assumed that the maximum amount of alcohol sensed by the alcohol sensor 41A is 10. If sensed alcohol content is between 5 and 10, then the higher the alcohol concentration, the more the R component is attenuated. If sensed alcohol content is between 0 and 5, then the higher the alcohol concentration, the more the G component is attenuated.

Figure 52:
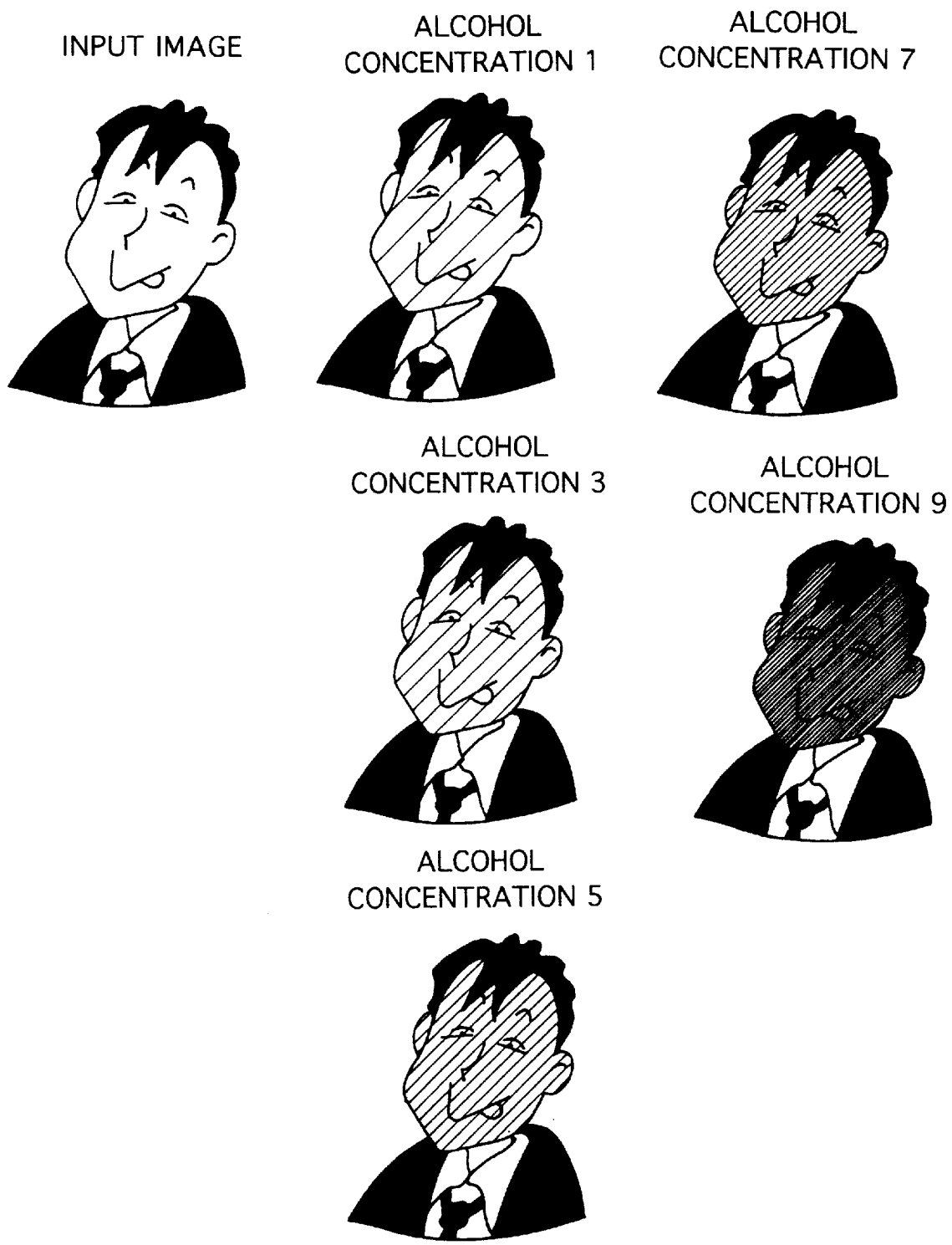
FIG. 52 illustrates a captured image and images whose color has been transformed.

FIG. 52 illustrates a captured image and images after color transformation. FIG. 52 shows that the higher the alcohol concentration, the denser the hatching of the face portion of the captured image. This indicates the degree of color transformation. It goes without saying that the color of the face portion of the captured image is transformed in dependence upon the alcohol concentration in this intoxication measuring game machine.

Figure 53:
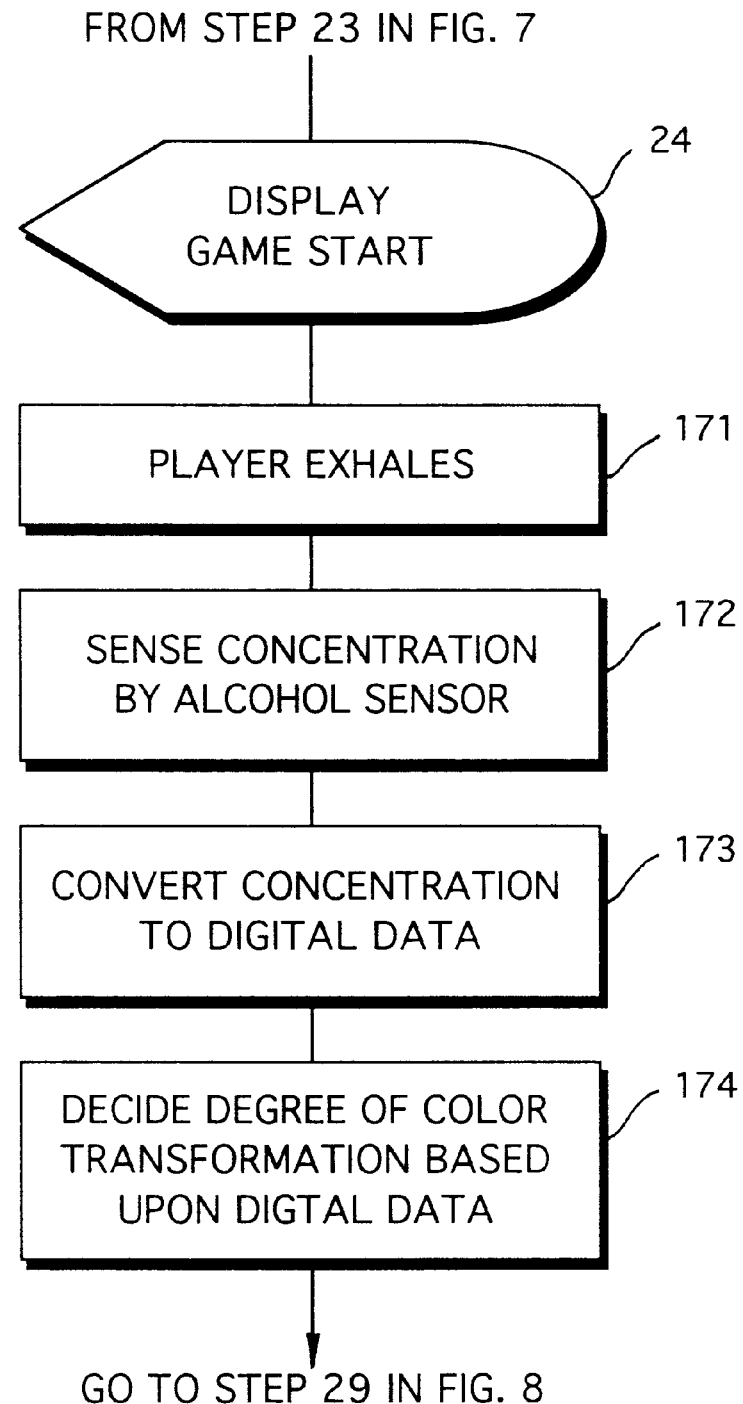
FIG. 53 is a flowchart showing part of the processing procedure of the intoxication measuring game machine.

FIG. 53 is a flowchart showing part of the processing procedure of the intoxication measuring game machine. Processing steps in FIG. 53 identical with those shown in FIGS. 7 to 9 are designated by like step numbers and are not described again.

When an image is captured and an indication of game start is displayed on the display screen 8 (step 24), a player blows his or her breath into the blow port 40 (step 171). The breath blown into the machine has its alcohol concentration sensed by the alcohol sensor 41A (step 172). The sensed alcohol concentration is converted to digital data by the analog/digital conversion circuit 3 (step 173).

The degree of color transformation is decided in dependence upon the alcohol concentration presented by the digital data obtained from the conversion (step 174) and the captured image is subjected to color transformation processing in the manner shown in FIG. 22 (step 29). The captured image that has been subjected to color transformation processing is displayed on the display screen 8. This image is printed by the printer 11 if necessary.

In a case where the game using the intoxication measuring game machine is to be continued, an image may be captured anew, a captured image may be subjected to color transformation processing, or the image captured last or the image whose color was transformed last may subjected to color transformation processing.

FIG. 54 illustrates an example of a layer list included in the image-processing description file (see FIG. 10) applied to the intoxication measuring game machine, and FIG. 55 illustrates an example of layer data and layer-specific data.

Two items of layer information (Layer Info) have been defined. First layer information is for reducing the G component from the image, and second layer information is for reducing the R component from the image. The first layer information for reducing the G component is utilized when the alcohol concentration is between 0 and 5, and the second layer information for reducing the R component is utilized when the alcohol concentration is between 5 and 10, as shown in FIG. 51.

The display order of the first layer designated by the first layer information is assumed to be 1, and the display order of the second layer designated by the second layer information is assumed to be 2. The first layer is capable of being displayed, and the second layer is not. The first layer and the second layer can both be interchanged with the above-described sample image and captured image, and the substitution number if stipulated as being 1.

As shown in FIG. 55, the maximum value of the layer parameter of first layer-specific data defined by the first layer information and the maximum value of the layer parameter of second layer-specific data defined by the second layer information are stipulated as being 0.50 in conformity with the maximum value of the amount of attenuation of the G component and the maximum value of the amount of attenuation of the R component shown in FIG. 51. The minimum value of the layer parameter of first layer-specific data defined by the first layer information and the minimum value of the layer parameter of second layer-specific data defined by the second layer information are stipulated as being 0.00 in conformity with the minimum value of the amount of attenuation of the G component and the minimum value of the amount of attenuation of the R component shown in FIG. 51.

The G component of the image is attenuated between 0 and 50% in accordance with the designation by the first layer-specific data 1, and the R component of the image is attenuated between 0 and 50% in accordance with the designation by the second layer-specific data 2. The captured image is subjected to color attenuation processing by the CPU 4 in dependence upon these designations, and color transformation processing is executed.

Figure 56:
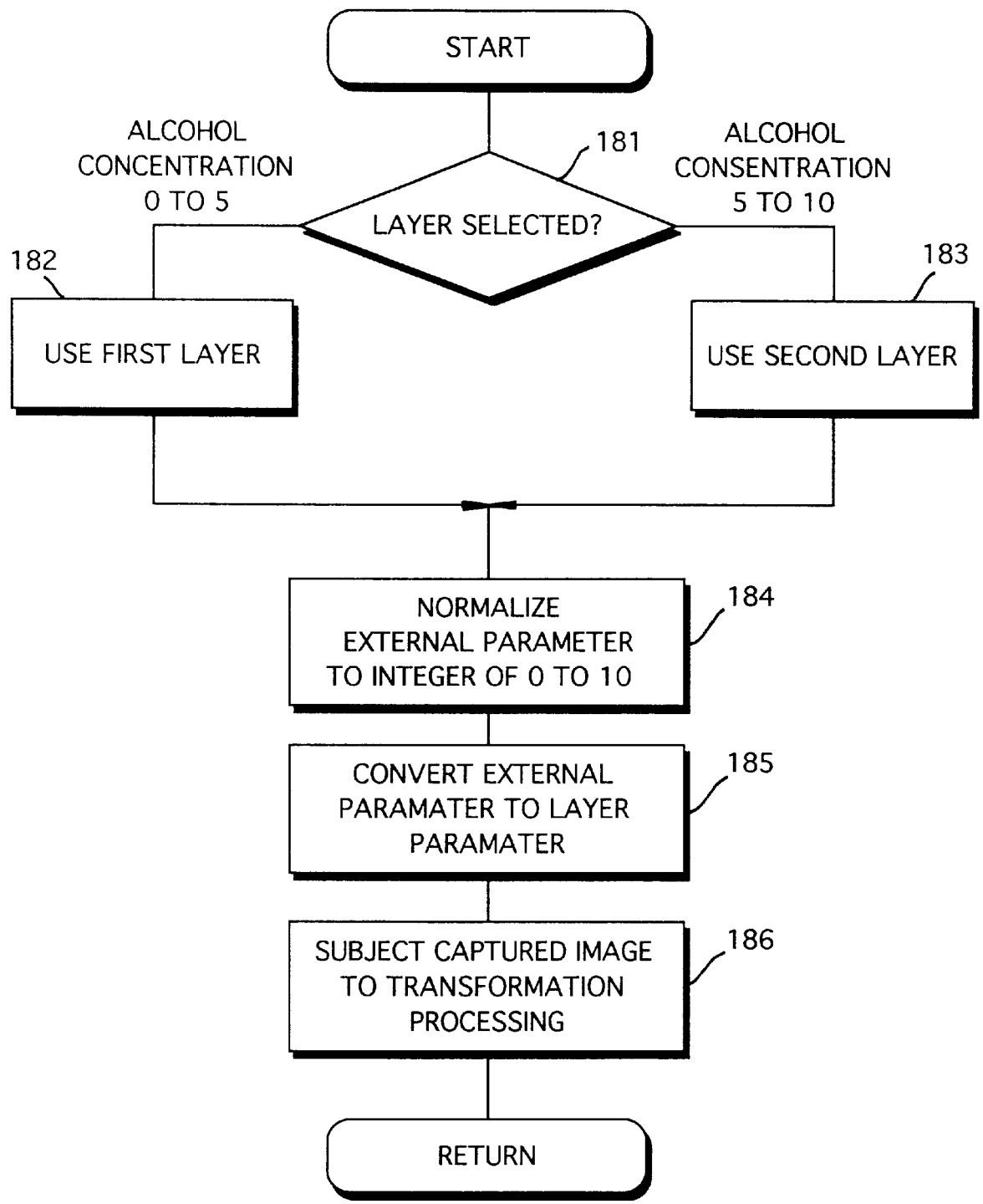
FIG. 56 is a flowchart illustrating the procedure of color transformation processing.

FIG. 56 is a flowchart showing a processing procedure in a case where a captured image is subjected to color transformation processing using layers.

First, a layer is selected in dependence upon the sensed alcohol concentration (step 181). If the alcohol concentration is between 0 and 5, the first layer is used (step 182). If the alcohol concentration is between 5 and 10, the second layer is used (step 183).

The external parameter (the sensed alcohol concentration) is normalized to an integer between 0 and 10 (step 184). Next, the normalized external parameter is converted to a layer parameter (internal parameter) (step 185). By virtue of this parameter conversion processing, the color of the captured image is transformed in the selected layer using the layer parameter obtained (step 186).

It goes without saying that an image-processing description file need not necessarily be used in color transformation processing.

FIGS. 57 to 61 illustrate another embodiment of the invention.

Figure 57:
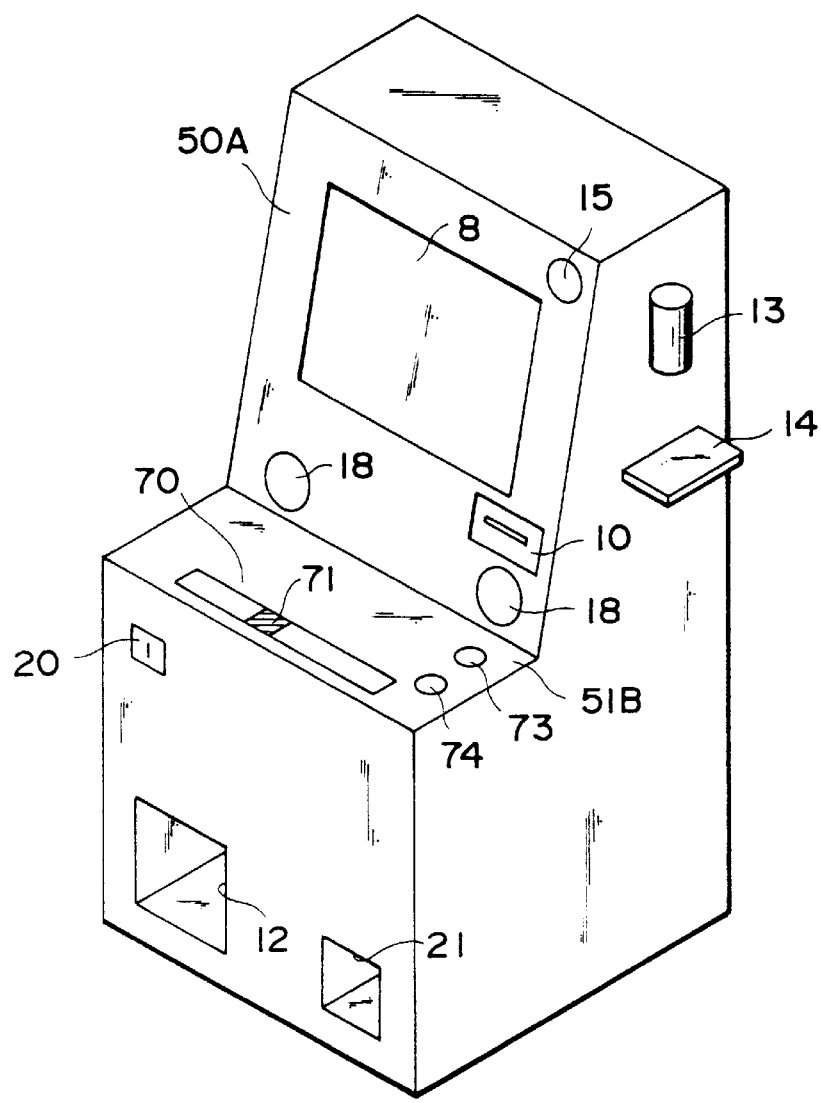
FIG. 57 is a perspective view showing the appearance of a game machine equipped with a slide lever.

FIG. 57 illustrates the appearance of a game machine equipped with a slide lever. Components in FIG. 57 identical with those shown in FIG. 49 are designated by like reference characters and are not described again.

Figure 58:
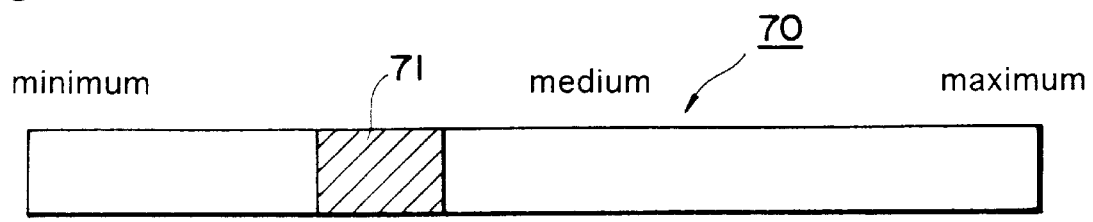
FIG. 58 illustrates a slide lever.

The game machine has a slide lever 70 provided in front of a control panel 51B projecting forwardly from the machine (see FIG. 58). The slide lever 70 is provided with a slide portion 71, which is free to slide to the left and right. A signal indicating the minimum position is output when the slide 71 is at the extreme left end, and a signal indicating the maximum position is output when the slide 71 is at the extreme right end. A signal indicating the center position is output when the slide 71 is at the center position. A print button 73 and a decide button 74 are provided on the right side of the control panel 51B.

Figure 59:
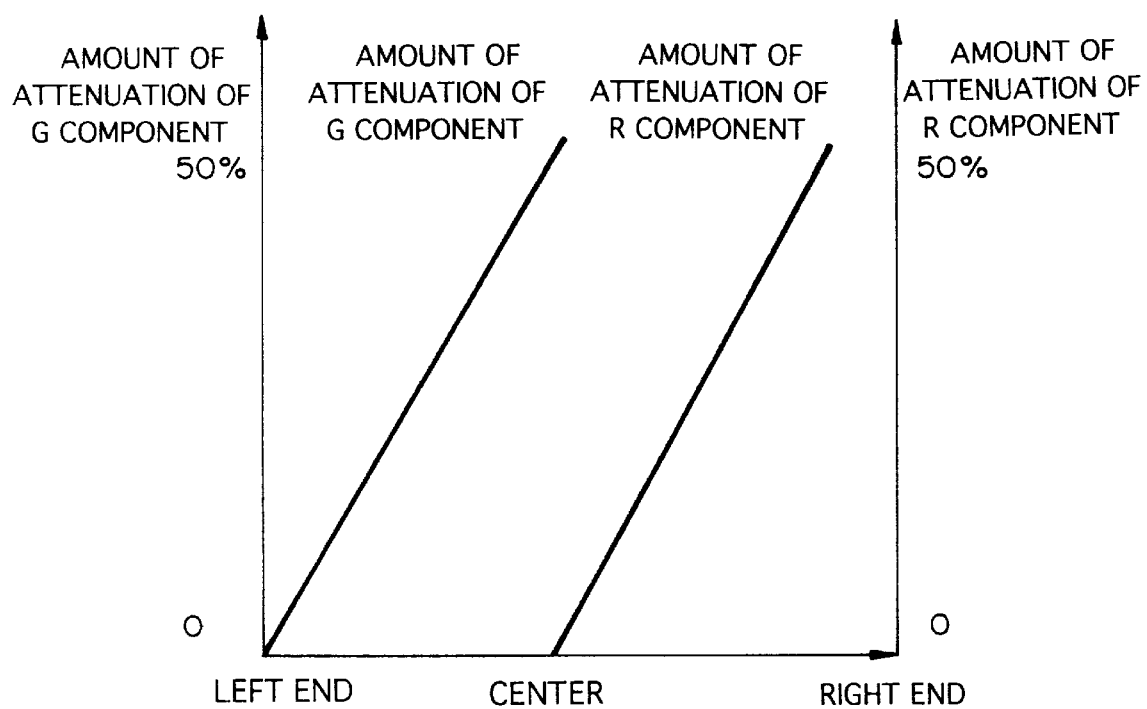
FIG. 59 illustrates the relationship between the position of the slide lever and amounts of attenuation of R and G components.

When the position of the slide 71 is between the left end and the center, as shown in FIG. 59, the G component of the image captured by the game machine having the slide lever is attenuated. (The image is captured by a player in the same manner as the game machines described above.) As the slide 71 is moved from the left end toward the center, the amount of attenuation of the G component increases. In a case where the position of the slide 71 is at a position between the center and the right end, the R component of the image captured by the this game machine is attenuated. As the slide is moved from the center to the right end, the amount of attenuation of the R component increases. The type of color transformation of the captured image and the degree of color transformation changes in dependence upon the position of the slide 71 of slide lever 70.

Figure 60:
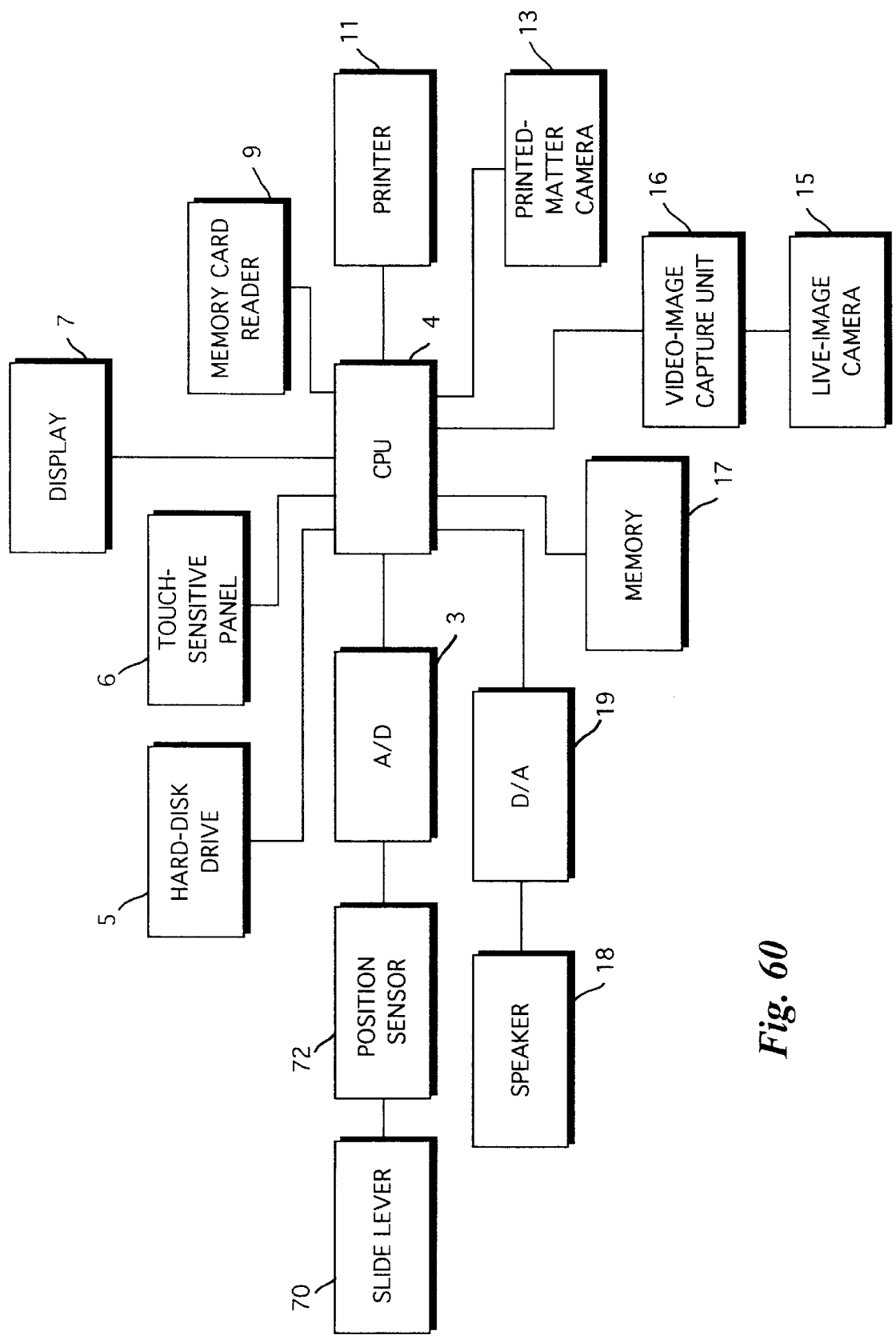
FIG. 60 is a block diagram showing the electrical construction of the game machine equipped with the slide lever.

FIG. 60 is a block diagram showing the electrical construction of the game equipped with the slide lever. Components in FIG. 60 identical with those shown in FIG. 2 are designated by like reference characters and are not described again.

The position of the slide 71 of slide lever 70 is sensed by a position sensor 72. The latter outputs a signal indicating the position of the slide 71. The signal is applied to the CPU 4 via the analog/digital conversion circuit 3. The color of the captured image is subjected to color transformation processing in dependence upon the position detection signal.

Figure 61:
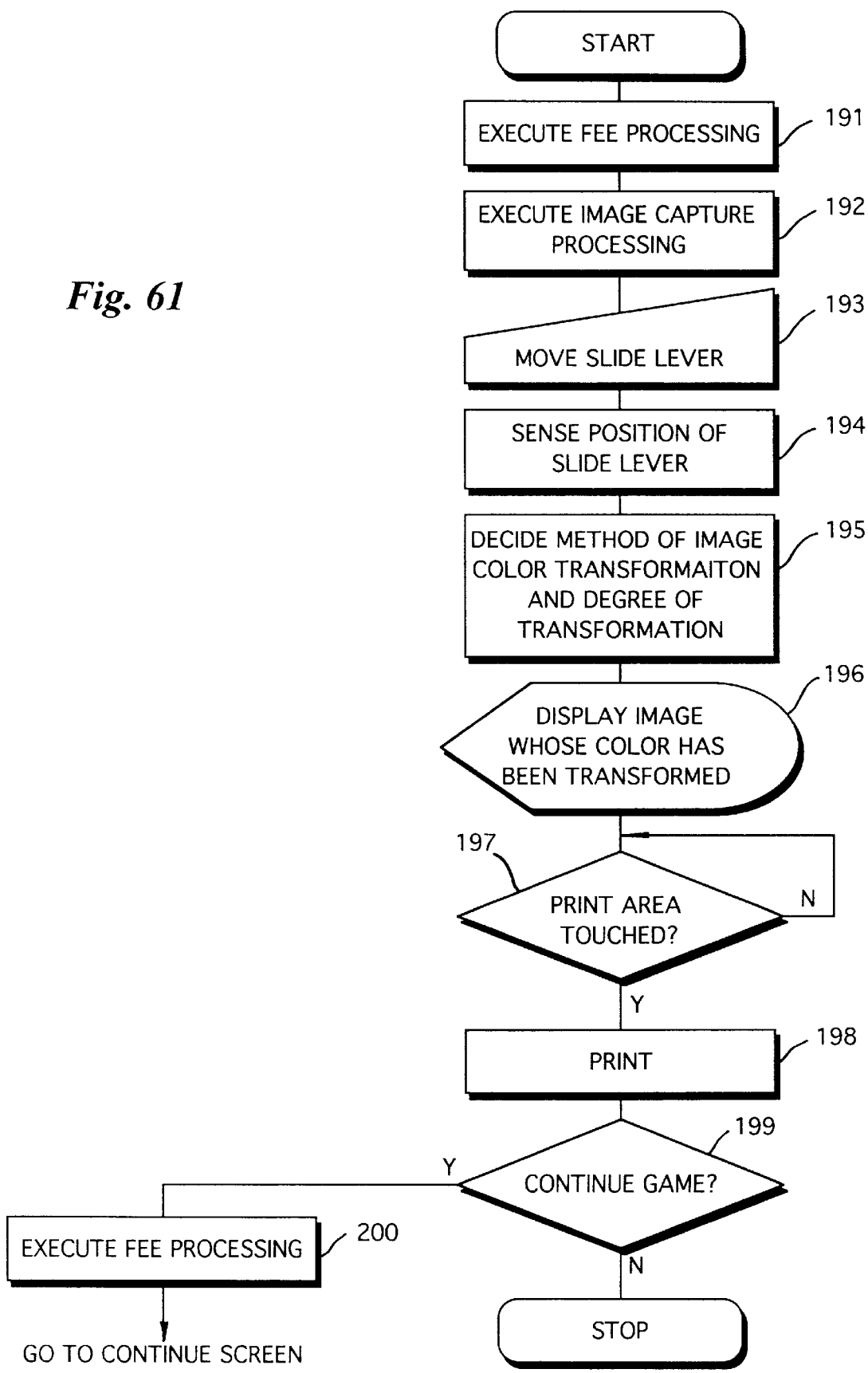
FIG. 61 is a flowchart showing the processing procedure of the game machine equipped with the slide lever.

FIG. 61 is a flowchart showing the processing procedure of the game machine equipped with the slide lever.

The playing fee is introduced by the player (step 191) and the image is captured (step 192). The player moves the slide 71 of the slide lever 70 (step 193) and the position of the slide lever 70 is sensed by the position sensor 72 (step 194).

The method of color transformation processing of the captured image (whether to attenuate the R component or the G component) and the degree of color transformation processing (the amount of attenuation) are decided, as shown in FIG. 59, in dependence upon the sensed position of the slide lever 70 (the slide portion 71) (step 195). Color transformation processing is executed in dependence upon the method of color transformation processing and degree of color transformation processing that have been decided, and the image whose color has been transformed is displayed on the display screen 8 of the game machine equipped with the slide lever (step 196).

The image whose color has been transformed is decided when the decide button 74 is pressed by the player. If the player then presses the print button 73 ("YES" at step 197), the color-transformed image being displayed on the display screen is printed (step 198). If the game is to be continued ("YES" at step 199), the processing to charge the fee is executed (step 200). The game is then continued.

As many apparently widely different embodiments of the present invention can be made without departing from the spirit and scope thereof, it is to be understood that the invention is not limited to the specific embodiments thereof except as defined in the appended claims.

What is claimed is:

1. An image capture apparatus comprising:
   image capture means for capturing an image;
   sensing means for sensing at least one of a command from a player and a physical quantity relating to a characteristic of the player;
   image shape/color transformation means for subjecting image data, which represents the image captured by said image capture means, to at least one of shape transformation processing and color transformation processing on the basis of at least one of the command and physical quantity, which has been sensed by said sensing means, in such a manner that the image will be subjected to at least one of shape transformation and color transformation; and
   output means for outputting the image data that has been processed by said image shape/color transformation means.

2. The apparatus according to claim 1, wherein said output means is a display unit for displaying an image that is at least one of a shape-transformed image and color-transformed image represented by the image data that has been subjected to at least one of the shape transformation processing and color transformation processing.

3. The apparatus according to claim 2, wherein degree of shape transformation of a shape-transformed image or degree of color transformation of a color-transformed image is displayed on said display unit while being gradually enlarged.

4. The apparatus according to claim 1, further comprising a display unit for displaying an image captured by said image capture means.

5. The apparatus according to claim 1, further comprising:
first storage means for storing image data representing at least one of a last captured image, which represents an image captured last by said image capture means, and a last shape-transformed image that has been transformed by said image shape/color transformation means; and
first control means for controlling said shape/color transformation means, based upon at least one of the command value and physical quantity sensed by said sensing means, so as to apply shape transformation processing to the image data, which has been stored in said first storage means, that represents at least one of the last captured image and last shape-transformed image.

6. The apparatus according to claim 1, wherein said image capture means captures a color image, and said apparatus further comprises:
second storage means for storing image data representing at least one of a last captured image, which represents an image captured last by said image capture means, and a last color-transformed image that has been transformed by said image shape/color transformation means; and
second control means for controlling said shape/color transformation means, based upon at least one of the command value and physical quantity sensed by said sensing means, so as to apply color transformation processing to the image data, which has been stored in said second storage means, that represents at least one of the last captured image and last color-transformed image.

7. The apparatus according to claim 1, wherein said image shape/color transformation means further includes decision means for deciding, based upon at least one of the command value and physical quantity sensed by said sensing means, a description statement representing one type of processing from among image-processing description statements in which there are set forth a plurality of description statements representing at least one of image-data shape transformation processing and color transformation processing;
the image captured by said image capture means being subjected to at least one of shape transformation and color transformation based upon the description statement that has been decided.

8. An image capture apparatus comprising:
image capture means for capturing an image;
punching-force sensing means for sensing a value relating to punching force;
image shape transformation means for subjecting image data, which represents the image captured by said image capture means, to shape transformation processing on the basis of the punching force, which has been sensed by said punching-force sensing means, in such a manner that the captured image will be transformed in shape; and output means for outputting the image data that has been subjected to shape transformation processing by said image shape transformation means.

9. The apparatus according to claim 8, wherein said punching force sensing means includes:
direction sensing means for sensing direction in which the punching force is applied; and
magnitude sensing means for sensing magnitude of the punching force;
said image shape transformation means transforming the shape of the image in a direction that corresponds to the direction sensed by said direction sensing means and enlarging degree of shape transformation of the image captured by said image capture means, wherein the larger the magnitude of the punching force, the more the degree of shape transformation is enlarged.

10. The apparatus according to claim 8, wherein said image capture means captures images of two different frames, and said punching force sensing means includes:
first punching force sensing means for sensing punching force in connection with one image of the images of the two different frames; and
second punching force sensing means for sensing punching force in connection with the other image of the images of the two different frames; and
said image shape transformation means includes:
first image shape transformation means for subjecting the image data, which represents the image captured by said image capture means, to shape transformation processing on the basis of the punching force sensed by said first punching force sensing means, in such a manner that the shape of said one image is transformed; and
second image shape transformation means for subjecting the image data, which represents the image captured by said image capture means, to shape transformation processing on the basis of the punching force sensed by said second punching force sensing means, in such a manner that the shape of said other image is transformed.

11. The apparatus according to claim 8, wherein said image capture means captures a first image from a first player and a second image from a second player;
said punching force sensing means includes:
first punching force sensing means for sensing a value relating to punching force of the first player; and
second punching force sensing means for sensing a value relating to punching force of the second player; and
said image shape transformation means includes:
first image shape transformation means for shape-transforming image data, which represents the second image captured by said image capture means, on the basis of the punching force sensed by said first punching force sensing means, so as to transform the shape of the second image; and
second image shape transformation means for shape-transforming image data, which represents the first image captured by said image capture means, on the basis of the punching force sensed by said second punching force sensing means, so as to transform the shape of the first image; and
said output means includes:
a first display unit for displaying, to the first player, the second image whose shape has been transformed by said first image shape transformation means; and a second display unit for displaying, to the second player, the first image whose shape has been transformed by said second image shape transformation means.

12. An image capture apparatus comprising:

color-image capture means for capturing a color image;

body-temperature measurement means for measuring a value relating to body temperature;

image color transformation means for subjecting image data, which represents the color image captured by said color-image capture means, to color transformation processing on the basis of the body temperature, which has been measured by the body-temperature measurement means, in such a manner that the captured color image will be transformed in color; and output means for outputting the color image data that has been subjected to color transformation processing by said image-color transformation means.

13. An image capture apparatus comprising:

color-image capture means for capturing a color image;

alcohol sensing means for sensing a value relating to alcohol content in breath;

image color-transformation means for subjecting color image data, which represents the color image captured by said color-image capture means, to color transformation processing on the basis of the value relating to alcohol content, which has been sensed by said alcohol sensing means, in such a manner that the captured color image will be transformed in color; and output means for outputting the color image data that has been subjected to color transformation processing by said image-color transformation means.

14. An image capture apparatus comprising:

color-image capture means for capturing a color image;

command-value input means for inputting a command value, which represents degree of color transformation, from a player;

image color-transformation means for subjecting image data, which represents the color image captured by said color-image capture means, to color transformation processing on the basis of the command value that has been input from said command-value input means; and output means for outputting the color image data that has been subjected to color transformation processing by said image-color transformation means.

15. An image capture method comprising the steps of:

capturing an image;

sensing at least one of a command from a player and a physical quantity relating to a characteristic of the player;

subjecting image data, which represents the image captured, to at least one of shape transformation processing and color transformation processing on the basis of at least one of the command and physical quantity sensed, in such a manner that the image will be subjected to at least one of shape transformation and color transformation; and outputting the image data that has been processed.

16. An image capture method comprising the steps of:

capturing an image;

sensing a value relating to punching force;

subjecting image data, which represents the image captured, to shape transformation processing on the basis of the punching force sensed, in such a manner that the captured image will be transformed in shape; and outputting the image data that has been subjected to shape transformation processing.

17. An image capture method comprising the steps of:

capturing a color image;

measuring a value relating to body temperature;

subjecting image data, which represents the color image captured, to color transformation processing on the basis of the measured value relating to body temperature of the player, in such a manner that the captured color image will be transformed in color; and outputting the color image data that has been subjected to color transformation processing.

18. An image capture method comprising the steps of:

capturing a color image;

sensing a value relating to alcohol content in breath;

subjecting color image data, which represents the color image captured, to color transformation processing on the basis of the sensed value relating to alcohol content, in such a manner that the captured color image will be transformed in color; and outputting the color image data that has been subjected to color transformation processing.

19. An image capture method comprising the steps of:

capturing a color image;

inputting a command value, which represents degree of color transformation, from a player;

subjecting image data, which represents the color image captured, to color transformation processing on the basis of the input command value; and outputting the color image data that has been subjected to color transformation processing.

* * * * *